(12) United States Patent
Yoffe et al.

(10) Patent No.: US 12,523,762 B2
(45) Date of Patent: Jan. 13, 2026

(54) APPARATUS, SYSTEM AND METHOD OF RADAR INFORMATION COMPRESSION

(71) Applicant: Intel Corporation, Santa Clara, CA (US)

(72) Inventors: Ilia Yoffe, Hod HaSharon (IL); Moshe Teplitsky, Tel-Aviv (IL); Adi Panzer, Tel Aviv (IL); Oren Shalita, Tel-Aviv (IL); Alon Cohen, Modiin (IL)

(73) Assignee: INTEL CORPORATION, Santa Clara, CA (US)

( * ) Notice: Subject to any disclaimer, the term of this patent is extended or adjusted under 35 U.S.C. 154(b) by 465 days.

(21) Appl. No.: 17/559,987

(22) Filed: Dec. 22, 2021

(65) Prior Publication Data
US 2023/0144333 A1    May 11, 2023

(51) Int. Cl.
*G01S 13/931*    (2020.01)
*H03M 7/40*    (2006.01)

(52) U.S. Cl.
CPC ............. *G01S 13/931* (2013.01); *H03M 7/40* (2013.01)

(58) Field of Classification Search
CPC .... H03M 7/3059; H03M 7/3082; H03M 7/40; G01S 13/584; G01S 13/931; G01S 7/354
See application file for complete search history.

(56) References Cited

U.S. PATENT DOCUMENTS

| | | |
|---|---|---|
| 2006/0273951 A1 | 12/2006 | Adams et al. |
| 2015/0346321 A1 | 12/2015 | Jansen et al. |
| 2017/0153316 A1 | 6/2017 | Wintermantel |
| 2020/0341109 A1* | 10/2020 | Meissner ................ G01S 7/023 |
| 2021/0109208 A1 | 4/2021 | Horng et al. |
| 2021/0333385 A1 | 10/2021 | Rohani et al. |

FOREIGN PATENT DOCUMENTS

WO    2017/031149    2/2017

OTHER PUBLICATIONS

International Preliminary Report on Patentability for International Application No. PCT/US2022/050589, mailed on Jul. 4, 2024, 6 pages.
International Search Report and the Written Opinion for International Application No. PCT/US2022/050589, mailed on Apr. 11, 2023, 9 pages.
Search Report for European Patent Application No. 22912239.5, mailed on Nov. 27, 2025, 10 pages.

* cited by examiner

*Primary Examiner* — Timothy A Brainard
(74) *Attorney, Agent, or Firm* — Shichrur & Co.

(57) ABSTRACT

For example, a processor may be configured to generate compressed radar information by compressing radar values in a plurality of data bins of at least one radar processing dimension, the at least one radar processing dimension including a range dimension. For example, the processor may be configured to generate the compressed radar information by quantizing a plurality of normalized values corresponding to the radar values in the plurality of data bins. For example, a normalized value corresponding to a radar value in a data bin may be based on a normalization of the radar value with respect to a plurality of radar values in the data bin. For example, the processor may be configured to store the compressed radar information in a memory.

25 Claims, 24 Drawing Sheets

US 12,523,762 B2

APPARATUS, SYSTEM AND METHOD OF RADAR INFORMATION COMPRESSION

TECHNICAL FIELD

Aspects described herein generally relate to radar information compression.

BACKGROUND

Various types of devices and systems, for example, autonomous and/or robotic devices, e.g., autonomous vehicles and robots, may be configured to perceive and navigate through their environment using sensor data of one or more sensor types.

Conventionally, autonomous perception relies heavily on light-based sensors, such as image sensors, e.g., cameras, and/or Light Detection and Ranging (LIDAR) sensors. Such light-based sensors may perform poorly under certain conditions, such as, conditions of poor visibility, or in certain inclement weather conditions, e.g., rain, snow, hail, or other forms of precipitation, thereby limiting their usefulness or reliability.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
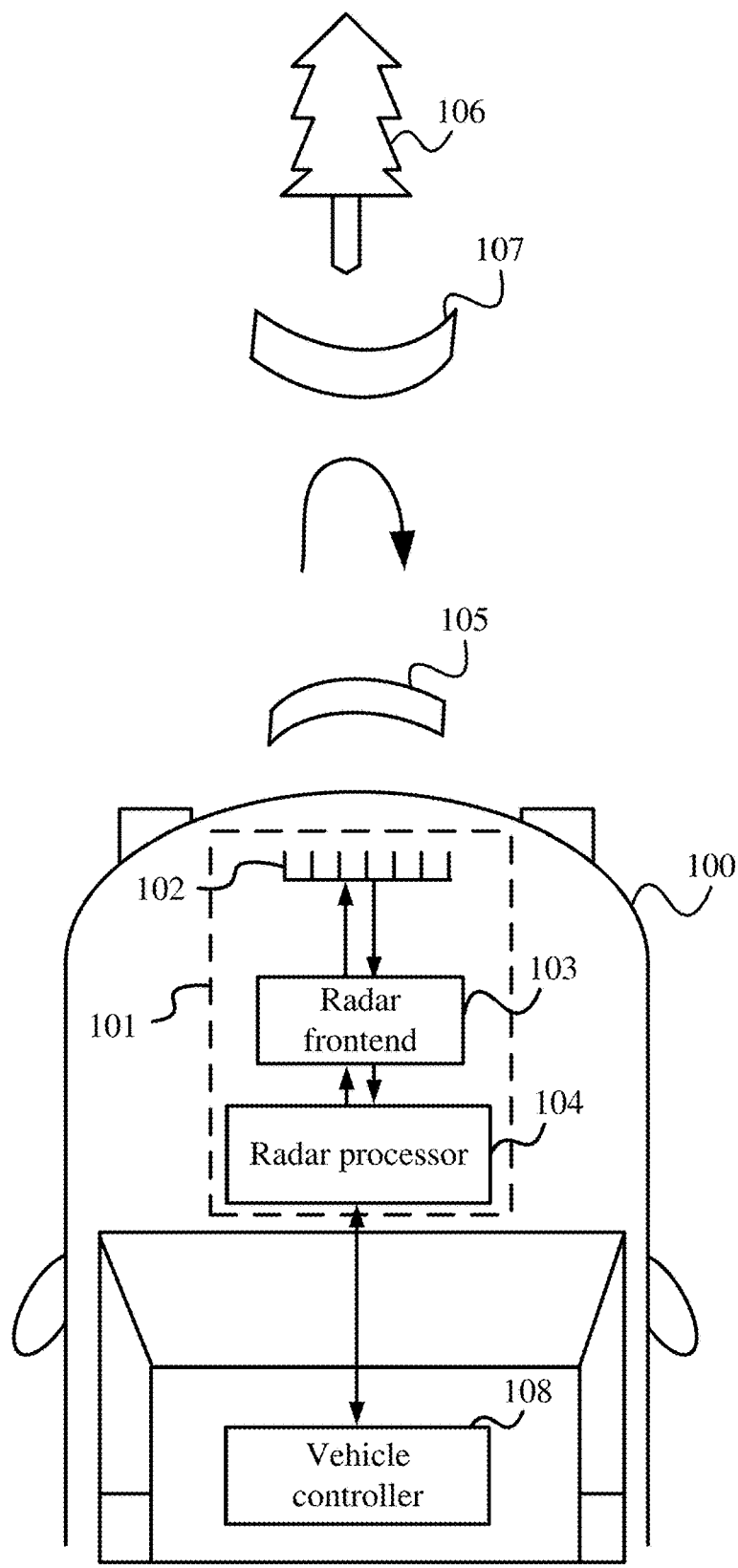
FIG. 1 is a schematic block diagram illustration of a vehicle implementing a radar, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The words "exemplary" and "demonstrative" are used herein to mean "serving as an example, instance, demonstration, or illustration". Any aspect, aspect, or design described herein as "exemplary" or "demonstrative" is not necessarily to be construed as preferred or advantageous over other aspects, aspects, or designs.

References to "one aspect", "an aspect", "demonstrative aspect", "various aspects" "one aspect", "an aspect", "demonstrative aspect", "various aspects" etc., indicate that the aspect(s) and/or aspects so described may include a particular feature, structure, or characteristic, but not every aspect or aspect necessarily includes the particular feature, structure, or characteristic. Further, repeated use of the phrase "in one aspect" or "in one aspect" does not necessarily refer to the same aspect or aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

A "vehicle" may be understood to include any type of driven object. By way of example, a vehicle may be a driven object with a combustion engine, an electric engine, a reaction engine, an electrically driven object, a hybrid driven object, or a combination thereof. A vehicle may be, or may include, an automobile, a bus, a mini bus, a van, a truck, a mobile home, a vehicle trailer, a motorcycle, a bicycle, a tricycle, a train locomotive, a train wagon, a moving robot, a personal transporter, a boat, a ship, a submersible, a submarine, a drone, an aircraft, a rocket, among others.

A "ground vehicle" may be understood to include any type of vehicle, which is configured to traverse the ground, e.g., on a street, on a road, on a track, on one or more rails, off-road, or the like.

An "autonomous vehicle" may describe a vehicle capable of implementing at least one navigational change without driver input. A navigational change may describe or include a change in one or more of steering, braking, acceleration/deceleration, or any other operation relating to movement, of the vehicle. A vehicle may be described as autonomous even in case the vehicle is not fully autonomous, for example, fully operational with driver or without driver input. Autonomous vehicles may include those vehicles that can operate under driver control during certain time periods, and without driver control during other time periods. Additionally or alternatively, autonomous vehicles may include vehicles that control only some aspects of vehicle navigation, such as steering, e.g., to maintain a vehicle course between vehicle lane constraints, or some steering operations under certain circumstances, e.g., not under all circumstances, but may leave other aspects of vehicle navigation to the driver, e.g., braking or braking under certain circumstances. Additionally or alternatively, autonomous vehicles may include vehicles that share the control of one or more aspects of vehicle navigation under certain circumstances, e.g., hands-on, such as responsive to a driver input; and/or vehicles that control one or more aspects of vehicle navigation under certain circumstances, e.g., hands-off, such as independent of driver input. Additionally or alternatively, autonomous vehicles may include vehicles that control one or more aspects of vehicle navigation under certain circumstances, such as under certain environmental conditions, e.g., spatial areas, roadway conditions, or the like. In some aspects, autonomous vehicles may handle some or all aspects of braking, speed control, velocity control, steering, and/or any other additional operations, of the vehicle. An autonomous vehicle may include those vehicles that can operate without a driver. The level of autonomy of a vehicle may be described or determined by the Society of Automotive Engineers (SAE) level of the vehicle, e.g., as defined by the SAE, for example in SAE J3016 2018: *Taxonomy and definitions for terms related to driving automation systems for on road motor vehicles,* or by other relevant professional organizations. The SAE level may have a value ranging from a minimum level, e.g., level 0 (illustratively, substantially no driving automation), to a maximum level, e.g., level 5 (illustratively, full driving automation).

An "assisted vehicle" may describe a vehicle capable of informing a driver or occupant of the vehicle of sensed data or information derived therefrom.

The phrase "vehicle operation data" may be understood to describe any type of feature related to the operation of a vehicle. By way of example, "vehicle operation data" may describe the status of the vehicle, such as, the type of tires of the vehicle, the type of vehicle, and/or the age of the manufacturing of the vehicle. More generally, "vehicle operation data" may describe or include static features or static vehicle operation data (illustratively, features or data not changing over time). As another example, additionally or alternatively, "vehicle operation data" may describe or include features changing during the operation of the vehicle, for example, environmental conditions, such as weather conditions or road conditions during the operation of the vehicle, fuel levels, fluid levels, operational parameters of the driving source of the vehicle, or the like. More generally, "vehicle operation data" may describe or include varying features or varying vehicle operation data (illustratively, time varying features or data).

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

Some aspects may be used in conjunction with Radio Frequency (RF) systems, radar systems, vehicular radar systems, autonomous systems, robotic systems, detection systems, or the like.

Some demonstrative aspects may be used in conjunction with an RF frequency in a frequency band having a starting frequency above 10 Gigahertz (GHz), for example, a frequency band having a starting frequency between 10 GHz and 120 GHz. For example, some demonstrative aspects may be used in conjunction with an RF frequency having a starting frequency above 30 GHz, for example, above 45 GHz, e.g., above 60 GHz. For example, some demonstrative aspects may be used in conjunction with an automotive radar frequency band, e.g., a frequency band between 76 GHz and 81 GHz. However, other aspects may be implemented utilizing any other suitable frequency bands, for example, a frequency band above 140 GHz, a frequency band of 300 GHz, a sub Terahertz (THz) band, a THz band, an Infra-Red (IR) band, and/or any other frequency band.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a MIMO (Multiple-Input Multiple-Output) array antenna, a single element antenna, a set of switched beam antennas, and/or the like. In one example, an antenna may be implemented as a separate element or an integrated element, for example, as an on-module antenna, an on-chip antenna, or according to any other antenna architecture.

Some demonstrative aspects are described herein with respect to RF radar signals. However, other aspects may be implemented with respect to, or in conjunction with, any other radar signals, wireless signals, IR signals, acoustic signals, optical signals, wireless communication signals, communication scheme, network, standard, and/or protocol. For example, some demonstrative aspects may be implemented with respect to systems, e.g., Light Detection Ranging (LiDAR) systems, and/or sonar systems, utilizing light and/or acoustic signals.

Reference is now made to FIG. 1, which schematically illustrates a block diagram of a vehicle 100 implementing a radar, in accordance with some demonstrative aspects.

In some demonstrative aspects, vehicle 100 may include a car, a truck, a motorcycle, a bus, a train, an airborne vehicle, a waterborne vehicle, a cart, a golf cart, an electric cart, a road agent, or any other vehicle.

In some demonstrative aspects, vehicle 100 may include a radar device 101, e.g., as described below. For example, radar device 101 may include a radar detecting device, a radar sensing device, a radar sensor, or the like, e.g., as described below.

In some demonstrative aspects, radar device 101 may be implemented as part of a vehicular system, for example, a system to be implemented and/or mounted in vehicle 100.

In one example, radar device 101 may be implemented as part of an autonomous vehicle system, an automated driving system, an assisted vehicle system, a driver assistance and/or support system, and/or the like.

For example, radar device 101 may be installed in vehicle 100 for detection of nearby objects, e.g., for autonomous driving.

In some demonstrative aspects, radar device 101 may be configured to detect targets in a vicinity of vehicle 100, e.g., in a far vicinity and/or a near vicinity, for example, using RF and analog chains, capacitor structures, large spiral transformers and/or any other electronic or electrical elements, e.g., as described below.

In one example, radar device 101 may be mounted onto, placed, e.g., directly, onto, or attached to, vehicle 100.

In some demonstrative aspects, vehicle 100 may include a plurality of radar devices 101. For example, radar device 101 may be implemented by a plurality of radar units, which may be at a plurality of locations, e.g., around vehicle 100. In other aspects, vehicle 100 may include a single radar device 101.

In some demonstrative aspects, vehicle 100 may include a plurality of radar devices 101, which may be configured to cover a field of view of 360 degrees around vehicle 100.

In other aspects, vehicle 100 may include any other suitable count, arrangement, and/or configuration of radar devices and/or units, which may be suitable to cover any other field of view, e.g., a field of view of less than 360 degrees.

In some demonstrative aspects, radar device 101 may be implemented as a component in a suite of sensors used for driver assistance and/or autonomous vehicles, for example, due to the ability of radar to operate in nearly all-weather conditions.

In some demonstrative aspects, radar device 101 may be configured to support autonomous vehicle usage, e.g., as described below.

In one example, radar device 101 may determine a class, a location, an orientation, a velocity, an intention, a perceptional understanding of the environment, and/or any other information corresponding to an object in the environment.

In another example, radar device 101 may be configured to determine one or more parameters and/or information for one or more operations and/or tasks, e.g., path planning, and/or any other tasks.

In some demonstrative aspects, radar device 101 may be configured to map a scene by measuring targets' echoes (reflectivity) and discriminating them, for example, mainly in range, velocity, azimuth and/or elevation, e.g., as described below.

In some demonstrative aspects, radar device 101 may be configured to detect, and/or sense, one or more objects, which are located in a vicinity, e.g., a far vicinity and/or a near vicinity, of the vehicle 100, and to provide one or more parameters, attributes, and/or information with respect to the objects.

In some demonstrative aspects, the objects may include other vehicles; pedestrians; traffic signs; traffic lights; roads, road elements, e.g., a pavement-road meeting, an edge line; a hazard, e.g., a tire, a box, a crack in the road surface; and/or the like.

In some demonstrative aspects, the one or more parameters, attributes and/or information with respect to the object may include a range of the objects from the vehicle 100, an angle of the object with respect to the vehicle 100, a location of the object with respect to the vehicle 100, a relative speed of the object with respect to vehicle 100, and/or the like.

In some demonstrative aspects, radar device 101 may include a Multiple Input Multiple Output (MIMO) radar device 101, e.g., as described below. In one example, the MIMO radar device may be configured to utilize "spatial filtering" processing, for example, beamforming and/or any other mechanism, for one or both of Transmit (Tx) signals and/or Receive (Rx) signals.

Some demonstrative aspects are described below with respect to a radar device, e.g., radar device 101, implemented as a MIMO radar. However, in other aspects, radar device 101 may be implemented as any other type of radar utilizing a plurality of antenna elements, e.g., a Single Input Multiple Output (SIMO) radar or a Multiple Input Single output (MISO) radar.

Some demonstrative aspects may be implemented with respect to a radar device, e.g., radar device 101, implemented as a MIMO radar, e.g., as described below. However, in other aspects, radar device 101 may be implemented as any other type of radar, for example, an Electronic Beam Steering radar, a Synthetic Aperture Radar (SAR), adaptive and/or cognitive radars that change their transmission according to the environment and/or ego state, a reflect array radar, or the like.

In some demonstrative aspects, radar device 101 may include an antenna arrangement 102, a radar frontend 103 configured to communicate radar signals via the antenna arrangement 102, and a radar processor 104 configured to generate radar information based on the radar signals, e.g., as described below.

In some demonstrative aspects, radar processor 104 may be configured to process radar information of radar device 101 and/or to control one or more operations of radar device 101, e.g., as described below.

In some demonstrative aspects, radar processor 104 may include, or may be implemented, partially or entirely, by circuitry and/or logic, e.g., one or more processors including circuitry and/or logic, memory circuitry and/or logic. Additionally or alternatively, one or more functionalities of radar processor 104 may be implemented by logic, which may be executed by a machine and/or one or more processors, e.g., as described below.

In one example, radar processor 104 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In other aspects, radar processor 104 may be implemented by one or more additional or alternative elements of vehicle 100.

In some demonstrative aspects, radar frontend 103 may include, for example, one or more (radar) transmitters, and a one or more (radar) receivers, e.g., as described below.

In some demonstrative aspects, antenna arrangement 102 may include a plurality of antennas to communicate the radar signals. For example, antenna arrangement 102 may include multiple transmit antennas in the form of a transmit antenna array, and multiple receive antennas in the form of a receive antenna array. In another example, antenna arrangement 102 may include one or more antennas used both as transmit and receive antennas. In the latter case, the radar frontend 103, for example, may include a duplexer or a circulator, e.g., a circuit to separate transmitted signals from received signals.

In some demonstrative aspects, as shown in FIG. 1, the radar frontend 103 and the antenna arrangement 102 may be controlled, e.g., by radar processor 104, to transmit a radio transmit signal 105.

In some demonstrative aspects, as shown in FIG. 1, the radio transmit signal 105 may be reflected by an object 106, resulting in an echo 107.

In some demonstrative aspects, the radar device 101 may receive the echo 107, e.g., via antenna arrangement 102 and radar frontend 103, and radar processor 104 may generate radar information, for example, by calculating information about position, radial velocity (Doppler), and/or direction of the object 106, e.g., with respect to vehicle 100.

In some demonstrative aspects, radar processor 104 may be configured to provide the radar information to a vehicle controller 108 of the vehicle 100, e.g., for autonomous driving of the vehicle 100.

In some demonstrative aspects, at least part of the functionality of radar processor 104 may be implemented as part of vehicle controller 108. In other aspects, the functionality of radar processor 104 may be implemented as part of any other element of radar device 101 and/or vehicle 100. In other aspects, radar processor 104 may be implemented, as a separate part of, or as part of any other element of radar device 101 and/or vehicle 100.

In some demonstrative aspects, vehicle controller 108 may be configured to control one or more functionalities, modes of operation, components, devices, systems and/or elements of vehicle 100.

In some demonstrative aspects, vehicle controller 108 may be configured to control one or more vehicular systems of vehicle 100, e.g., as described below.

In some demonstrative aspects, the vehicular systems may include, for example, a steering system, a braking system, a driving system, and/or any other system of the vehicle 100.

In some demonstrative aspects, vehicle controller 108 may configured to control radar device 101, and/or to process one or parameters, attributes and/or information from radar device 101.

In some demonstrative aspects, vehicle controller 108 may be configured, for example, to control the vehicular systems of the vehicle 100, for example, based on radar information from radar device 101 and/or one or more other sensors of the vehicle 100, e.g., Light Detection and Ranging (LIDAR) sensors, camera sensors, and/or the like.

In one example, vehicle controller 108 may control the steering system, the braking system, and/or any other vehicular systems of vehicle 100, for example, based on the information from radar device 101, e.g., based on one or more objects detected by radar device 101.

In other aspects, vehicle controller 108 may be configured to control any other additional or alternative functionalities of vehicle 100.

Some demonstrative aspects are described herein with respect to a radar device 101 implemented in a vehicle, e.g., vehicle 100. In other aspects a radar device, e.g., radar device 101, may be implemented as part of any other element of a traffic system or network, for example, as part of a road infrastructure, and/or any other element of a traffic network or system. Other aspects may be implemented with respect to any other system, environment and/or apparatus, which may be implemented in any other object, environment, location, or place. For example, radar device 101 may be part of a non-vehicular device, which may be implemented, for example, in an indoor location, a stationary infrastructure outdoors, or any other location.

In some demonstrative aspects, radar device 101 may be configured to support security usage. In one example, radar device 101 may be configured to determine a nature of an operation, e.g., a human entry, an animal entry, an environmental movement, and the like, to identity a threat level of a detected event, and/or any other additional or alternative operations.

Some demonstrative aspects may be implemented with respect to any other additional or alternative devices and/or systems, for example, for a robot, e.g., as described below.

In other aspects, radar device 101 may be configured to support any other usages and/or applications.

Figure 2:
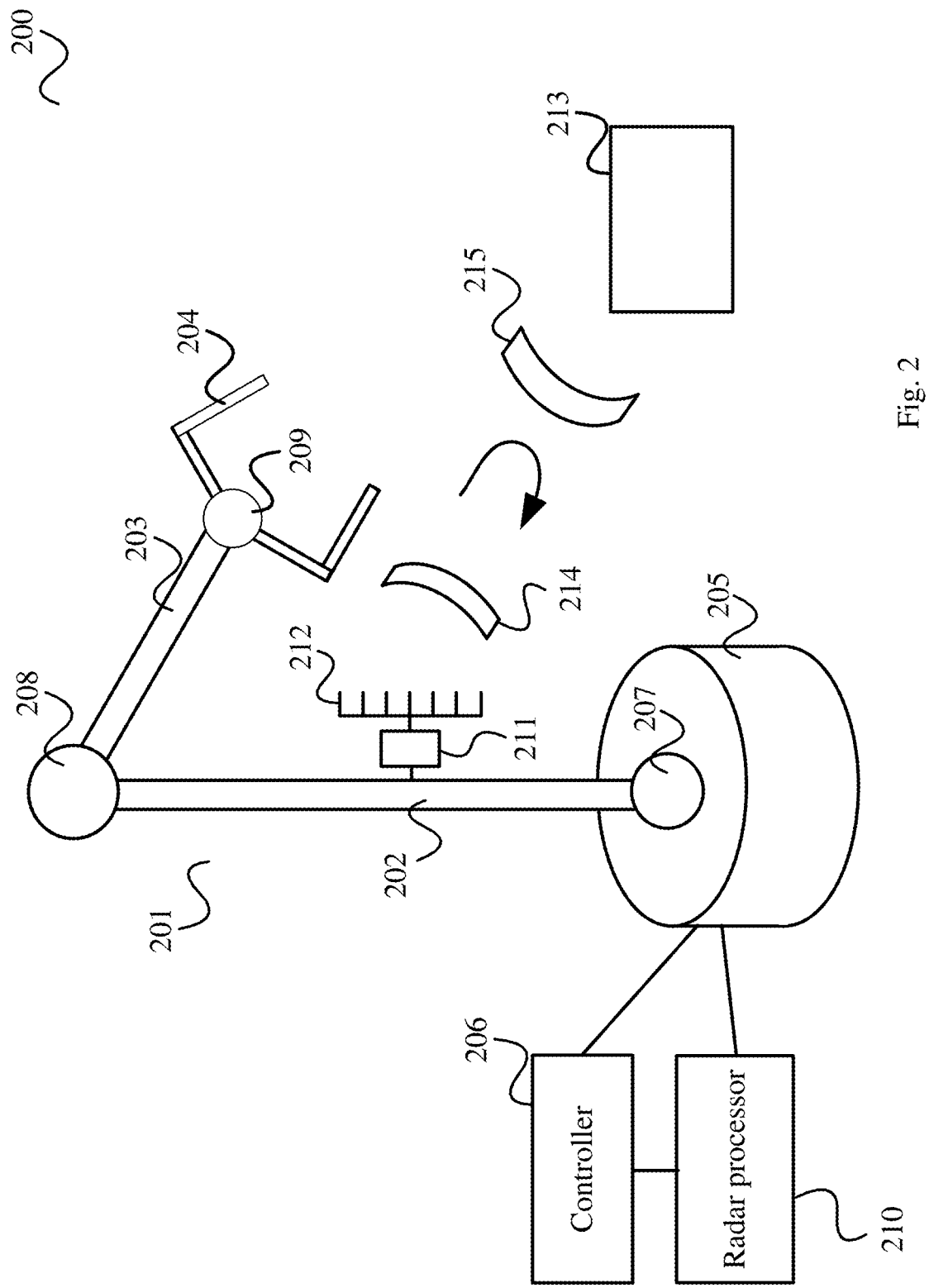
FIG. 2 is a schematic block diagram illustration of a robot implementing a radar, in accordance with some demonstrative aspects.

Reference is now made to FIG. 2, which schematically illustrates a block diagram of a robot 200 implementing a radar, in accordance with some demonstrative aspects.

In some demonstrative aspects, robot 200 may include a robot arm 201. The robot 200 may be implemented, for example, in a factory for handling an object 213, which may be, for example, a part that should be affixed to a product that is being manufactured. The robot arm 201 may include a plurality of movable members, for example, movable members 202, 203, 204, and a support 205. Moving the movable members 202, 203, and/or 204 of the robot arm 201, e.g., by actuation of associated motors, may allow physical interaction with the environment to carry out a task, e.g., handling the object 213.

In some demonstrative aspects, the robot arm 201 may include a plurality of joint elements, e.g., joint elements 207, 208, 209, which may connect, for example, the members 202, 203, and/or 204 with each other, and with the support 205. For example, a joint element 207, 208, 209 may have one or more joints, each of which may provide rotatable motion, e.g., rotational motion, and/or translatory motion, e.g., displacement, to associated members and/or motion of members relative to each other. The movement of the members 202, 203, 204 may be initiated by suitable actuators.

In some demonstrative aspects, the member furthest from the support 205, e.g., member 204, may also be referred to as the end-effector 204 and may include one or more tools, such as, a claw for gripping an object, a welding tool, or the like. Other members, e.g., members 202, 203, closer to the support 205, may be utilized to change the position of the end-effector 204, e.g., in three-dimensional space. For example, the robot arm 201 may be configured to function similarly to a human arm, e.g., possibly with a tool at its end.

In some demonstrative aspects, robot 200 may include a (robot) controller 206 configured to implement interaction with the environment, e.g., by controlling the robot arm's actuators, according to a control program, for example, in order to control the robot arm 201 according to the task to be performed.

In some demonstrative aspects, an actuator may include a component adapted to affect a mechanism or process in response to being driven. The actuator can respond to commands given by the controller 206 (the so-called activation) by performing mechanical movement. This means that an actuator, typically a motor (or electromechanical converter), may be configured to convert electrical energy into mechanical energy when it is activated (i.e. actuated).

In some demonstrative aspects, controller 206 may be in communication with a radar processor 210 of the robot 200.

In some demonstrative aspects, a radar fronted 211 and a radar antenna arrangement 212 may be coupled to the radar processor 210. In one example, radar fronted 211 and/or radar antenna arrangement 212 may be included, for example, as part of the robot arm 201.

In some demonstrative aspects, the radar frontend 211, the radar antenna arrangement 212 and the radar processor 210 may be operable as, and/or may be configured to form, a radar device. For example, antenna arrangement 212 may be configured to perform one or more functionalities of antenna arrangement 102 (FIG. 1), radar frontend 211 may be configured to perform one or more functionalities of radar frontend 103 (FIG. 1), and/or radar processor 210 may be configured to perform one or more functionalities of radar processor 104 (FIG. 1), e.g., as described above.

In some demonstrative aspects, for example, the radar frontend 211 and the antenna arrangement 212 may be controlled, e.g., by radar processor 210, to transmit a radio transmit signal 214.

In some demonstrative aspects, as shown in FIG. 2, the radio transmit signal 214 may be reflected by the object 213, resulting in an echo 215.

In some demonstrative aspects, the echo 215 may be received, e.g., via antenna arrangement 212 and radar frontend 211, and radar processor 210 may generate radar information, for example, by calculating information about position, speed (Doppler) and/or direction of the object 213, e.g., with respect to robot arm 201.

In some demonstrative aspects, radar processor 210 may be configured to provide the radar information to the robot controller 206 of the robot arm 201, e.g., to control robot arm 201. For example, robot controller 206 may be configured to control robot arm 201 based on the radar information, e.g., to grab the object 213 and/or to perform any other operation.

Figure 3:
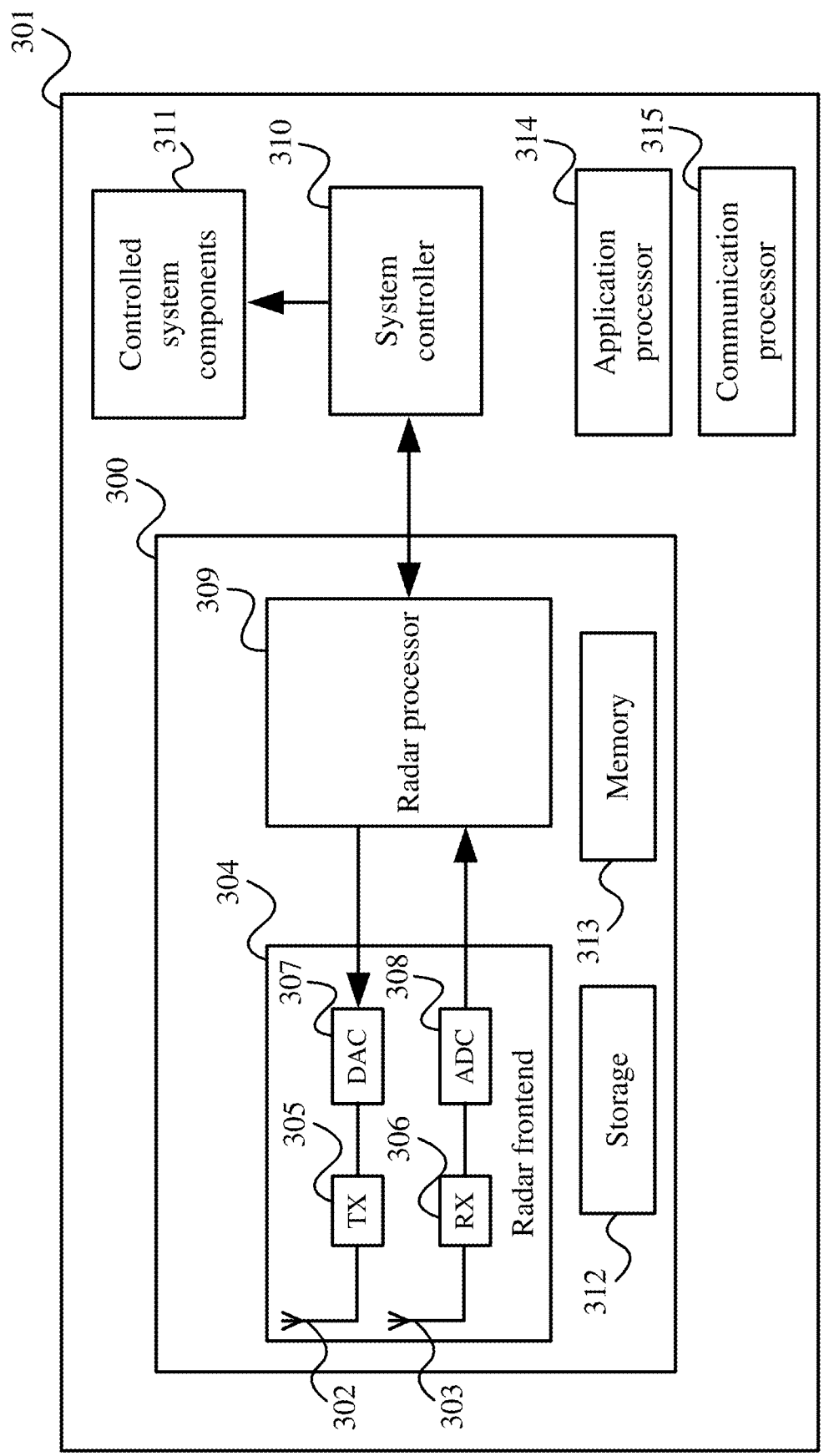
FIG. 3 is a schematic block diagram illustration of a radar apparatus, in accordance with some demonstrative aspects.

Reference is made to FIG. 3, which schematically illustrates a radar apparatus 300, in accordance with some demonstrative aspects.

In some demonstrative aspects, radar apparatus 300 may be implemented as part of a device or system 301, e.g., as described below.

For example, radar apparatus 300 may be implemented as part of, and/or may configured to perform one or more operations and/or functionalities of, the devices or systems described above with reference to FIG. 1 an/or FIG. 2. In other aspects, radar apparatus 300 may be implemented as part of any other device or system 301.

In some demonstrative aspects, radar device 300 may include an antenna arrangement, which may include one or more transmit antennas 302 and one or more receive antennas 303. In other aspects, any other antenna arrangement may be implemented.

In some demonstrative aspects, radar device 300 may include a radar frontend 304, and a radar processor 309.

In some demonstrative aspects, as shown in FIG. 3, the one or more transmit antennas 302 may be coupled with a transmitter (or transmitter arrangement) 305 of the radar frontend 304; and/or the one or more receive antennas 303 may be coupled with a receiver (or receiver arrangement) 306 of the radar frontend 304, e.g., as described below.

In some demonstrative aspects, transmitter 305 may include one or more elements, for example, an oscillator, a power amplifier and/or one or more other elements, configured to generate radio transmit signals to be transmitted by the one or more transmit antennas 302, e.g., as described below.

In some demonstrative aspects, for example, radar processor 309 may provide digital radar transmit data values to the radar frontend 304. For example, radar frontend 304 may include a Digital-to-Analog Converter (DAC) 307 to convert the digital radar transmit data values to an analog transmit signal. The transmitter 305 may convert the analog transmit signal to a radio transmit signal which is to be transmitted by transmit antennas 302.

In some demonstrative aspects, receiver 306 may include one or more elements, for example, one or more mixers, one or more filters and/or one or more other elements, configured to process, down-convert, radio signals received via the one or more receive antennas 303, e.g., as described below.

In some demonstrative aspects, for example, receiver 306 may convert a radio receive signal received via the one or more receive antennas 303 into an analog receive signal. The radar frontend 304 may include an Analog-to-Digital Converter (ADC) 308 to generate digital radar reception data values based on the analog receive signal. For example, radar frontend 304 may provide the digital radar reception data values to the radar processor 309.

In some demonstrative aspects, radar processor 309 may be configured to process the digital radar reception data values, for example, to detect one or more objects, e.g., in an environment of the device/system 301. This detection may include, for example, the determination of information including one or more of range, speed (Doppler), direction, and/or any other information, of one or more objects, e.g., with respect to the system 301.

In some demonstrative aspects, radar processor 309 may be configured to provide the determined radar information to a system controller 310 of device/system 301. For example, system controller 310 may include a vehicle controller, e.g., if device/system 301 includes a vehicular device/system, a robot controller, e.g., if device/system 301 includes a robot device/system, or any other type of controller for any other type of device/system 301.

In some demonstrative aspects, system controller 310 may be configured to control one or more controlled system components 311 of the system 301, e.g. a motor, a brake, steering, and the like, e.g. by one or more corresponding actuators.

In some demonstrative aspects, radar device 300 may include a storage 312 or a memory 313, e.g., to store information processed by radar 300, for example, digital radar reception data values being processed by the radar processor 309, radar information generated by radar processor 309, and/or any other data to be processed by radar processor 309.

In some demonstrative aspects, device/system 301 may include, for example, an application processor 314 and/or a communication processor 315, for example, to at least partially implement one or more functionalities of system controller 310 and/or to perform communication between system controller 310, radar device 300, the controlled system components 311, and/or one or more additional elements of device/system 301.

In some demonstrative aspects, radar device 300 may be configured to generate and transmit the radio transmit signal in a form, which may support determination of range, speed, and/or direction, e.g., as described below.

For example, a radio transmit signal of a radar may be configured to include a plurality of pulses. For example, a pulse transmission may include the transmission of short high-power bursts in combination with times during which the radar device listens for echoes.

For example, in order to more optimally support a highly dynamic situation, e.g., in an automotive scenario, a continuous wave (CW) may instead be used as the radio transmit signal. However, a continuous wave, e.g., with constant frequency, may support velocity determination, but may not allow range determination, e.g., due to the lack of a time mark that could allow distance calculation.

In some demonstrative aspects, radio transmit signal 105 (FIG. 1) may be transmitted according to technologies such as, for example, Frequency-Modulated continuous wave (FMCW) radar, Phase-Modulated Continuous Wave (PMCW) radar, Orthogonal Frequency Division Multiplexing (OFDM) radar, and/or any other type of radar technology, which may support determination of range, velocity, and/or direction, e.g., as described below.

Figure 4:
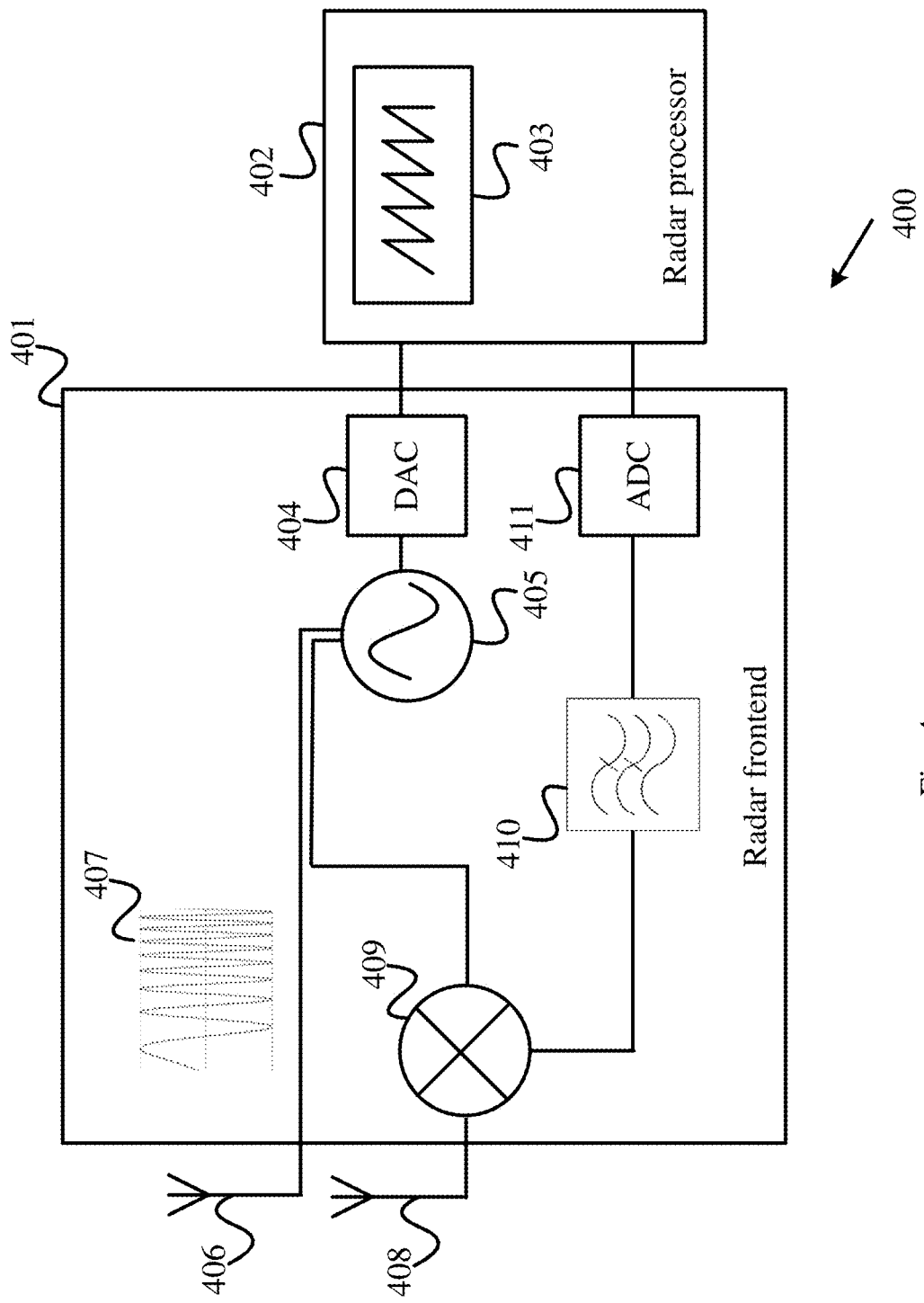
FIG. 4 is a schematic block diagram illustration of a Frequency-Modulated Continuous Wave (FMCW) radar apparatus, in accordance with some demonstrative aspects.

Reference is made to FIG. 4, which schematically illustrates a FMCW radar apparatus, in accordance with some demonstrative aspects.

In some demonstrative aspects, FMCW radar device 400 may include a radar frontend 401, and a radar processor 402. For example, radar frontend 304 (FIG. 3) may include one or more elements of, and/or may perform one or more operations and/or functionalities of, radar frontend 401; and/or radar processor 309 (FIG. 3) may include one or more elements of, and/or may perform one or more operations and/or functionalities of, radar processor 402.

In some demonstrative aspects, FMCW radar device 400 may be configured to communicate radio signals according to an FMCW radar technology, e.g., rather than sending a radio transmit signal with a constant frequency.

In some demonstrative aspects, radio frontend 401 may be configured to ramp up and reset the frequency of the transmit signal, e.g., periodically, for example, according to a saw tooth waveform 403. In other aspects, a triangle waveform, or any other suitable waveform may be used.

In some demonstrative aspects, for example, radar processor 402 may be configured to provide waveform 403 to frontend 401, for example, in digital form, e.g., as a sequence of digital values.

In some demonstrative aspects, radar frontend 401 may include a DAC 404 to convert waveform 403 into analog form, and to supply it to a voltage-controlled oscillator 405. For example, oscillator 405 may be configured to generate an output signal, which may be frequency-modulated in accordance with the waveform 403.

In some demonstrative aspects, oscillator 405 may be configured to generate the output signal including a radio transmit signal, which may be fed to and sent out by one or more transmit antennas 406.

In some demonstrative aspects, the radio transmit signal generated by the oscillator 405 may have the form of a sequence of chirps 407, which may be the result of the modulation of a sinusoid with the saw tooth waveform 403.

In one example, a chirp 407 may correspond to the sinusoid of the oscillator signal frequency-modulated by a "tooth" of the saw tooth waveform 403, e.g., from the minimum frequency to the maximum frequency.

In some demonstrative aspects, FMCW radar device 400 may include one or more receive antennas 408 to receive a radio receive signal. The radio receive signal may be based on the echo of the radio transmit signal, e.g., in addition to any noise, interference, or the like.

In some demonstrative aspects, radar frontend 401 may include a mixer 409 to mix the radio transmit signal with the radio receive signal into a mixed signal.

In some demonstrative aspects, radar frontend 401 may include a filter, e.g., a Low Pass Filter (LPF) 410, which may be configured to filter the mixed signal from the mixer 409 to provide a filtered signal. For example, radar frontend 401 may include an ADC 411 to convert the filtered signal into digital reception data values, which may be provided to radar processor 402. In another example, the filter 410 may be a digital filter, and the ADC 411 may be arranged between the mixer 409 and the filter 410.

In some demonstrative aspects, radar processor 402 may be configured to process the digital reception data values to provide radar information, for example, including range, speed (velocity/Doppler), and/or direction (AoA) information of one or more objects.

In some demonstrative aspects, radar processor 402 may be configured to perform a first Fast Fourier Transform (FFT) (also referred to as "range FFT") to extract a delay response, which may be used to extract range information, and/or a second FFT (also referred to as "Doppler FFT") to extract a Doppler shift response, which may be used to extract velocity information, from the digital reception data values.

In other aspects, any other additional or alternative methods may be utilized to extract range information. In one example, in a digital radar implementation, a correlation with the transmitted signal may be used, e.g., according to a matched filter implementation.

Figure 5:
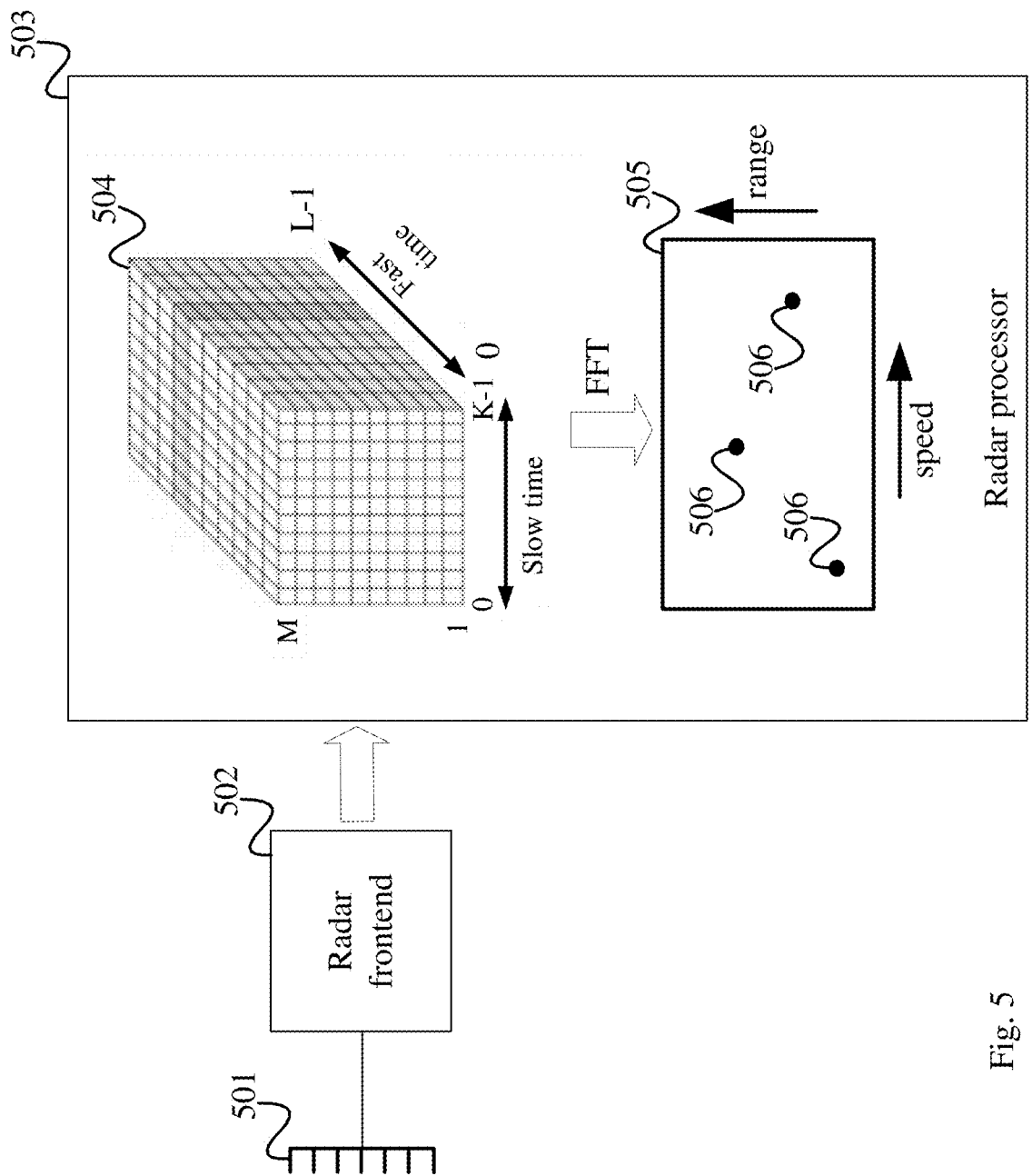
FIG. 5 is a schematic illustration of an extraction scheme, which may be implemented to extract range and speed (Doppler) estimations from digital reception radar data values, in accordance with some demonstrative aspects.

Reference is made to FIG. 5, which schematically illustrates an extraction scheme, which may be implemented to extract range and speed (Doppler) estimations from digital reception radar data values, in accordance with some demonstrative aspects. For example, radar processor 104 (FIG. 1), radar processor 210 (FIG. 2), radar processor 309 (FIG. 3), and/or radar processor 402 (FIG. 4), may be configured to extract range and/or speed (Doppler) estimations from digital reception radar data values according to one or more aspects of the extraction scheme of FIG. 5.

In some demonstrative aspects, as shown in FIG. 5, a radio receive signal, e.g., including echoes of a radio transmit signal, may be received by a receive antenna array 501. The radio receive signal may be processed by a radio radar frontend 502 to generate digital reception data values, e.g., as described above. The radio radar frontend 502 may provide the digital reception data values to a radar processor 503, which may process the digital reception data values to provide radar information, e.g., as described above.

In some demonstrative aspects, the digital reception data values may be represented in the form of a data cube 504. For example, the data cube 504 may include digitized samples of the radio receive signal, which is based on a radio signal transmitted from a transmit antenna and received by M receive antennas. In some demonstrative aspects, for example, with respect to a MIMO implementation, there may be multiple transmit antennas, and the number of samples may be multiplied accordingly.

In some demonstrative aspects, a layer of the data cube 504, for example, a horizontal layer of the data cube 504, may include samples of an antenna, e.g., a respective antenna of the M antennas.

In some demonstrative aspects, data cube 504 may include samples for K chirps. For example, as shown in FIG. 5, the samples of the chirps may be arranged in a so-called "slow time"-direction.

In some demonstrative aspects, the data cube 504 may include L samples, e.g., L=512 or any other number of samples, for a chirp, e.g., per each chirp. For example, as shown in FIG. 5, the samples per chirp may be arranged in a so-called "fast time"-direction of the data cube 504.

In some demonstrative aspects, radar processor 503 may be configured to process a plurality of samples, e.g., L samples collected for each chirp and for each antenna, by a first FFT. The first FFT may be performed, for example, for each chirp and each antenna, such that a result of the processing of the data cube 504 by the first FFT may again have three dimensions, and may have the size of the data cube 504 while including values for L range bins, e.g., instead of the values for the L sampling times.

In some demonstrative aspects, radar processor 503 may be configured to process the result of the processing of the data cube 504 by the first FFT, for example, by processing the result according to a second FFT along the chirps, e.g., for each antenna and for each range bin.

For example, the first FFT may be in the "fast time" direction, and the second FFT may be in the "slow time" direction.

In some demonstrative aspects, the result of the second FFT may provide, e.g., when aggregated over the antennas, a range/Doppler (R/D) map 505. The R/D map may have FFT peaks 506, for example, including peaks of FFT output values (in terms of absolute values) for certain range/speed combinations, e.g., for range/Doppler bins. For example, a range/Doppler bin may correspond to a range bin and a Doppler bin. For example, radar processor 503 may consider a peak as potentially corresponding to an object, e.g., of the range and speed corresponding to the peak's range bin and speed bin.

In some demonstrative aspects, the extraction scheme of FIG. 5 may be implemented for an FMCW radar, e.g., FMCW radar 400 (FIG. 4), as described above. In other aspects, the extraction scheme of FIG. 5 may be implemented for any other radar type. In one example, the radar processor 503 may be configured to determine a range/Doppler map 505 from digital reception data values of a PMCW radar, an OFDM radar, or any other radar technologies. For example, in adaptive or cognitive radar, the pulses in a frame, the waveform and/or modulation may be changed over time, e.g., according to the environment.

Referring back to FIG. 3, in some demonstrative aspects, receive antenna arrangement 303 may be implemented using a receive antenna array having a plurality of receive antennas (or receive antenna elements). For example, radar processor 309 may be configured to determine an angle of arrival of the received radio signal, e.g., echo 107 (FIG. 1) and/or echo 215 (FIG. 2). For example, radar processor 309 may be configured to determine a direction of a detected object, e.g., with respect to the device/system 301, for example, based on the angle of arrival of the received radio signal, e.g., as described below.

Figure 6:
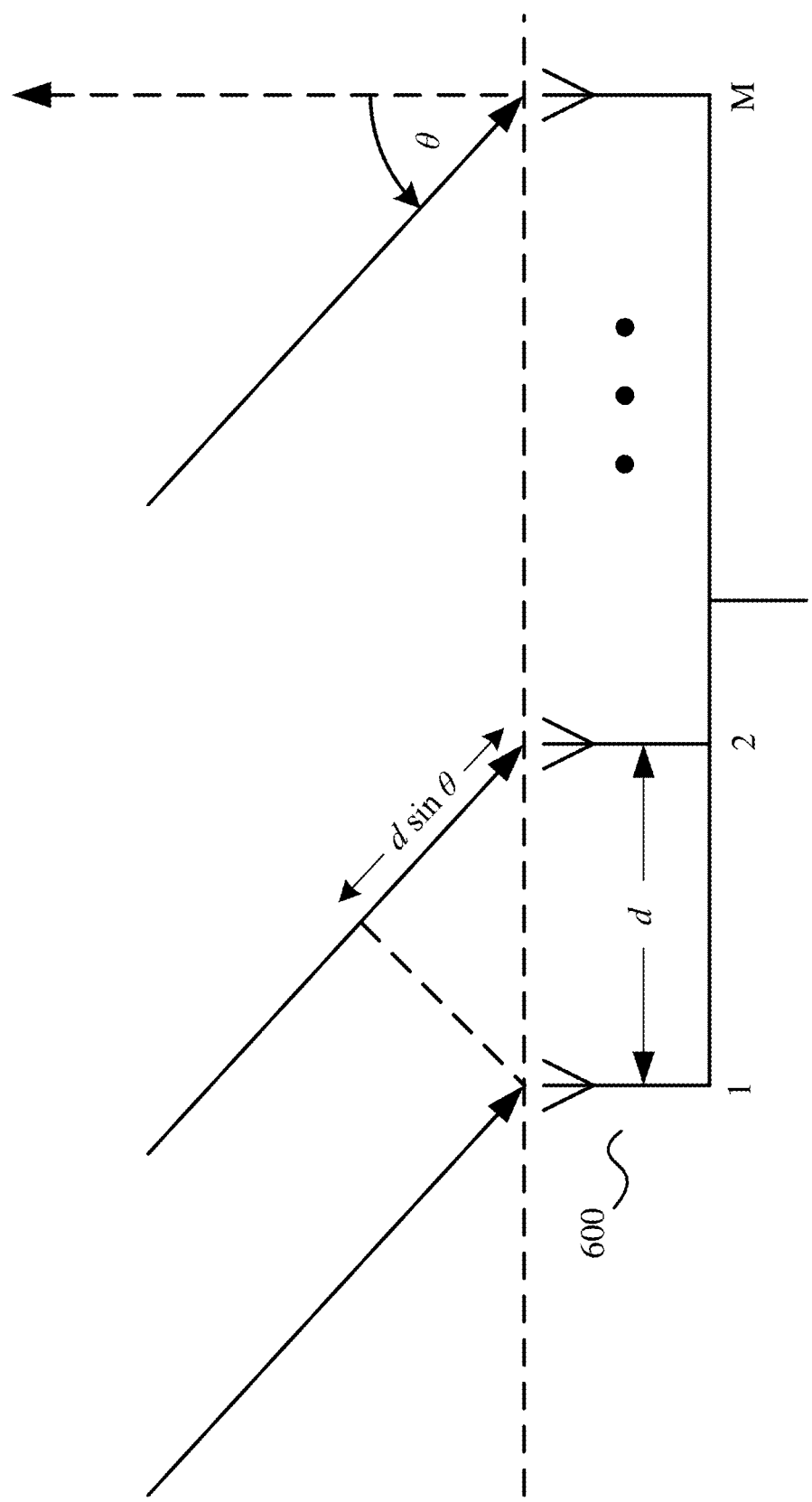
FIG. 6 is a schematic illustration of an angle-determination scheme, which may be implemented to determine Angle of Arrival (AoA) information based on an incoming radio signal received by a receive antenna array, in accordance with some demonstrative aspects.

Reference is made to FIG. 6, which schematically illustrates an angle-determination scheme, which may be implemented to determine Angle of Arrival (AoA) information based on an incoming radio signal received by a receive antenna array 600, in accordance with some demonstrative aspects.

FIG. 6 depicts an angle-determination scheme based on received signals at the receive antenna array. In some demonstrative aspects, for example, in a virtual MIMO array, the angle-determination may also be based on the signals transmitted by the array of Tx antennas.

FIG. 6 depicts a one-dimensional angle-determination scheme. Other multi-dimensional angle determination schemes, e.g., a two-dimensional scheme or a three-dimensional scheme, may be implemented.

In some demonstrative aspects, as shown in FIG. 6, the receive antenna array 600 may include M antennas (numbered, from left to right, 1 to M).

As shown by the arrows in FIG. 6, it is assumed that an echo is coming from an object located at the top left direction. Accordingly, the direction of the echo, e.g., the incoming radio signal, may be towards the bottom right. According to this example, the further to the left a receive antenna is located, the earlier it will receive a certain phase of the incoming radio signal.

For example, a phase difference, denoted $\Delta\varphi$, between two antennas of the receive antenna array 600 may be determined, e.g., as follows:

$$\Delta\varphi = \frac{2\pi}{\lambda} \cdot d \cdot \sin(\theta)$$

wherein $\lambda$ denotes a wavelength of the incoming radio signal, d denotes a distance between the two antennas, and $\theta$ denotes an angle of arrival of the incoming radio signal, e.g., with respect to a normal direction of the array.

In some demonstrative aspects, radar processor 309 (FIG. 3) may be configured to utilize this relationship between phase and angle of the incoming radio signal, for example, to determine the angle of arrival of echoes, for example by performing an FFT, e.g., a third FFT ("angular FFT") over the antennas.

In some demonstrative aspects, multiple transmit antennas, e.g., in the form of an antenna array having multiple transmit antennas, may be used, for example, to increase the spatial resolution, e.g., to provide high-resolution radar information. For example, a MIMO radar device may utilize a virtual MIMO radar antenna, which may be formed as a convolution of a plurality of transmit antennas convolved with a plurality of receive antennas.

Figure 7:
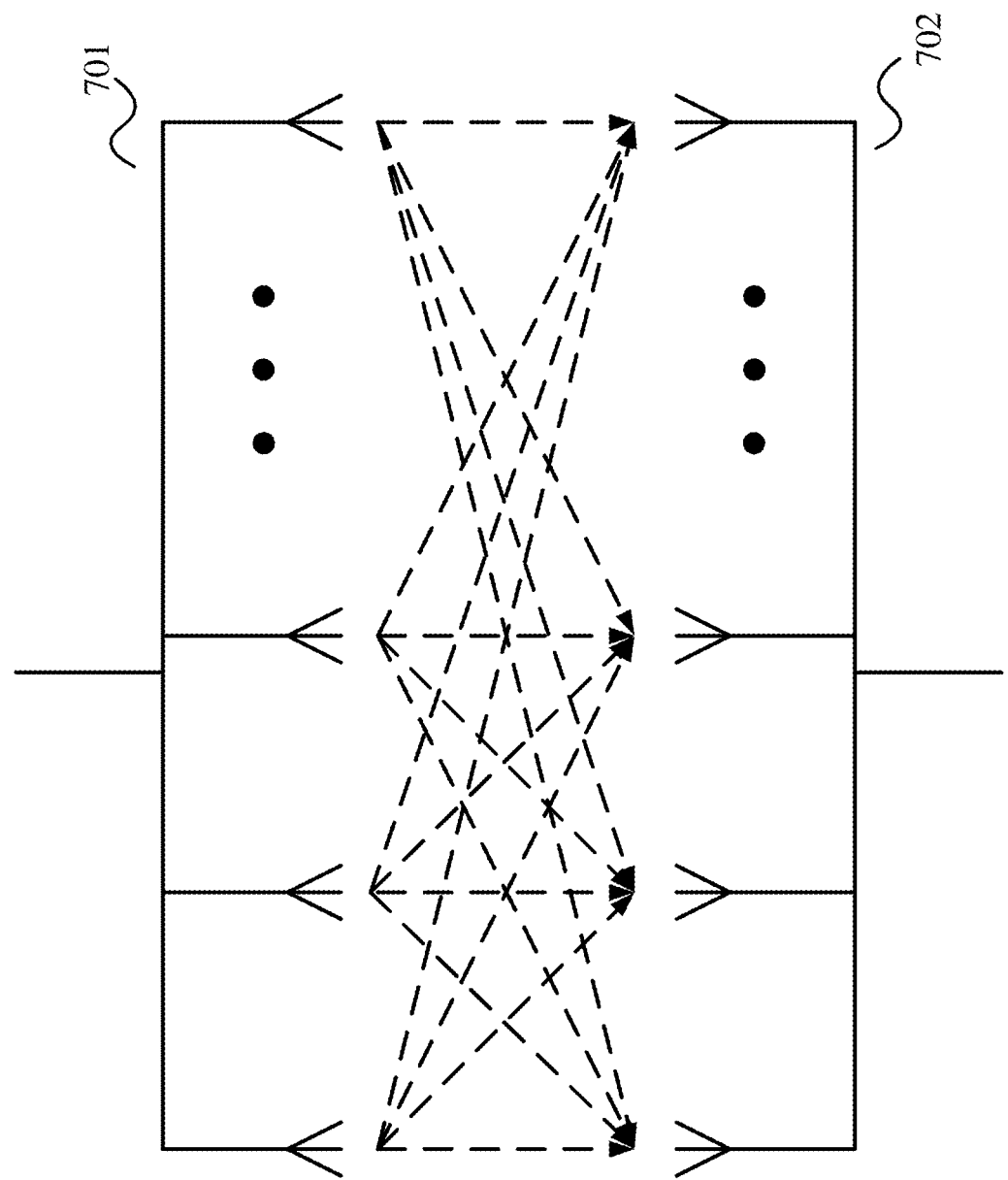
FIG. 7 is a schematic illustration of a Multiple-Input-Multiple-Output (MIMO) radar antenna scheme, which may be implemented based on a combination of Transmit (Tx) and Receive (Rx) antennas, in accordance with some demonstrative aspects.

Reference is made to FIG. 7, which schematically illustrates a MIMO radar antenna scheme, which may be implemented based on a combination of Transmit (Tx) and Receive (Rx) antennas, in accordance with some demonstrative aspects.

In some demonstrative aspects, as shown in FIG. 7, a radar MIMO arrangement may include a transmit antenna array 701 and a receive antenna array 702. For example, the one or more transmit antennas 302 (FIG. 3) may be implemented to include transmit antenna array 701, and/or the one or more receive antennas 303 (FIG. 3) may be implemented to include receive antenna array 702.

In some demonstrative aspects, antenna arrays including multiple antennas both for transmitting the radio transmit signals and for receiving echoes of the radio transmit signals, may be utilized to provide a plurality of virtual channels as illustrated by the dashed lines in FIG. 7. For example, a virtual channel may be formed as a convolution, for example, as a Kronecker product, between a transmit antenna and a receive antenna, e.g., representing a virtual steering vector of the MIMO radar.

In some demonstrative aspects, a transmit antenna, e.g., each transmit antenna, may be configured to send out an individual radio transmit signal, e.g., having a phase associated with the respective transmit antenna.

For example, an array of N transmit antennas and M receive antennas may be implemented to provide a virtual MIMO array of size N×M. For example, the virtual MIMO array may be formed according to the Kronecker product operation applied to the Tx and Rx steering vectors.

Figure 8:
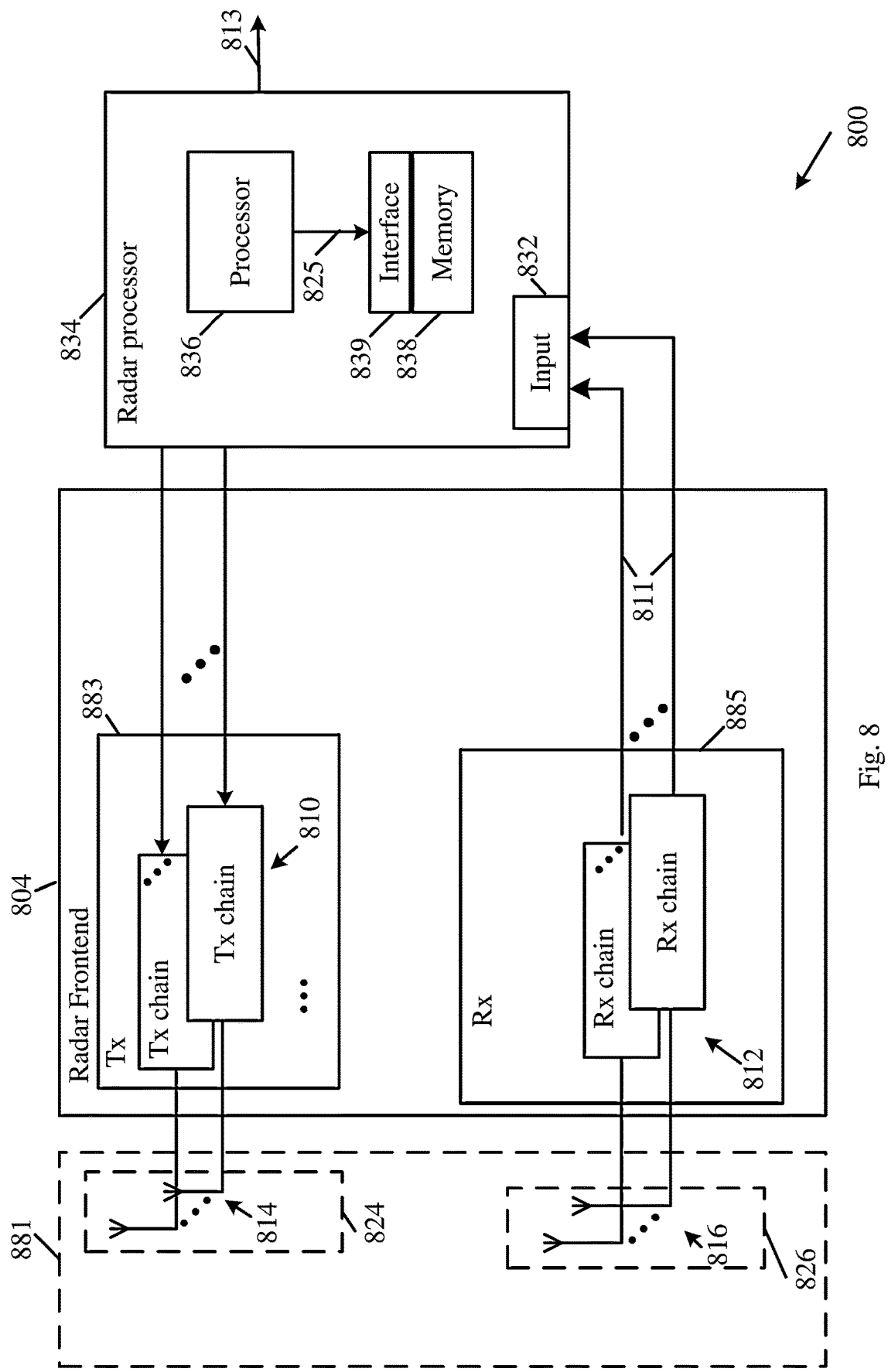
FIG. 8 is a schematic block diagram illustration of elements of a radar device including a radar frontend and a radar processor, in accordance with some demonstrative aspects.

FIG. 8 is a schematic block diagram illustration of elements of a radar device 800, in accordance with some demonstrative aspects. For example, radar device 101 (FIG. 1), radar device 300 (FIG. 3), and/or radar device 400 (FIG. 4), may include one or more elements of radar device 800, and/or may perform one or more operations and/or functionalities of radar device 800.

In some demonstrative aspects, as shown in FIG. 8, radar device 800 may include a radar frontend 804 and a radar processor 834. For example, radar frontend 103 (FIG. 1), radar frontend 211 (FIG. 1), radar frontend 304 (FIG. 3), radar frontend 401 (FIG. 4), and/or radar frontend 502 (FIG. 5), may include one or more elements of radar frontend 804, and/or may perform one or more operations and/or functionalities of radar frontend 804.

In some demonstrative aspects, radar frontend 804 may be implemented as part of a MIMO radar utilizing a MIMO radar antenna 881 including a plurality of Tx antennas 814 configured to transmit a plurality of Tx RF signals (also referred to as "Tx radar signals"); and a plurality of Rx antennas 816 configured to receive a plurality of Rx RF signals (also referred to as "Rx radar signals"), for example, based on the Tx radar signals, e.g., as described below.

In some demonstrative aspects, MIMO antenna array 881, antennas 814, and/or antennas 816 may include or may be part of any type of antennas suitable for transmitting and/or receiving radar signals. For example, MIMO antenna array 881, antennas 814, and/or antennas 816, may be implemented as part of any suitable configuration, structure, and/or arrangement of one or more antenna elements, components, units, assemblies, and/or arrays. For example, MIMO antenna array 881, antennas 814, and/or antennas 816, may be implemented as part of a phased array antenna, a multiple element antenna, a set of switched beam antennas, and/or the like. In some aspects, MIMO antenna array 881, antennas 814, and/or antennas 816, may be implemented to support transmit and receive functionalities using separate transmit and receive antenna elements. In some aspects, MIMO antenna array 881, antennas 814, and/or antennas 816, may be implemented to support transmit and receive functionalities using common and/or integrated transmit/receive elements.

In some demonstrative aspects, MIMO radar antenna 881 may include a rectangular MIMO antenna array, and/or curved array, e.g., shaped to fit a vehicle design. In other aspects, any other form, shape and/or arrangement of MIMO radar antenna 881 may be implemented.

In some demonstrative aspects, radar frontend 804 may include one or more radios configured to generate and transmit the Tx RF signals via Tx antennas 814; and/or to process the Rx RF signals received via Rx antennas 816, e.g., as described below.

In some demonstrative aspects, radar frontend 804 may include at least one transmitter (Tx) 883 including circuitry and/or logic configured to generate and/or transmit the Tx radar signals via Tx antennas 814.

In some demonstrative aspects, radar frontend 804 may include at least one receiver (Rx) 885 including circuitry and/or logic to receive and/or process the Rx radar signals received via Rx antennas 816, for example, based on the Tx radar signals.

In some demonstrative aspects, transmitter 883, and/or receiver 885 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, transmitter 883 may include a plurality of Tx chains 810 configured to generate and transmit the Tx RF signals via Tx antennas 814, e.g., respectively; and/or receiver 885 may include a plurality of Rx chains 812 configured to receive and process the Rx RF signals received via the Rx antennas 816, e.g., respectively.

In some demonstrative aspects, radar processor 834 may be configured to generate radar information 813, for example, based on the radar signals communicated by MIMO radar antenna 881, e.g., as described below. For example, radar processor 104 (FIG. 1), radar processor 210 (FIG. 2), radar processor 309 (FIG. 3), radar processor 402 (FIG. 4), and/or radar processor 503 (FIG. 5), may include one or more elements of radar processor 834, and/or may perform one or more operations and/or functionalities of radar processor 834.

In some demonstrative aspects, radar processor 834 may be configured to generate radar information 813, for example, based on radar Rx data 811 received from the plurality of Rx chains 812. For example, radar Rx data 811 may be based on the radar Rx signals received via the Rx antennas 816.

In some demonstrative aspects, radar processor 834 may include an input 832 to receive radar input data, e.g., including the radar Rx data 811 from the plurality of Rx chains 812.

In some demonstrative aspects, radar processor 834 may include, or may be implemented, partially or entirely, by circuitry and/or logic, e.g., one or more processors including circuitry and/or logic, memory circuitry and/or logic. Additionally or alternatively, one or more functionalities of radar processor 834 may be implemented by logic, which may be executed by a machine and/or one or more processors, e.g., as described below.

In some demonstrative aspects, radar processor 834 may include at least one processor 836, which may be configured, for example, to process the radar Rx data 811, and/or to perform one or more operations, methods, and/or algorithms.

In some demonstrative aspects, radar processor 834 may include at least one memory 838, e.g., coupled to the processor 836. For example, memory 838 may be configured to store data processed by radar processor 834. For example, memory 838 may store, e.g., at least temporarily, at least some of the information processed by the processor 836, and/or logic to be utilized by the processor 836.

In some demonstrative aspects, processor 836 may interface with memory 838, for example, via a memory interface 839.

In some demonstrative aspects, processor 836 may be configured to access memory 838, e.g., to write data to memory 838 and/or to read data from memory 838, for example, via memory interface 839.

In some demonstrative aspects, memory 838 may be configured to store at least part of the radar data, e.g., some of the radar Rx data or all of the radar Rx data, for example, for processing by processor 836, e.g., as described below.

In some demonstrative aspects, memory 838 may be configured to store processed data, which may be generated by processor 836, for example, during the process of generating the radar information 813, e.g., as described below.

In some demonstrative aspects, memory 838 may be configured to store range information and/or Doppler information, which may be generated by processor 836, for example, based on the radar Rx data, e.g., as described below. In one example, the range information and/or Doppler information may be determined based on a Cross-Correlation (XCORR) operation, which may be applied to the radar Rx data. Any other additional or alternative operation, algorithm and/or procedure may be utilized to generate the range information and/or Doppler information.

In some demonstrative aspects, memory 838 may be configured to store AoA information, which maybe generated by processor 836, for example, based on the radar Rx data, the range information and/or Doppler information, e.g., as described below. In one example, the AoA information may be determined based on an AoA estimation algorithm. Any other additional or alternative operation, algorithm and/or procedure may be utilized to generate the AoA information.

In some demonstrative aspects, radar processor 834 may be configured to generate the radar information 813 including one or more of range information, Doppler information, and/or AoA information, e.g., as described below.

In some demonstrative aspects, the radar information 813 may include Point Cloud 1 (PC1) information, for example, including raw point cloud estimations, e.g., Range, Radial Velocity, Azimuth and/or Elevation.

In some demonstrative aspects, the radar information 813 may include Point Cloud 2 (PC2) information, which may be generated, for example, based on the PC1 information. For example, the PC2 information may include clustering information, tracking information, e.g., tracking of probabilities and/or density functions, bounding box information, classification information, orientation information, and the like.

In some demonstrative aspects, radar processor 834 may be configured to generate the radar information 813 in the form of four Dimensional (4D) image information, e.g., a cube, which may represent 4D information corresponding to one or more detected targets.

In some demonstrative aspects, the 4D image information may include, for example, range values, e.g., based on the range information, velocity values, e.g., based on the Doppler information, azimuth values, e.g., based on azimuth AoA information, elevation values, e.g., based on elevation AoA information, and/or any other values.

In some demonstrative aspects, radar processor 834 may be configured to generate the radar information 813 in any other form, and/or including any other additional or alternative information.

In some demonstrative aspects, radar processor 834 may be configured to process the signals communicated via MIMO radar antenna 881 as signals of a virtual MIMO array formed by a convolution of the plurality of Rx antennas 816 and the plurality of Tx antennas 814.

In some demonstrative aspects, radar frontend 804 and/or radar processor 834 may be configured to utilize MIMO techniques, for example, to support a reduced physical array aperture, e.g., an array size, and/or utilizing a reduced number of antenna elements. For example, radar frontend 804 and/or radar processor 834 may be configured to transmit orthogonal signals via one or more Tx arrays 824 including a plurality of N elements, e.g., Tx antennas 814, and processing received signals via one or more Rx arrays 826 including a plurality of M elements, e.g., Rx antennas 816.

In some demonstrative aspects, utilizing the MIMO technique of transmission of the orthogonal signals from the Tx arrays 824 with N elements and processing the received signals in the Rx arrays 826 with M elements may be equivalent, e.g., under a far field approximation, to a radar utilizing transmission from one antenna and reception with N*M antennas. For example, radar frontend 804 and/or radar processor 834 may be configured to utilize MIMO antenna array 881 as a virtual array having an equivalent array size of N*M, which may define locations of virtual elements, for example, as a convolution of locations of physical elements, e.g., the antennas 814 and/or 816.

In some demonstrative aspects, a radar system may include a plurality of radar devices 800. For example, vehicle 100 (FIG. 1) may include a plurality of radar devices 800, e.g., as described below.

Figure 9:
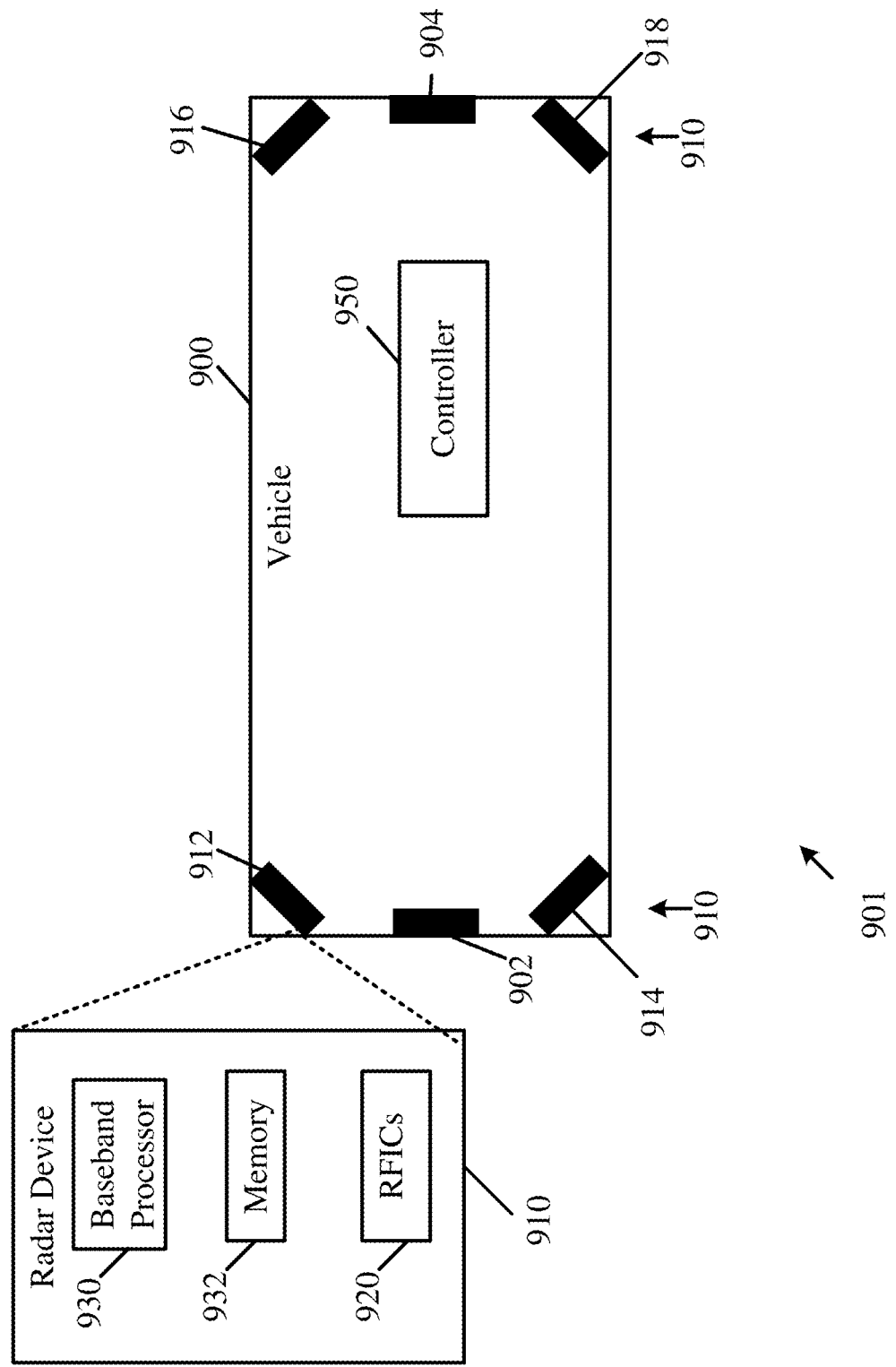
FIG. 9 is a schematic illustration of a radar system including a plurality of radar devices implemented in a vehicle, in accordance with some demonstrative aspects.

Reference is made to FIG. 9, which schematically illustrates a radar system 901 including a plurality of radar devices 910 implemented in a vehicle 900, in accordance with some demonstrative aspects.

In some demonstrative aspects, as shown in FIG. 9, the plurality of radar devices 910 may be located, for example, at a plurality of positions around vehicle 900, for example, to provide radar sensing at a large field of view around vehicle 900, e.g., as described below.

In some demonstrative aspects, as shown in FIG. 9, the plurality of radar devices 910 may include, for example, six radar devices 910, e.g., as described below.

In some demonstrative aspects, the plurality of radar devices 910 may be located, for example, at a plurality of positions around vehicle 900, which may be configured to support 360-degrees radar sensing, e.g., a field of view of 360 degrees surrounding the vehicle 900, e.g., as described below.

In one example, the 360-degrees radar sensing may allow to provide a radar-based view of substantially all surroundings around vehicle 900, e.g., as described below.

In other aspects, the plurality of radar devices 910 may include any other number of radar devices 910, e.g., less than six radar devices or more than six radar devices.

In other aspects, the plurality of radar devices 910 may be positioned at any other locations and/or according to any other arrangement, which may support radar sensing at any other field of view around vehicle 900, e.g., 360-degrees radar sensing or radar sensing of any other field of view.

In some demonstrative aspects, as shown in FIG. 9, vehicle 900 may include a first radar device 902, e.g., a front radar device, at a front-side of vehicle 900.

In some demonstrative aspects, as shown in FIG. 9, vehicle 900 may include a second radar device 904, e.g., a back radar device, at a back-side of vehicle 900.

In some demonstrative aspects, as shown in FIG. 9, vehicle 900 may include one or more of radar devices at one or more respective corners of vehicle 900. For example, vehicle 900 may include a first corner radar device 912 at a first corner of vehicle 900, a second corner radar device 914 at a second corner of vehicle 900, a third corner radar device 916 at a third corner of vehicle 900, and/or a fourth corner radar device 918 at a fourth corner of vehicle 900.

In some demonstrative aspects, vehicle 900 may include one, some, or all, of the plurality of radar devices 910 shown in FIG. 9. For example, vehicle 900 may include the front radar device 902 and/or back radar device 904.

In other aspects, vehicle 900 may include any other additional or alternative radar devices, for example, at any other additional or alternative positions around vehicle 900. In one example, vehicle 900 may include a side radar, e.g., on a side of vehicle 900.

In some demonstrative aspects, as shown in FIG. 9, vehicle 900 may include a radar system controller 950 configured to control one or more, e.g., some or all, of the radar devices 910.

In some demonstrative aspects, at least part of the functionality of radar system controller 950 may be implemented by a dedicated controller, e.g., a dedicated system controller or central controller, which may be separate from the radar devices 910, and may be configured to control some or all of the radar devices 910.

In some demonstrative aspects, at least part of the functionality of radar system controller 950 may be implemented as part of at least one radar device 910.

In some demonstrative aspects, at least part of the functionality of radar system controller 950 may be implemented by a radar processor of at least one of the radar devices 910. For example, radar processor 834 (FIG. 8) may include one or more elements of radar system controller 950, and/or may perform one or more operations and/or functionalities of radar system controller 950.

In some demonstrative aspects, at least part of the functionality of radar system controller 950 may be implemented by a system controller of vehicle 900. For example, vehicle controller 108 (FIG. 1) may include one or more elements of radar system controller 950, and/or may perform one or more operations and/or functionalities of radar system controller 950.

In other aspects, one or more functionalities of system controller 950 may be implemented as part of any other element of vehicle 900.

In some demonstrative aspects, as shown in FIG. 9, a radar device 910 of the plurality of radar devices 910, e.g., each radar device 910, may include a baseband processor 930 (also referred to as a "Baseband Processing Unit (BPU)"), which may be configured to control communication of radar signals by the radar device 910, and/or to process radar signals communicated by the radar device 910. For example, baseband processor 930 may include one or more elements of radar processor 834 (FIG. 8), and/or may perform one or more operations and/or functionalities of radar processor 834 (FIG. 8).

In some demonstrative aspects, baseband processor 930 may include one or more components and/or elements configured for digital processing of radar signals communicated by the radar device 910, e.g., as described below.

In some demonstrative aspects, baseband processor 930 may include one or more FFT engines, matrix multiplication engines, DSP processors, and/or any other additional or alternative baseband, e.g., digital, processing components.

In some demonstrative aspects, as shown in FIG. 9, radar device 910 may include a memory 932, which may be configured to store data processed by, and/or to be processed by, baseband processor 910. For example, memory 932 may include one or more elements of memory 838 (FIG. 8), and/or may perform one or more operations and/or functionalities of memory 838 (FIG. 8).

In some demonstrative aspects, memory 932 may include an internal memory, and/or an interface to one or more external memories, e.g., an external Double Data Rate (DDR) memory, and/or any other type of memory.

In some demonstrative aspects, as shown in FIG. 9, radar device 910 may include one or more RF units, e.g., in the form of one or more RF Integrated Chips (RFICs) 920, which may be configured to communicate radar signals, e.g., as described below.

For example, an RFIC 920 may include one or more elements of front-end 804 (FIG. 8), and/or may perform one or more operations and/or functionalities of front-end 804 (FIG. 8).

In some demonstrative aspects, the plurality of RFICs 920 may be operable to form a radar antenna array including one or more Tx antenna arrays and one or more Rx antenna arrays.

For example, the plurality of RFICs 920 may be operable to form MIMO radar antenna 881 (FIG. 8) including Tx arrays 824 (FIG. 8), and/or Rx arrays 826 (FIG. 8).

Referring back to FIG. 8, in some demonstrative aspects, radar processor 834 may be configured to generate the radar information 813 including range information, Doppler information, and/or AoA information, for example, based on radar Rx data 811, e.g., as described below.

In some demonstrative aspects, the radar information 813 may provide information of one or more targets, for example, in the form of a list of targets, for example, in four dimensions or any other number of dimensions, e.g., including some or all of, the range, Doppler (velocity), elevation, and/or azimuth dimensions.

In some demonstrative aspects, the radar Rx data 811 may be provided in the form of a raw radar frame. For example, the raw radar frame may include a 4D-cube including radar Rx samples corresponding to the four dimensions.

In some demonstrative aspects, a frame size of the raw radar frame may depend on one or more parameters. For example, the frame size may depend on one or more of the number of Tx antennas, e.g., the count of Tx antennas 814; the number of Rx antennas, e.g., the count of Rx antennas 816; a receive/transmit duration, e.g., a duration of the radar Tx signals and/or a duration of receiving the radar Rx signals; and/or a sampling bandwidth (BW), e.g., a sampling rate and/or a sample data size, and/or one or more other parameters.

In some demonstrative aspects, radar processor 834 may perform one or more processing stages and/or operations, which may be based on processing information of the radar frame, e.g., based on part of the radar frame or on the entire radar frame, e.g., as described below.

In some demonstrative aspects, radar processor 834 may perform one or more processing stages and/or operations, for example, according to a processing order, e.g., as described below.

In some demonstrative aspects, the processing order may include performing range processing, Doppler (velocity) processing, for example, following the range processing, and/or AoA processing, for example, following the Doppler processing, e.g., as described below.

In some demonstrative aspects, a stage, e.g., each stage, of the processing stages may provide its part of a processing gain. Accordingly, in a first stage, e.g., the range processing, a Signal to Noise Ratio (SNR) of a radar signal may be low. For example, the SNR of the radar signal may improve in the further stages of the processing chain.

In some demonstrative aspects, the range processing may yield a range profile of an environment of radar device 800, for example, for each transmitted pulse, e.g., in the form of a fast time signal, for example, the "fast time" direction of the data cube 504 (FIG. 5).

In some demonstrative aspects, the range profile may be divided into a plurality of range bins. For example, the plurality of range bins may include samples of the range profile with constant range gaps. In other range-been scheme may be used.

In some demonstrative aspects, a range profile for an Rx channel may be obtained, for example, when utilizing a plurality of Rx channels.

In some demonstrative aspects, the Doppler processing may be performed for a specific range, e.g., a specific range bin, for example, while iterating over the range bins. For example, an input to the Doppler processing may include a vector of range samples from the specific range bin over the pulses, e.g., in the form of a slow time signal, for example, the "slow time" direction of the data cube 504 (FIG. 5).

In some demonstrative aspects, all range profiles, e.g., from all the pulses, may be stored in memory 838, for example, via memory interface 839, for example, to allow performing the Doppler processing.

In some demonstrative aspects, the AoA processing may be performed for a specific range-Doppler bin, for example, while iterating over the range-Doppler bins. For example, an input to the AoA processing may include samples of a full Virtual Array (VA) corresponding to the specific range-Doppler bin, for example, after the range processing and the Doppler processing.

In some demonstrative aspects, there may be a need to provide a technical solution to store the range profiles and/or the samples of the full VA, for example, in a memory, e.g., memory 838, in an efficient manner, e.g., as described below. For example, a memory size, which may be required to store all range profiles for all Rx channels and for multiple pulses, may be very large. For example, a radar device may be required to utilize a large local memory, e.g., an external Double Data Rate (DDR) memory, to store the range profiles and/or the samples of the full VA.

In some demonstrative aspects, there may be one or more disadvantages, inefficiencies, and/or technical problems, for example, when processing a large amount of data and/or using a large local memory to store the data, e.g., as described below.

In one example, using a memory with very large memory size may increase a complexity of a radar system.

In another example, using a memory with very large memory size may increase a system latency, e.g., as DDR memory may have an access Bandwidth (BW) limitation.

In another example, using a memory with a large memory size may increase a cost and/or a power consumption of a radar system, e.g., as DDE/SRAM memories may be expensive in area, cost, and/or at power consumption.

In another example, using a memory with a large memory size to store the large amount of data may complicate layout and/or productization of a radar system, e.g., as handling the large amount of data may require fast and large Network-on-Chip (NoC) implementations.

In one example, an effective number of bits required to represent each sample of data may increase, for example, as the processing gain of each stage increases. For example, the increase in the bit number for each sample may result, for example, in a huge inflation of the data to be stored in the local memory, e.g., SRAM or DRAM.

For example, a radar device implementing a VA antenna having 2250 elements, a BW of 250 MHZ, 256 chirps, a supported range of 300 meters (m), and a bit sample size of 20 bits (b) per sample, may result in data of a 4D cube data for range processing having a data size of about 720 MB raw data.

In another example, the bit sample size for the Doppler processing, e.g., after the range processing, may increase, for example, to 30 b per sample, e.g., as the processing gain may increase, which may result with a greater size of data to be stored, e.g., about 1 GB of data.

In another example, the bit sample size for the AoA processing, e.g., after the Doppler processing, may increase to about 40 b per sample, e.g., to reach a required dynamic range across the entire 4D cube. For example, the bit sample size may result with a higher size of data to be stored, e.g., about 1.5 GB of data. This size of data may require using several DDR PHYs, which may increase an area, a power consumption, and/or a cost of a solution, which may be very expensive.

In some demonstrative aspects, radar device 800 may be configured to compress radar values to be stored in memory 838 and/or to decompress compressed radar values retrieved from memory 838, for example, according to a radar information compression scheme, e.g., as described below.

In some demonstrative aspects, the radar information compression scheme may be implemented to support a technical solution to reduce a size of a memory, e.g., memory 838, for storage of radar data for one or more of the processing stages of the radar processing scheme, e.g., as described below.

In some demonstrative aspects, the radar information compression scheme may be implemented to support a technical solution, which may utilize one or more specific and/or special characteristics of a radar processing pipe of a radar system, e.g., radar system 800, for example, to compress radar values corresponding to the radar processing pipe, e.g., as described below.

In some demonstrative aspects, the radar information compression scheme may be implemented to support a technical solution, which may utilize expected radar data statistical characteristics, e.g., the special characteristic and/or the nature of received signal statistics, for example, to compress the radar values corresponding to the radar processing pipe, e.g., as described below.

In some demonstrative aspects, the radar information compression scheme may be implemented according to a technical solution, which may be aware of a processing path location, e.g., in order to efficiently compress the radar values. For example, the radar information compression scheme may be implemented to support to a technical solution to efficiently compress the radar values, for example, with low memory area, low power consumption, and/or improved effectively. For example, the radar information compression scheme may be implemented to support to a technical solution to allow easy data transfer and/or analysis, for example, by Hardware (HW) accelerators.

In some demonstrative aspects, the radar information compression scheme may be implemented to support a technical solution, which may be suitable for radar systems, in which different dimensions may be processed in different steps, for example, while providing a proper design for each dimension, e.g., as described below.

In one example, a first radar compression design may be configured for the range processing, which may be based on radar data streaming from RF. In another example, a second radar compression design may be configured for the Doppler processing, which may "jump" between chirps.

In some demonstrative aspects, the radar information compression scheme may be configured to utilize a proper system design for a processing stage, e.g., for each stage. This implementation may be different, for example, from a native Huffman coding, which may use a variable size of each word, and may work in big blocks of data. For example, implementing the native Huffman coding, e.g., without a proper system design taking into account the characteristics of the radar processing stage, may result in large overhead for memory access, which may result in an inefficient or even irrelevant compression.

In some demonstrative aspects, the radar information compression scheme may be implemented to support a technical solution for radar systems, e.g., SW defined radar systems, which may process and consume large amount of data in a high BW, e.g., as described below.

In some demonstrative aspects, the radar information compression scheme may be implemented to support a technical solution, which may be suitable for real time, and/or high BW compute radar systems, e.g., compared to other methods.

In some demonstrative aspects, the radar information compression scheme may be implemented to support a technical solution, which may use similarity of statistics among the samples for a processed radar domain, e.g., for each processed radar domain, for example, while taking into account unique characteristics of the radar system and/or raw data input for the processed radar domain, e.g., as described below.

In some demonstrative aspects, the radar information compression scheme may be implemented to support a technical solution for a range bin, e.g., for each range bin, within a VA, for example, to compress data within the range bin, for example, based on similar statistics for many samples in the same range bin. For example, the similar statistics for the range bin may result with a redundancy, which may achieve high compress ratios, e.g., as described below.

In some demonstrative aspects, the radar information compression scheme may be implemented to support a technical solution for grouping samples for a range bin, e.g., for each range bin, for example, from all Rx channels, and compressing the samples for all Rx channels together, e.g., as described below.

In some demonstrative aspects, the radar information compression scheme may be implemented to support a technical solution, which may include performing one or more operations for a range bin, e.g., as described below.

In some demonstrative aspects, the one or more operations for the range bin may include estimating an SNR level of radar samples in the range bin, normalizing the radar samples, and/or performing adaptive quantization, for example, according to the SNR level for the range bin, e.g., as described below.

In one example, low-SNR range bins may be assigned with a smaller number of bits for quantization, while high-SNR range bins may be assigned with an increased number of bits for quantization, e.g., as described below.

In some demonstrative aspects, a lossless bit-coding, e.g. Huffman coding or any other coding scheme, may be optionally applied, for example, after the adaptive quantization, for example, for more efficient storage of the quantized signals, e.g., as described below.

In some demonstrative aspects, the radar information compression scheme may be implemented to support a technical solution to fit a compression method to a "target detection based system", e.g., an imaging radar.

For example, the radar information compression scheme may be configured to support a technical solution to optimize redundancy of output data, which may result in a compression factor of about between 5-10 or any other compression ratio, for range data of the range processing, and/or a compress factor of about 10 or any other compression ratio for AoA data for the AoA processing, e.g., as described below.

In some demonstrative aspects, the radar information compression scheme may be implemented to support a technical solution, which may be suitable for, and/or provide improved performance, for radar systems, e.g., compared to other compression methods. For example, the radar information compression scheme may be implemented in a suitable location of a radar processing chain, and/or may take advantage of radar data characteristic, for example, in one or more processing stages, e.g., each of the processing stages, in the radar processing chain, e.g., as described below.

In some demonstrative aspects, the radar information compression scheme may be implemented to support a technical solution for compressing radar information corresponding to range processing. For example, a compress engine may be implemented on one or more radar compute steps, e.g., on each radar compute step, for example, based on a dimension of processing. For example, the compress engine may be configured to decide for a sample, e.g., for each sample, if the sample may be considered as a "noise" sample, or as an "energy" sample, for example, based on a current Range Bin (RB) in process,.

In one example, most samples in the 4D cube data may be noise samples. According to this example, identifying and/or classifying samples of a range bin as noise samples may allow to assign to these samples a reduced number of bits. For example, assigning the reduced number of bits to the identified noise samples may support a technical solution to save a large amount of data, for example, with a relatively high compress ration, for example, a compress ratio between 5-9, e.g., as described below.

In some demonstrative aspects, the radar information compression scheme may be implemented to support a technical solution for compressing radar information corresponding to AoA processing, for example, in order to reduce signal degradation, for example, while keeping a low bit count.

For example, the radar information compression scheme may be configured to compress an AoA map, e.g., each AoA map, and data type within the AoA map, for example, using different statistical methods, for example, based on unique statistics of the AoA map, e.g., as described below.

In some demonstrative aspects, the radar information compression scheme may be configured to consider noise levels, energy levels, and/or target information, for example, in a specific AoA map, e.g., as described below.

In some demonstrative aspects, the radar information compression scheme may be implemented to support a technical solution using noise level characteristics and/or energy levels of an AoA map including a number of targets, for example, to compress the radar samples. For example, a section, e.g., each section, of the AoA map may be compressed with a most suitable method, e.g., based on noise versus real targets. For example, this solution may achieve a compression ratio, which may be better than other methods, for example, by a factor of 10, e.g., as described below.

In some demonstrative aspects, the radar information compression scheme may be implemented to support a technical solution, which may remove or reduce a system dependency of a radar system on external DDRs. For example, this solution may reduce cost, power consumption, and/or area of the radar system, e.g., as described below.

In one example, the radar information compression scheme may be implemented to support a technical solution, which may allow using even a single DDR for storing radar information of the range processing and/or the AoA processing, e.g., instead of multiple DDRs, e.g., four DDRs, which may otherwise be required. For example, an implementation using a single DDR may support a reduction of 15 mm^3 in chip size, and/or ~5 W in power consumption.

For example, a power consumption of compression blocks and/or decompression blocks may be minor compared to a power consumption of a DDR. For example, Standard Deviation (STD) statistics may be implemented using an autoregressive approach. e.g., using 2-4 multipliers; sample normalization may be implemented, e.g., using 2 multipliers; uniform quantization may be implemented, e.g., using bit rounding/truncation; and/or Huffman coding may be implemented, e.g., using a Look Up Table (LUT).

In some demonstrative aspects, the radar information compression scheme may be implemented to support a technical solution, which may allow to efficiently report and/or to store raw imaging radar data after the AoA processing. For example, the ability to efficiently report and/or store raw imaging radar data after AoA processing may allow using a distributed architecture, e.g., with lean processing on an RF head and/or using a strong central processor, which may handle multiple RF heads.

In one example, the ability to efficiently report and/or store the raw imaging radar data after the AoA processing may support a technical solution to apply advanced algorithms in post processing/offline phases, and/or to use the raw imaging radar data at higher processing layers in the radar processing pipeline. For example, reporting and/or storing the raw imaging radar data may not be feasible, for example, without implementation of the radar information compression scheme. For example, the reported and/or stored data may be limited only to detection data, e.g., without implementation of the radar information compression scheme.

In some demonstrative aspects, processor 836 may be configured to generate compressed radar information 825, for example, by compressing radar values in a plurality of data bins of at least one radar processing dimension, e.g., as described below.

In some demonstrative aspects, the at least one radar processing dimension may include a range dimension, e.g., as described below.

In one example, processor 836 may be configured to generate compressed radar information 825 by compressing radar values in a plurality of data bins of a range processing dimension, e.g., as described below.

In another example, processor 836 may be configured to generate compressed radar information 825 by compressing radar values in a plurality of data bins of a two or more radar processing dimensions, e.g., wherein one of the radar processing dimensions is a range processing dimension. For example, processor 836 may be configured to generate compressed radar information 825 by compressing radar values in a plurality of data bins of a range-Doppler processing dimension, e.g., as described below.

In some demonstrative aspects, processor 836 may be configured to generate the compressed radar information 825, for example, by quantizing a plurality of normalized values corresponding to the radar values in the plurality of data bins, e.g., as described below.

In some demonstrative aspects, a normalized value corresponding to a radar value in a data bin may be based on a normalization of the radar value with respect to a plurality of radar values in the data bin, e.g., as described below.

In some demonstrative aspects, processor 836 may be configured to store the compressed radar information 825 in the memory 838, e.g., as described below. For example, processor 836 may be configured utilize interface 839 to access the memory 838, e.g., to store the compressed radar information 825 in the memory 838.

In some demonstrative aspects, processor 836 may be configured to generate the compressed radar information 825, for example, by compressing a plurality of quantized values according to a bit-coding scheme, e.g., as described below.

In some demonstrative aspects, the plurality of quantized values may be based, for example, on quantization of the plurality of normalized values, e.g., as described below.

In some demonstrative aspects, processor 836 may be configured to quantize normalized values corresponding to the data bin, for example, based on a quantization bit-width corresponding to the data bin, e.g., as described below.

In some demonstrative aspects, the quantization bit-width corresponding to the data bin may be based, for example, on statistical information corresponding to the plurality of radar values in the data bin, e.g., as described below.

In some demonstrative aspects, the statistical information corresponding to the plurality of radar values in the data bin may be based, for example, on a maximal value of the plurality of radar values in the data bin, a mean value of the plurality of radar values in the data bin, and/or a distribution of the plurality of radar values in the data bin, e.g., as described below.

In some demonstrative aspects, the statistical information corresponding to the plurality of radar values in the data bin may be based, for example, on a Signal to Noise Ratio (SNR) corresponding to the plurality of radar values in the data bin, and/or a Peak to Average Power Ratio (PAPR) corresponding to the plurality of radar values in the data bin, e.g., as described below.

In other aspects, the statistical information corresponding to the plurality of radar values in the data bin may include, and/or may be based on, any other additional or alternative information corresponding to the plurality of radar values in the data bin.

In some demonstrative aspects, processor 836 may be configured to utilize different quantization schemes, for example, on a per data bin basis, e.g., as described below.

In some demonstrative aspects, processor 836 may be configured to quantize first normalized values corresponding to a first data bin, for example, based on a first quantization bit-width corresponding to the first data bin, e.g., as described below.

In some demonstrative aspects, the first quantization bit-width may be based on statistical information corresponding to a plurality of radar values in the first data bin, e.g., as described below.

In some demonstrative aspects, processor 836 may be configured to quantize second normalized values corresponding to a second data bin, for example, based on a second quantization bit-width corresponding to the second data bin, e.g., as described below.

In some demonstrative aspects, the second quantization bit-width may be based on statistical information corresponding to a plurality of radar values in the second data bin, e.g., as described below.

In some demonstrative aspects, the first quantization bit-width may be different from the second quantization bit-width, e.g., as described below.

In some demonstrative aspects, processor 836 may be configured to utilize different quantization schemes, for example, on a per radar frame basis, e.g., as described below.

In some demonstrative aspects, processor 836 may be configured to quantize first normalized values corresponding to a data bin and to a first radar frame, for example, based on a first quantization bit-width corresponding to the data bin and to the first radar frame, e.g., as described below.

In some demonstrative aspects, the first quantization bit-width may be based on statistical information corresponding to a plurality of radar values in the data bin in the first radar frame, e.g., as described below.

In some demonstrative aspects, processor 836 may be configured to quantize second normalized values corresponding to the data bin and to a second radar frame, e.g., after the first radar frame, for example, based on a second quantization bit-width corresponding to the data bin and to the second radar frame, e.g., as described below.

In some demonstrative aspects, the second quantization bit-width may be based on statistical information corresponding to a plurality of radar values in the data bin in the second radar frame, e.g., as described below.

In some demonstrative aspects, the first quantization bit-width, e.g., corresponding to the data bin and to the first radar frame, may be different from the second quantization bit-width, e.g., corresponding to the data bin and to the second radar frame, e.g., as described below.

In some demonstrative aspects, processor 836 may be configured to quantize all normalized values corresponding to a same data bin, for example, based on a same quantization bit-width, e.g., as described below.

In some demonstrative aspects, processor 836 may be configured to quantize normalized values corresponding to a data bin, for example, based on a selected quantization scheme corresponding to the data bin, e.g., as described below.

In some demonstrative aspects, processor 836 may be configured to determine a selected quantization scheme from a plurality of quantization schemes, for example, based on the statistical information corresponding to the plurality of radar values in the data bin, e.g., as described below.

In some demonstrative aspects, processor 836 may be configured to quantize the normalized values corresponding to the data bin, for example, according to the selected quantization scheme, e.g., as described below.

In some demonstrative aspects, the plurality of quantization schemes may include a uniform quantization scheme, e.g., as described below.

In some demonstrative aspects, the plurality of quantization schemes may include a non-uniform quantization scheme, e.g., as described below.

In other aspects, the plurality of quantization schemes may include any other additional and/or alternative quantization scheme.

In some demonstrative aspects, processor 836 may be configured to select a quantization scheme for quantizing the radar data, for example, on a per data bin basis, e.g., as described below.

In some demonstrative aspects, processor 836 may be configured to quantize first normalized values corresponding to a first data bin, for example, based on a first quantization scheme corresponding to the first data bin, e.g., as described below.

In some demonstrative aspects, the first quantization scheme may be based on statistical information corresponding to a plurality of radar values in the first data bin, e.g., as described below.

In some demonstrative aspects, processor 836 may be configured to quantize second normalized values corresponding to a second data bin, for example, based on a second quantization scheme corresponding to the second data bin, e.g., as described below.

In some demonstrative aspects, the second quantization scheme may be based on statistical information corresponding to a plurality of radar values in the second data bin, e.g., as described below.

In some demonstrative aspects, the first quantization scheme may be different from the second quantization scheme, e.g., as described below.

In some demonstrative aspects, the statistical information corresponding to a plurality of radar values in a data bin may be based, for example, on a maximal value of the plurality of radar values in the data bin, a mean value of the plurality of radar values in the data bin, and/or a distribution of the plurality of radar values in the data bin, e.g., as described below.

In some demonstrative aspects, the statistical information corresponding to the plurality of radar values in the data bin may be based, for example, on an SNR corresponding to the plurality of radar values in the data bin, and/or a PAPR corresponding to the plurality of radar values in the data bin, e.g., as described below.

In other aspects, the statistical information corresponding to the plurality of radar values in the data bin may include, and/or may be based on, any other additional or alternative information corresponding to the plurality of radar values in the data bin.

In some demonstrative aspects, processor 836 may be configured to select a quantization scheme for quantizing the radar data, for example, on a per radar frame, e.g., as described below.

In some demonstrative aspects, processor 836 may be configured to quantize first normalized values corresponding to a data bin and to a first radar frame, for example, based on a first quantization scheme corresponding to the data bin and to the first radar frame, e.g., as described below.

In some demonstrative aspects, the first quantization scheme may be based on statistical information corresponding to a plurality of radar values in the data bin in the first radar frame, e.g., as described below.

In some demonstrative aspects, processor 836 may be configured to quantize second normalized values corresponding to the data bin and to a second radar frame after the first radar frame, for example, based on a second quantization scheme corresponding to the data bin and to the second radar frame, e.g., as described below.

In some demonstrative aspects, the second quantization scheme may be based on statistical information corresponding to a plurality of radar values in the data bin in the second radar frame, e.g., as described below.

In some demonstrative aspects, the first quantization scheme, e.g., corresponding to the data bin and to the first radar frame, may be different from the second quantization scheme, for example, corresponding to the data bin and to the second radar frame, e.g., as described below.

In some demonstrative aspects, processor 836 may be configured to quantize all normalized radar values corresponding to a same data bin, for example, according to a same quantization scheme, e.g., as described below.

In some demonstrative aspects, processor 836 may be configured to generate a plurality of dithered values for a data bin, for example, by dithering a plurality of radar values in the data bin, e.g., as described below.

In some demonstrative aspects, processor 836 may be configured to determine the normalized value corresponding to a radar value in the data bin, for example, based on a normalization of a dithered value corresponding to the radar value with respect to the plurality of dithered values of the radar bin, e.g., as described below.

In some demonstrative aspects, the radar values in the plurality of data bins may include radar values in a plurality of range bins, e.g., as described below.

In some demonstrative aspects, the plurality of radar values in the data bin may include a plurality of radar values belonging to a same range bin, e.g., as described below.

In some demonstrative aspects, the radar values may include radar values post range processing and/or prior to Doppler processing, e.g., as described below.

In some demonstrative aspects, the radar values in the plurality of data bins may include radar values in a plurality of range-Doppler (RD) bins, e.g., as described below.

In some demonstrative aspects, the plurality of radar values in a data bin may include a plurality of radar values belonging to a same range-Doppler bin, e.g., as described below.

In some demonstrative aspects, the radar values may include radar values post the Doppler processing and/or prior to the AoA processing, e.g., as described below.

In other aspects, the radar values in the plurality of data bins may include radar values of any other additional or alternative type of bin, e.g., corresponding to any other additional or alternative radar processing stage.

Figure 10:
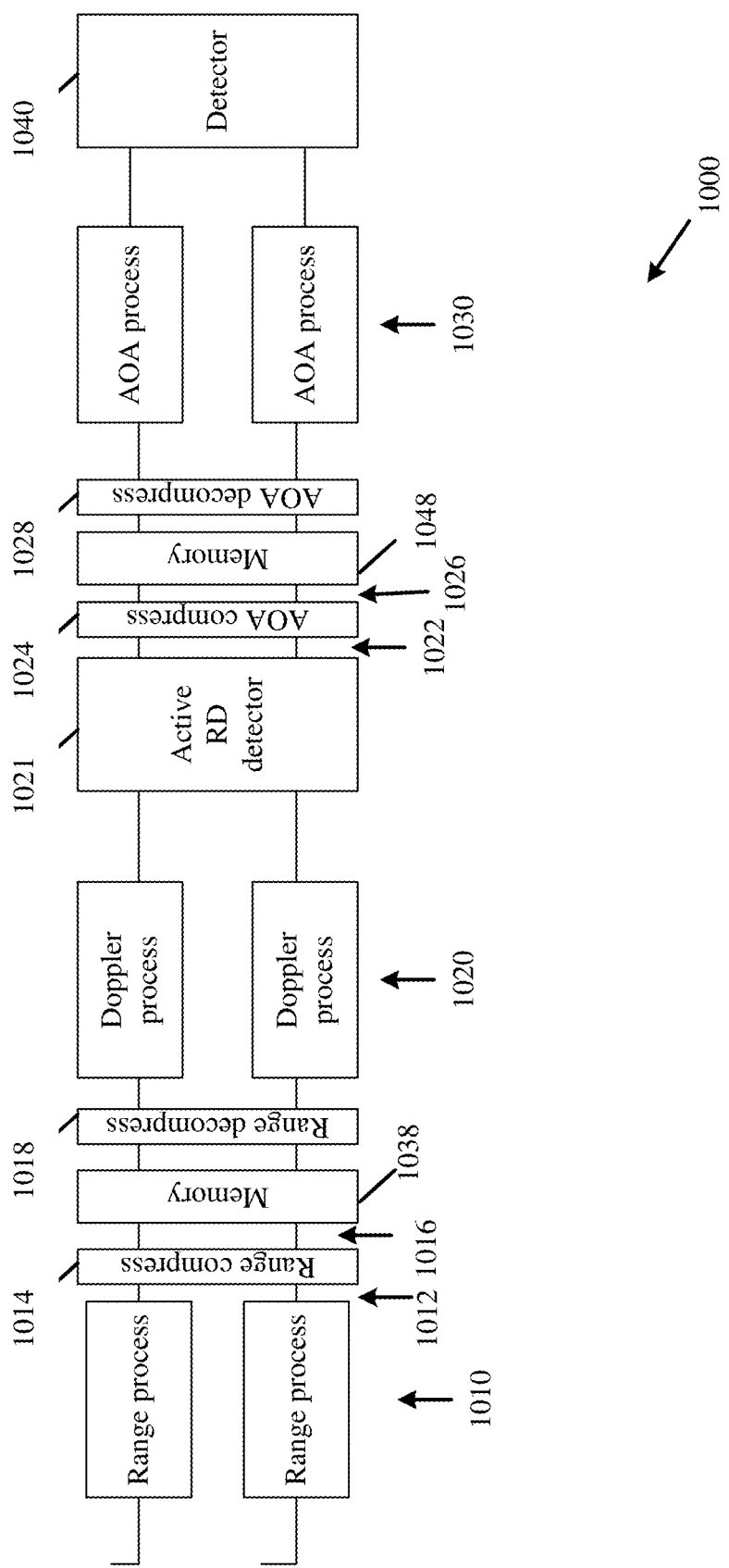
FIG. 10 is a schematic illustration of a radar processing scheme to process a plurality of radar values, in accordance with some demonstrative aspects.

Reference is made to FIG. 10, which schematically illustrates a radar processing scheme 1000, which may be configured to process a plurality of radar values, in accordance with some demonstrative aspects.

In one example, a processor, e.g., processor 836 (FIG. 8), may be configured to perform one or more operations and/or functionalities according to radar processing scheme 1000, for example, to process radar values in a plurality of data bins.

In some demonstrative aspects, as shown in FIG. 10, radar processing scheme 1000 may include a plurality of processes and/or stages. For example, radar processing scheme 1000 may include a range processing stage 1010, a Doppler (velocity) processing stage 1020, and/or an AoA processing stage 1030.

In some demonstrative aspects, as shown in FIG. 10, a processor, e.g., processor 836 (FIG. 8), may be configured to perform range-information compressing 1014, for example, to generate compressed range information 1016, for example, based on range values 1012 post the range processing 1010.

In some demonstrative aspects, as shown in FIG. 10, a processor, e.g., processor 836 (FIG. 8), may be configured to store the compressed range information 1016 in a memory 1038. For example, memory 838 (FIG. 8) may include one or more elements of memory 1038, and/or may perform one or more operations and/or functionalities of memory 1038.

In some demonstrative aspects, as shown in FIG. 10, a processor, e.g., processor 836 (FIG. 8) or another processor, may be configured to perform range-information decompressing 1018 to decompress the compressed range information 1016, for example, to be used for the Doppler processing 1020.

In some demonstrative aspects, as shown in FIG. 10, a processor, e.g., processor 836 (FIG. 8), may be configured to perform AoA-information compressing 1024 to generate compressed AoA information 1026, for example, based on range-Doppler (RD) values 1022, which may be generated post the Doppler processing 1020 and prior to the AoA processing 1030.

In some demonstrative aspects, as shown in FIG. 10, RD values 1022 may include RD values in a plurality of active range-Doppler bins, which may be detected by an active RD detector 1021, e.g., as described below.

In some demonstrative aspects, as shown in FIG. 10, a processor, e.g., processor 836 (FIG. 8), may be configured to store the compressed AoA information 1026 in a memory 1048. In one example, the memory 1048 may be implemented as part of memory 1038. In another example, the memory 1048 and the memory 1038 may be implemented as separate memories.

In some demonstrative aspects, as shown in FIG. 10, a processor, e.g., processor 836 (FIG. 8), may be configured to perform AoA decompressing 1028 of the compressed AoA information 1026, for example, to be used for the AoA processing 1030.

In some demonstrative aspects, as shown in FIG. 10, a detector 1040, e.g., processor 836 (FIG. 8), may be configured to detect targets, for example, based on an output of the AoA processing 1030.

In some demonstrative aspects, an amount of data processed by radar processing scheme 1000 may increase at each processing stage, e.g., until detector 1040, for example, due to the processing gain of radar processing scheme 1000.

In some demonstrative aspects, memory 1038 and/or memory 1048 may be implemented, for example, to maintain the data during processing of the data according to the radar processing scheme 1000.

In one example, memory 1038 and/or memory 1048 may include a DDR memory, for example, to support the size of the data. For example, as DDR memory may be relatively expensive, e.g., in terms of area, cost and/or power consumption, it may be advantageous to efficiently reduce, e.g., in real time, the amount of data to be stored in memory 1038 and/or memory 1048.

In some demonstrative aspects, a processor, e.g., processor 836 (FIG. 8), may be configured to compress radar values at one or more different stages of processing scheme 1000, e.g., as described below.

In one example, a processor, e.g., processor 836 (FIG. 8), may be configured to compress range values 1012, for example, after range processing 1020.

In another example, a processor, e.g., processor 836 (FIG. 8), may be configured to compress RD values 1022, for example, before AoA processing 1030.

In some demonstrative aspects, a processor, e.g., processor 836 (FIG. 8), may be configured utilize different compress methods for compressing the radar data along processing scheme 1000, for example, based on characteristics of the radar values, e.g., as described below.

in some demonstrative aspects, compressing the radar values in the different stages of processing scheme 1030 may support a technical solution to simplify a radar system, and/or to reduce an area and/or a cost of the radar system.

In some demonstrative aspects, the compressions during processing scheme 1030, may be implemented as an internal compression, which may be orthogonal to any other additional compress method, which may be placed, for example, at the end of the pipeline, e.g., after detector 1040, for example, based on a final report of point cloud information to one or more upper levels.

In some demonstrative aspects, the range compressing 1014 may be configured to compress a large portion of the radar data, e.g., substantially 100% of the radar data, e.g., the radar values 1012, and/or may support providing reduced data for the Doppler processing 1020.

In some demonstrative aspects, as shown in FIG. 10, the AoA compressing 1024 may compress a portion of the radar data, e.g., about 20% of the radar data, e.g., RD values 1022. For example, the radar data 1022 for the AoA compressing 1024 may have a higher processing gain and a higher computation load, e.g., about twice the number of bits per sample compared to the number of bits per sample of radar values 1012. Accordingly, a reduction of the data size in the AoA compressing 1024 may provide a technical solution to significantly reduce power consumption, area, and/or cost of a radar system.

Figure 11:
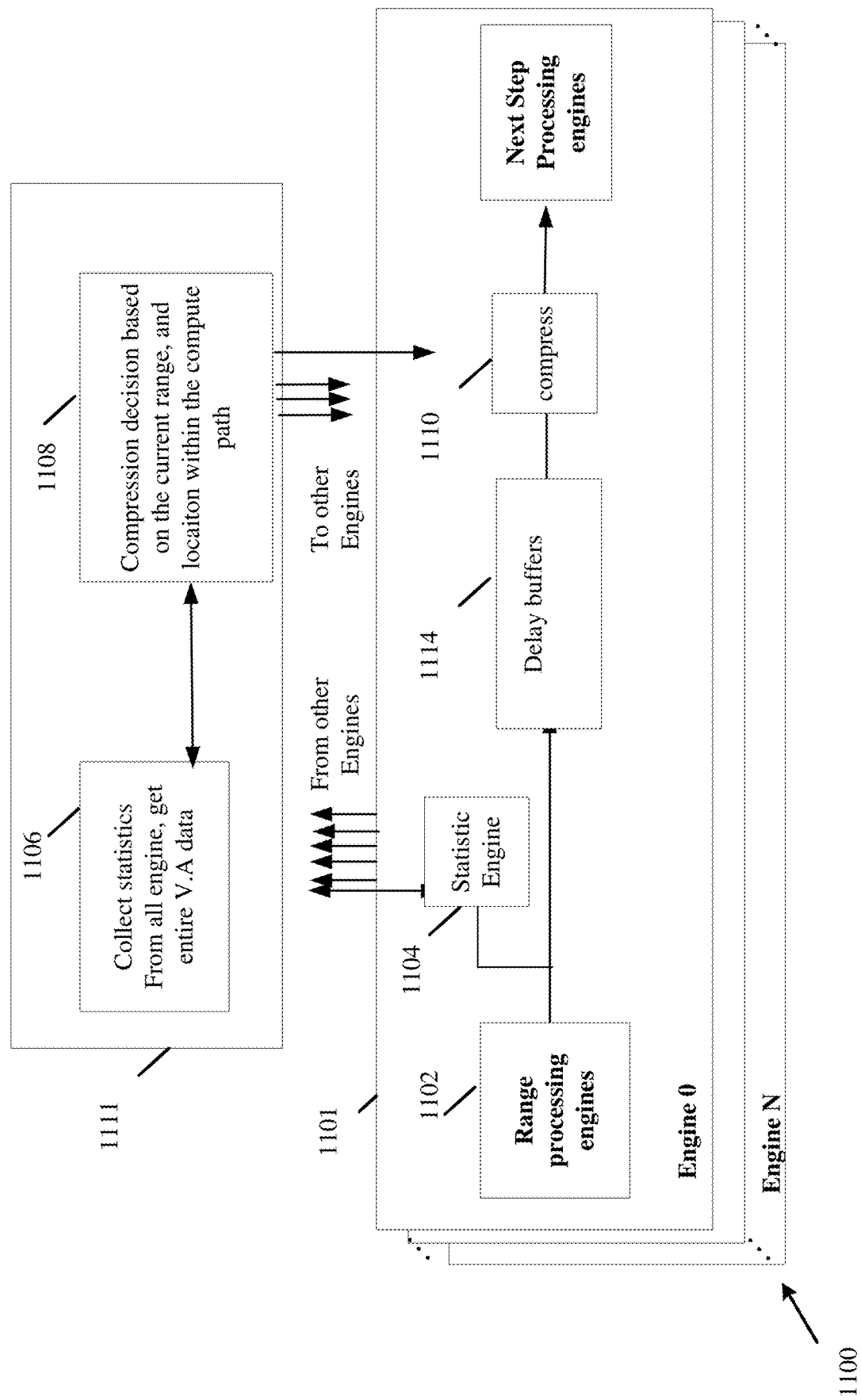
FIG. 11 is a schematic illustration of a range-data compression scheme to compress a plurality of range values, in accordance with some demonstrative aspects.

Reference is made to FIG. 11, which schematically illustrates a range-data compression scheme 1100, which may be configured to compress a plurality of range values, in accordance with some demonstrative aspects.

In one example, a processor, e.g., processor 836 (FIG. 8), may be configured to perform one or more operations and/or functionalities according to the range compression scheme 1100, for example, to compress radar values, e.g., radar values post range processing and prior to Doppler processing.

In some demonstrative aspects, as shown in FIG. 11, range-data compression scheme 1100 may utilize radar data from a plurality of engines 1101, denoted 1-N, for example, corresponding to a plurality of Rx channels of a radar device.

In some demonstrative aspects, an engine 1101 of the plurality of engines may include a range processing engine 1102 configured to generate range values corresponding to an Rx channel of the plurality of Rx channels.

In some demonstrative aspects, as shown in FIG. 11, the engine 1001 may include a statistic engine 1104, which may be configured to determine and/or collect statistics corresponding to the Rx channel.

In one example, statistic engine 1104 may include a plurality of statistic engine collectors, which may work in parallel, for example, based on an engine output of range processing engine 1102. For example, there may be a plurality of pipes in parallel in each engine 1102, e.g., corresponding to the plurality of statistic engine collectors, and/or there may be several range processing engines 1102, e.g., in parallel.

In some demonstrative aspects, as shown in FIG. 11, range processing scheme 1100 may include a compression controller 1111, which may be configured to determine a compress policy and/or scheme to be applied for compressing the range values processed by the engines 1101.

In some demonstrative aspects, the compress policy may include a selected quantization scheme and/or a quantization bit-width, e.g., as described below.

In one example, compression controller 1111 may be implemented, for example, as part of a controller, e.g., processor 834 (FIG. 8), and/or as part of a system controller, e.g., system controller 950 (FIG. 9). For example, processor 834 (FIG. 8) and/or system controller 950 (FIG. 9) may include one or more elements of compression controller 1111 and/or may perform one or more operations and/or functionalities of compression controller 1111.

In some demonstrative aspects, compression controller 1111 may include a statistic collector 1106, which may be configured to collect statistics from some or all Rx channels, e.g., from some or all the engines 1101. For example, compression controller 1111 may be configured to determine statistics corresponding to a VA corresponding to the plurality of Rx channels, for example, based on the statistics from some or all Rx channels.

In some demonstrative aspects, statistic collector 1106 may be configured to determine statistics for a data bin, e.g., a range bin, for example, based on statistics corresponding to the VA. For example, statistic collector 1106 may be configured to collect statistics from some or all engines 1101, e.g., in the VA domain of the entire radar, for example, to get real time and/or accurate statistics on a current range bin (RB).

In some demonstrative aspects, as shown in FIG. 11, compression controller 1111 may include a controller 1108, which may be configured to determine the compress policy, e.g., the selected quantization scheme and/or the quantization bit-width, to compress radar values corresponding to the data bin, e.g., the radar values from engines 1110 for the range bin.

In some demonstrative aspects, as shown in FIG. 11, engine 1101 may include a compressor 1110, which may be configured to compress the range values corresponding to the range bin, for example, according to the compress policy, e.g., the selected quantization scheme and/or the quantization bit-width, which may be selected by controller 1108. For example, processor 836 (FIG. 8) may include one or more elements of compressor 1110, and/or may perform one or more operations and/or functionalities of compressor 1110.

In some demonstrative aspects, compressor 1110 may perform the actual compression of the radar values, for example, based on a decision on the of the compress policy, which may be made by compression controller 1111. For example, compression controller 1111 may be configured to consider some or all, e.g., the entire statistics, from the engines 1101. For example, compression controller 1111 may be configured to determine the compress policy dynamically, e.g., based on changes in the entire statistics collected from engines 1101.

In some demonstrative aspects, as shown in FIG. 11, engine 1101 may optionally include one or more delay buffers 1114, e.g., one or more look ahead buffers or any other type of buffers. For example, delay buffers 1114 may be implemented to support collection of additional statistics, e.g., from statistic engine 1104, for example, before compressor 1110 applies the compression policy to the first samples.

In some demonstrative aspects, range compression scheme 1100 may be implemented between any two processing steps of radar processing scheme 1000 (FIG. 10). In one example, range compression scheme 1100 may be implemented between the range processing 1010 (FIG. 10) and Doppler processing 1020 (FIG. 10). In another example, range compression scheme 1100 may be implemented between the Doppler processing 1020 (FIG. 10) and the AoA processing 1030 (FIG. 10).

In some demonstrative aspects, the plurality of engines 1101 may be configured to provide to compression controller 1111 statistics corresponding to the Rx channel. For example, compression controller 1111 may use the statistics corresponding to the Rx channel, while taking into account a compute stage, a current RB, and aggregated knowledge of the type of the current radar values, e.g., noise or real data, to determine the compress policy.

In some demonstrative aspects, compressor 1110 may be configured to compress range values of the Rx channel, for example, according to the compress policy, e.g., using a required assigned number of quantization bits based on the compress policy.

In some demonstrative aspects, compression controller 1111 may determine the compress policy, e.g., per each radar value dynamically, for example, based on real data in each frame. For example, dynamically determining the compress policy may support a technical solution to support a dynamic and/or robust radar system with improved compress capabilities, which may save power and/or area.

In some demonstrative aspects, compression controller 1111 may be configured to determine, update, and/or change the compress policy based on one or more criteria. For example, compression controller 1111 may be configured to determine, update, and/or change the compression scheme every other sample, e.g., based on changes in statistics during the radar frame.

In some demonstrative aspects, determining the compress scheme, for example, based on changes in the statistics, may provide a technical solution, which may not expose range compression scheme 1100 to technical issues, e.g., which may occur due to changes during the frame, and/or due to interference. For example, determining the compress schemes, for example, based on the statistics, may provide a technical solution to assure that the proper amount of bits may be used for quantization, for example, even for changes during the frame and/or as a result of interference.

In some demonstrative aspects, statistic collector 1106 may be configured to collect statistics, which may be focused on an RB domain as a decision criteria, e.g., a main decision criteria, for classification of the radar values, e.g., as noise or as a real target.

In some demonstrative aspects, range processing scheme 1100 may be implemented, for example, in the Doppler domain, e.g., post the Doppler processing and prior to the AoA processing, for example, by adding a dimension and/or layer of detection in the Doppler domain, for example, to determine whether a sample is to be classified as a target or as noise.

In some demonstrative aspects, adding a level of classification and/or compression in the Doppler domain, e.g., in addition to or on top of the compression in the range domain, may support a technical solution to further compress the radar values, e.g., in addition to a huge value, which may be already achieved by the compression in the range domain.

Figure 12:
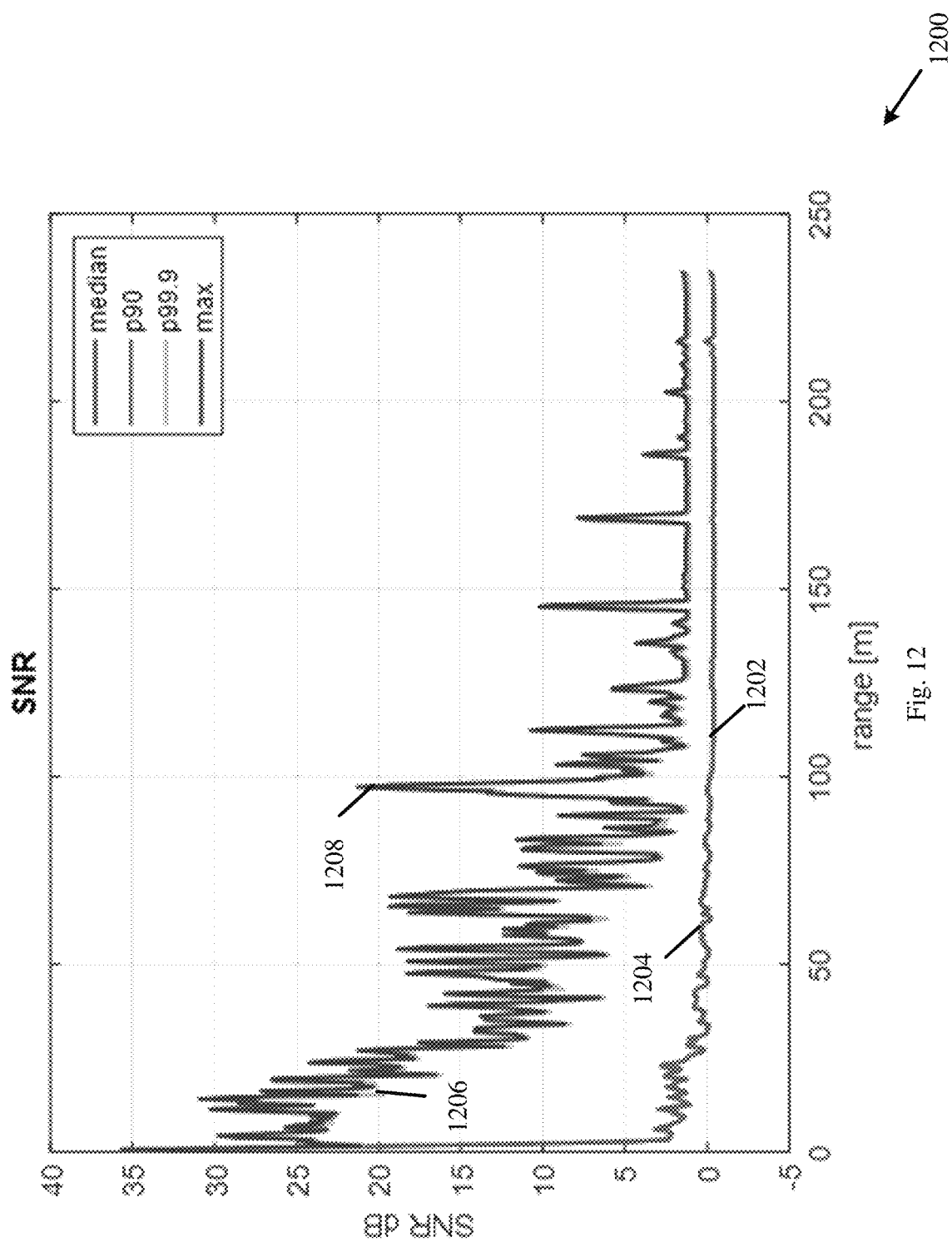
FIG. 12 is a schematic illustration of a graph depicting simulation results of Signal to Noise Ratio (SNR) values versus range values, in accordance with some demonstrative aspects.

Reference is made to FIG. 12, which schematically illustrates a graph 1200 depicting simulation results of SNR values versus range values, in accordance with some demonstrative aspects.

In some demonstrative aspects, graph 1200 depicts result of a field test including recordings of over 100 radar frames in multiple different scenarios, e.g., including urban scenarios, highway scenarios, traffic jam scenarios, tunnel scenarios, and/or the like.

In some demonstrative aspects, graph 1200 represents an SNR distribution of the SNR values for different ranges, e.g., at an output of range processing, e.g., the range processing 1010 (FIG. 10).

In some demonstrative aspects, as shown in FIG. 12, a first curve 1202 represents median SNR statistics at the different ranges.

In some demonstrative aspects, as shown in FIG. 12, a second curve 1204 represents percentile 90% SNR statistics at the different ranges.

In some demonstrative aspects, as shown in FIG. 12, a third curve 1206 represents percentile 99.9% SNR statistics at the different ranges.

In some demonstrative aspects, as shown in FIG. 12, a fourth curve 1208 represents maximal (max) percentile SNR statistics at the different ranges.

In some demonstrative aspects, as shown in FIG. 12, for 90% of the time, and for most of the ranges, the SNR may be close to 0 dB. For example, reflected signals from targets may be below a noise level and, accordingly, may be detected, e.g., only after Doppler processing and/or AoA processing.

In some demonstrative aspects, radar values may be quantized, for example, in order to store radar values digitally, e.g., as a continuous amplitude signal.

In some demonstrative aspects, the effect of the quantization on a signal may be seen as an additive noise. For example, the power of this additive noise may depend, for example, on a number of quantization levels and/or a distribution of the signal.

In some demonstrative aspects, the effect of the quantization may be neglected, for example, when a Signal to Quantization Noise Ratio (SQNR) is higher than the SNR of the signal, e.g., by a margin of about 10-15 dB.

Figure 13:
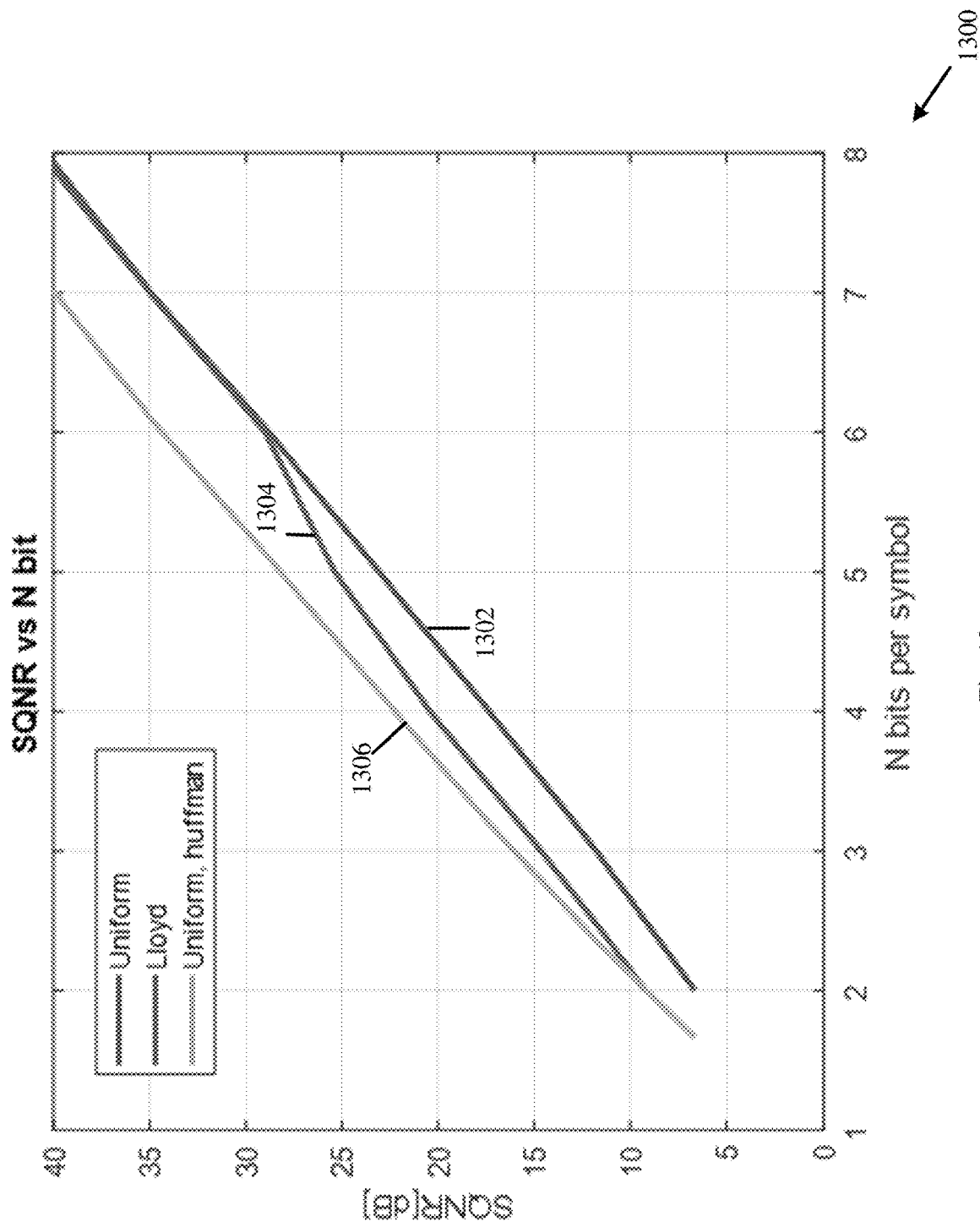
FIG. 13 is a schematic illustration of a graph depicting simulation results of Signal to Quantization Noise Ratio (SQNR) values versus a number of bits per symbol with respect to a plurality of compression mechanisms, in accordance with some demonstrative aspects.

Reference is also made to FIG. 13, which schematically illustrates a graph 1300 depicting simulation results of Signal to Quantization Noise Ratio (SQNR) values versus a number of bits per symbol with respect to a plurality of compression mechanisms, in accordance with some demonstrative aspects.

In some demonstrative aspects, the graph 1300 may be simulated based on an input signal having a Gaussian distribution.

In some demonstrative aspects, as shown in FIG. 13, a first curve 1302 depicts SQNR values versus the number of bits per symbol, e.g., according to a uniform quantization scheme.

In some demonstrative aspects, as shown in FIG. 13, a second curve 1304 depicts SQNR values versus number of bits per symbol, for example, according to a non-uniform quantization scheme, e.g., a using a Lloyd quantizer.

In some demonstrative aspects, as shown in FIG. 13, a third curve 1306 depicts SQNR values versus number of bits per symbol, for example, according to a uniform quantization scheme with Huffman coding.

In some demonstrative aspects, as shown in FIGS. 12 and 13, it may be enough to use 2-3 bits to represent a symbol of a low SNR signal, e.g., a signal having an SNR close to 0 dB, for example, while keeping enough margin of 10-15 dB for the quantization noise.

In some demonstrative aspects, this number of bits, e.g., 2-3 bits, which may be sufficient to represent the symbol, may be much lower than, for example, a number of bits, e.g., 16 bits per symbol, which may be used by a representation with a fixed bit-width per symbol.

Figure 14:
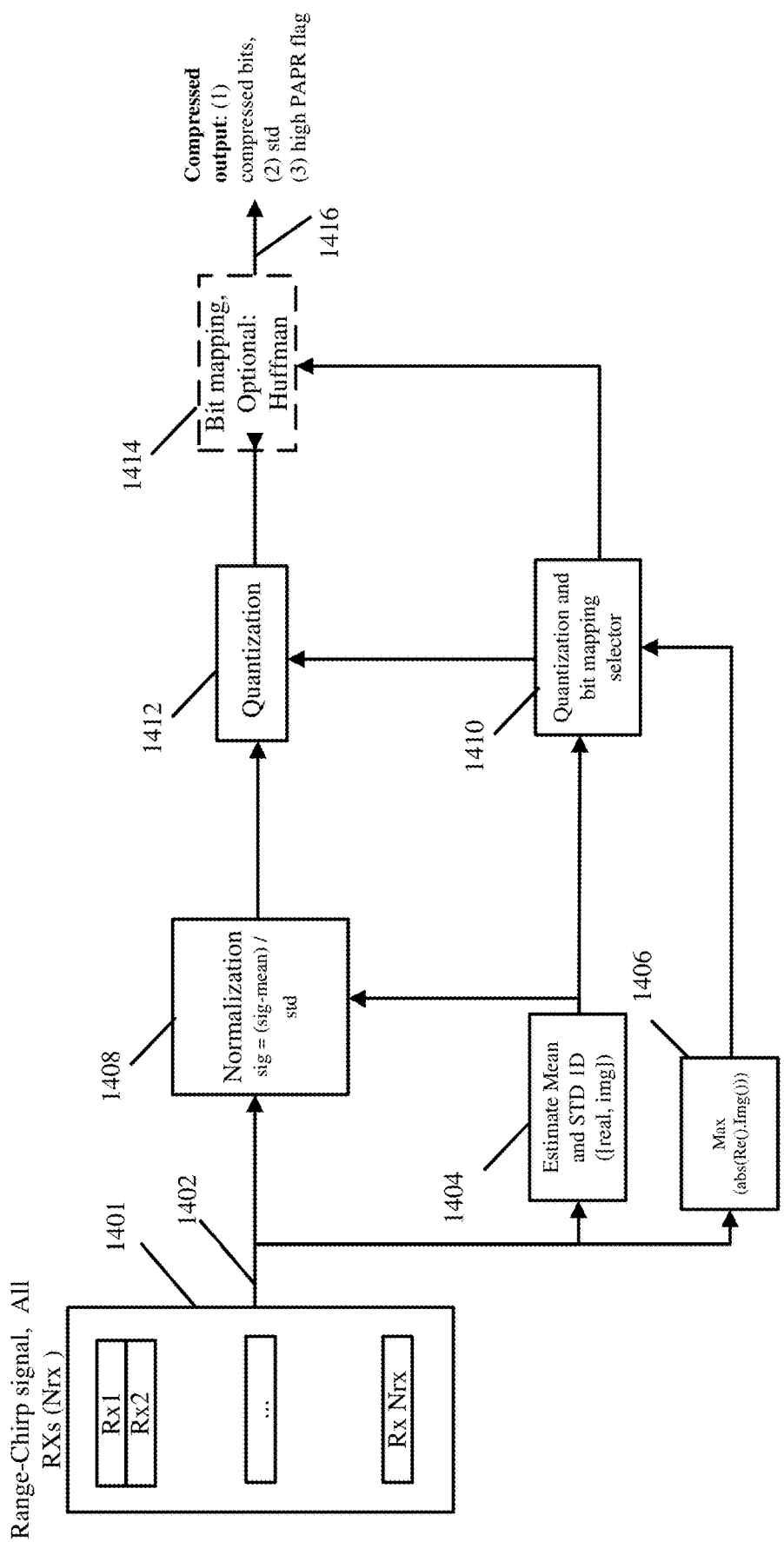
FIG. 14 is a schematic illustration of a range-data compression scheme to compress a plurality of range values, in accordance with some demonstrative aspects.

Reference is made to FIG. 14, which schematically illustrates a range-data compression scheme 1400, which may be implemented to compress a plurality of range values, in accordance with some demonstrative aspects.

In one example, a processor, e.g., processor 836 (FIG. 8), may be configured to perform one or more operations and/or functionalities of range-data compression scheme 1400, for example, to compress radar values, for example, post range processing and prior to Doppler processing.

In some demonstrative aspects, as shown in FIG. 14, a plurality of range values 1402 corresponding to a specific range bin may be received, for example, from a plurality of Rx channels 1401, e.g., all Rx channels or a subset of the Rx channels.

In one example, the plurality of range values 1402 may be represented by an input vector, denoted x.

In some demonstrative aspects, range-data compression scheme 1400 may include estimation of statistical information corresponding to the plurality of range values 1402, e.g., described below.

In some demonstrative aspects, as indicated at block 1404, range-data compression scheme 1400 may include estimation of a mean, denoted mean, and/or a standard deviation, denoted STD, of the input vector x. For example, range-data compression scheme 1400 may include estimation of the mean and/or the STD with respect to the real part of the input vector x, denoted Re(x), and/or the imaginary part of the of the input vector x, denoted Img(x).

In some demonstrative aspects, as indicated at block 1406, range-data compression scheme 1400 may include estimation of a maximum of the input vector x, e.g., MAX [|Re(x)|, |Img(x)|].

In some demonstrative aspects, the maximum of the input vector x may be used for estimation of a PAPR of the input signal.

In one example, estimation of the statistical information of the plurality of range values 1402 may be performed for part of the input signal, for example, for a first pulse, e.g., chirp, of a radar signal, for example, to save on computation power.

In some demonstrative aspects, as indicated at block 1408, range-data compression scheme 1400 may include normalization of the range values 1402, for example, based on the statistical information of the plurality of range values 1402. For example, the vector x may be normalized, e.g., as follows:

$x = (x - \text{mean})/\text{STD}.$

In some demonstrative aspects, as indicated at block 1410, range-data compression scheme 1400 may include determining a compression policy, e.g., e.g., a selected quantization scheme and/or a quantization bit-width, for example, based on the statistical information, e.g., based on the measured STD, the maximal value MAX, and/or the PAPR.

In one example, a controller, e.g., compression controller 1111 (FIG. 11), may be configured to select the compression policy, for example, based on a look up table (LUT), which may connect between a value representing SNR, e.g., the STD, of the signal, and a number of quantization levels, for example, according to graph 1300 (FIG. 13).

In another example, a controller, e.g., compression controller 1111 (FIG. 11), may be configured to select between plurality of quantization schemes, for example, by selecting a uniform quantization scheme or a non-uniform quantization scheme. For example, a non-uniform quantization scheme may be utilized to provide an improved SQNR for a same number of bits, for example, compared to a uniform quantization scheme, e.g., as shown by graph 1300 (FIG. 13).

In one example, a controller, e.g., compression controller 1111 (FIG. 11), may be configured to select the compression policy, for example, based on the PAPR. For example, if a high PAPR is detected with respect to the vector x, the signal may be quantized using a higher quantization bit-width, for example, with a wide dynamic range.

For example, for some range bins, e.g., for most range bins, a signal distribution may be close to the Gaussian distribution. For Example, for low SNR range bins, the Gaussian distribution may be due to the noise distribution, which may be the dominant signal in the range bin. For example, for high SNR range bins, the Gaussian distribution may be due to a superposition of many complex exponents, e.g., according to a central limit theorem. Accordingly, for most of the range bins an expected PAPR of the range bins may be between 9-13 dB.

Figure 15:
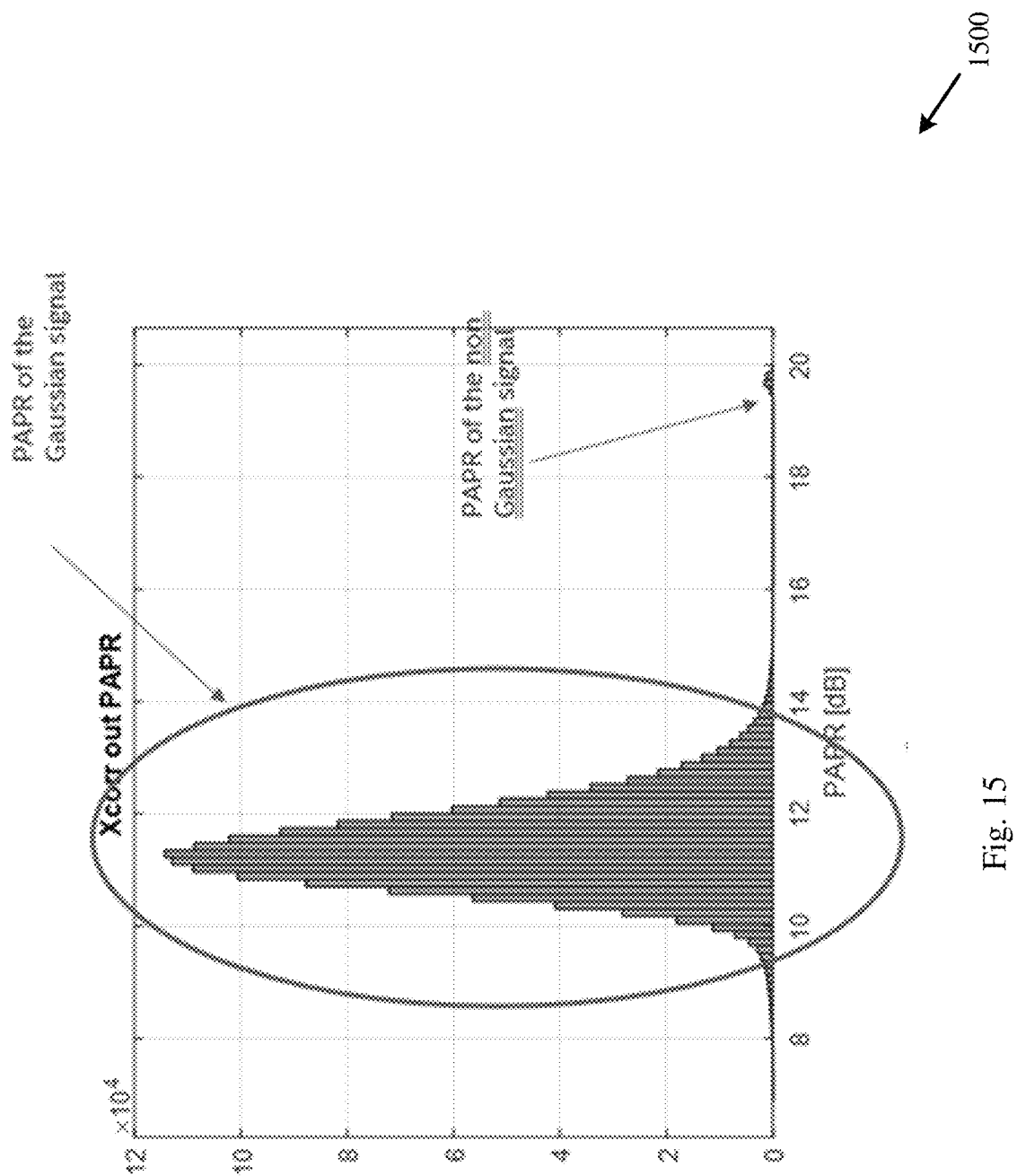
FIG. 15 is a schematic illustration of a histogram graph depicting Peak to Average Power Ratio (PAPR) values, in accordance with some demonstrative aspects.

Reference is made to FIG. 15, which schematically illustrates a histogram graph 1500 depicting PAPR values, in accordance with some demonstrative aspects.

In one example, graph 1500 shows PAPR statistics of the vector x obtained from the field test.

In some demonstrative aspects, as shown in FIG. 15, the PAPR may be between 9-13 dB, e.g., for most of the range bins.

In some demonstrative aspects, as shown in FIG. 15, there may be some outliers, e.g., having a PAPR of about ~20 dB, which may be obtained for some range bins that may suffer from system imperfections, e.g., such as a Tx/Rx leakage.

Referring back to FIG. 14, in some demonstrative aspects, as indicated at block 1412, range-data compression scheme 1400 may include quantization of the normalized radar values, for example, based on the compression policy. In one example, a compressor, e.g., compressor 1110 (FIG. 11), may quantize the normalized radar values, for example, based on the compression policy, which may be provided, for example, by a controller, e.g. compression controller 1111 (FIG. 11).

In some demonstrative aspects, as indicated at block 1414, range-data compression scheme 1400 may include mapping the quantized signal to bits, for example, according to the compression policy. For example, range-data compression scheme 1400 may optionally include applying a bit-coding scheme, e.g., for the mapping of the quantized signal to the bits. For example, a lossless coding, e.g., a Huffman coding or any other coding scheme, may be applied for the mapping of the quantized signal to the bits, e.g., to provide a more efficient compression.

in some demonstrative aspects, as indicated by arrow 1416, range-data compression scheme 1400 may include outputting compressed radar information, and statistical information corresponding to the compressed radar information, e.g., the STD, the mean and/or a high PAPR flag.

In some demonstrative aspects, the statistical information corresponding to the compressed radar information may allow a decompressor, e.g., range decompressing 1018 (FIG. 10), to reconstruct the original signal, e.g., vector x, for example, with some quantization error.

In some demonstrative aspects, a decompressor, e.g., implemented by processor 836 (FIG. 8) and/or any other element of device 800 (FIG. 8), may be configured to retrieve the compressed radar information 825 (FIG. 8), e.g., from memory 838 (FIG. 8) and/or any other memory or storage. For example, the decompressor may be configured to retrieve the statistical information corresponding to the compressed radar information 825 (FIG. 8), e.g., from memory 838 (FIG. 8) and/or any other memory or storage.

In some demonstrative aspects, the decompressor, e.g., implemented by processor 836 (FIG. 8) and/or any other element of device 800 (FIG. 8), may be configured to reconstruct the original signal, e.g., the vector x, for example, based on the compressed radar information 825 (FIG. 8) and the statistical information corresponding to the compressed radar information 825 (FIG. 8).

Figure 16:
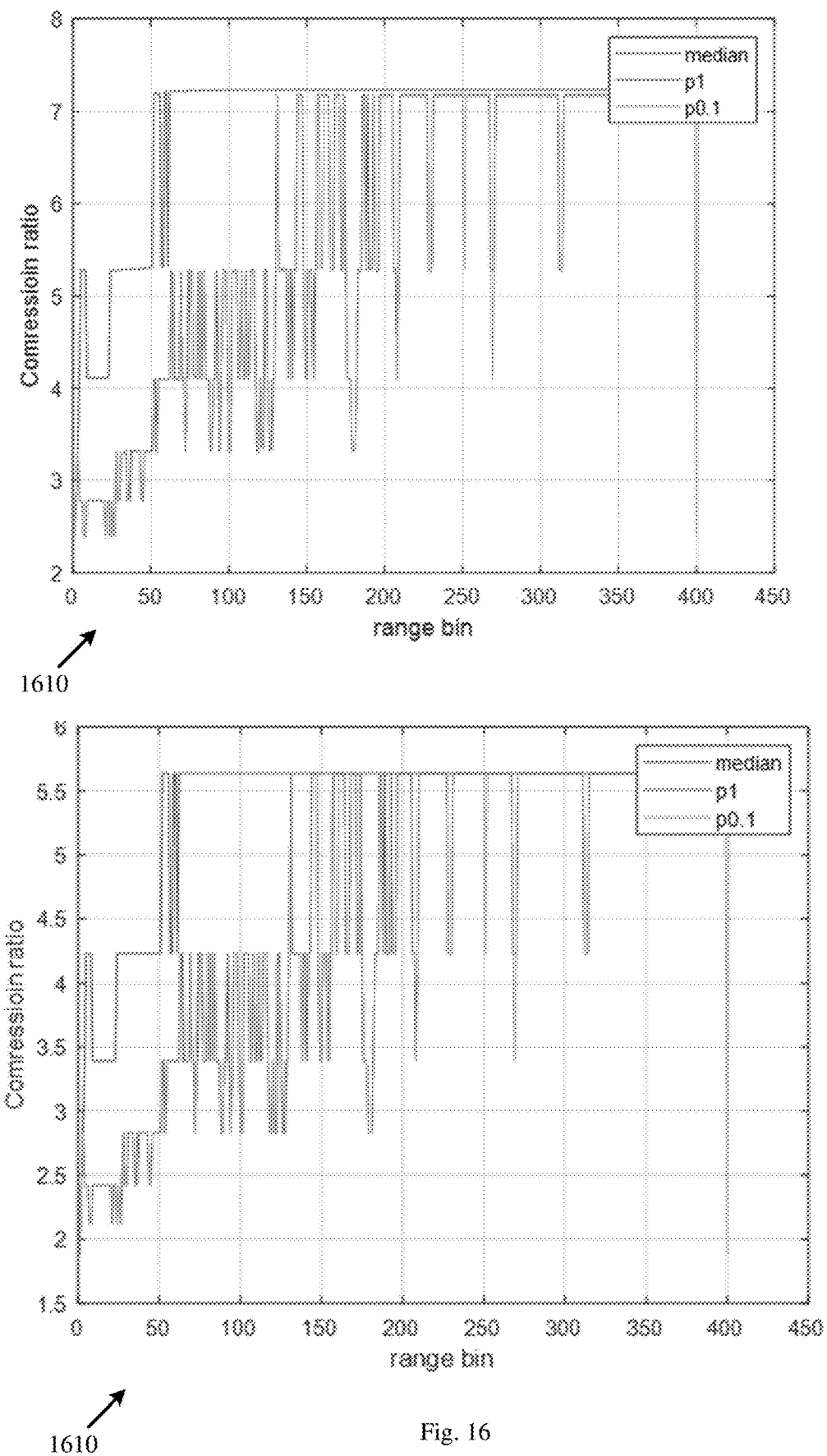
FIG. 16 is a schematic illustration of a first graph depicting first compression ratios corresponding to a plurality of range bins according to a first quantization scheme, and a second graph depicting second compression ratios corresponding to the plurality of range bins according to a second quantization scheme, in accordance with some demonstrative aspects.

Reference is made to FIG. 16, which schematically illustrates a first graph 1610 depicting first compression ratios corresponding to a plurality of range bins according to a first quantization scheme, and a second graph 1610 depicting second compression ratios corresponding to the plurality of range bins according to a second quantization scheme, in accordance with some demonstrative aspects.

In some demonstrative aspects, performance of a compressor may be based, for example, on a compression ratio of a range bin having a low SNR, e.g., as most of the range bins may have a low SNR.

In one example, original non-compressed signals may be represented by a 16-bit per dimension.

In some demonstrative aspects, graph 1610 depicts statistics of compression ratios, for example, which may be obtained, for example, according to the uniform quantization scheme using a Huffman bit-coding.

In some demonstrative aspects, the compression ratios according to the uniform quantization scheme may be between 9-9.5, for example, for a 2-bit width and a noise level SNR=0 dB.

In some demonstrative aspects, the compression ratios according to the uniform quantization scheme may be between 6.5-7.5, for example, for a 3-bit width and a noise level SNR=0 dB.

In some demonstrative aspects, graph 1620 depicts statistics of compression ratios, for example, which may be obtained, for example, according to the non-uniform quantization scheme, e.g., a Lloyd quantizer without Huffman bit-coding.

In some demonstrative aspects, the compression ratios according to the non-uniform quantization scheme may be between 7.5-8.5, for example, for a 2-bit width and a noise level SNR=0 dB.

In some demonstrative aspects, the compression ratios according to the non-uniform quantization scheme may be between 5-5.5, for example, for a 3-bit width and a noise level SNR=0 dB.

Referring back to FIG. 8, in some demonstrative aspects, processor 836 may be configured to generate the compressed radar information 825, for example, by compressing radar values in a plurality of range-Doppler (RD) bins, e.g., as described below.

In some demonstrative aspects, the radar values may include radar values post the Doppler processing and/or prior to the AoA processing, e.g., as described below.

In some demonstrative aspects, processor 836 may be configured to generate the compressed radar information 825, for example, by quantizing a plurality of normalized values corresponding to the radar values in the plurality of range-Doppler bins, e.g., as described below.

In some demonstrative aspects, a normalized value corresponding to a radar value in a range-Doppler bin may be based on a normalization of the radar value with respect to a plurality of radar values in the range-Doppler bin, for example, a plurality of radar values belonging to a same range-Doppler bin, e.g., as described below.

In some demonstrative aspects, processor 836 may be configured to store the compressed radar information 825 corresponding to the RD bins in the memory 838, e.g., as described below.

In some demonstrative aspects, processor 836 may be configured to identify one or more active range-Doppler bins of the plurality of range-Doppler bins, for example, based on an activity detection criterion, e.g., as described below.

In some demonstrative aspects, processor 836 may be configured to generate the compressed radar information 825, for example, by compressing radar values in the one or more active range-Doppler bins, e.g., as described below.

In some demonstrative aspects, processor 836 may be configured to generate the compressed radar information 825, for example, by ignoring radar values of one or more other range-Doppler bins, which are not identified as active range-Doppler bins, e.g., as described below.

In some demonstrative aspects, processor 836 may be configured to store in the memory 838 active range-Doppler bin information to identify the one or more active range-Doppler bins, e.g., as described below. For example, the active range-Doppler bin information may be used by a decompressor, e.g., implemented by processor 836 and/or any other element of device 800, to decompress the compressed radar information 825.

In some demonstrative aspects, processor 836 may be configured to generate a plurality of dithered values for a range-Doppler bin, for example, by dithering the plurality of radar values in the RD bin, e.g., as described below.

In some demonstrative aspects, the normalized value corresponding to the radar value may be based on a normalization of a dithered value corresponding to the radar value with respect to the plurality of dithered values, e.g., as described below.

In some demonstrative aspects, processor 836 may be configured to compress the radar values, for example, after the range processing 1010 (FIG. 10) and the Doppler processing 1020 (FIG. 10), and/or before a spatial processing, e.g., the AoA processing 1030 (FIG. 10), e.g., as described below.

In some demonstrative aspects, a large amount of the data after the Doppler processing, e.g., about ~90% of the data, may be identified as pure noise, and may be eliminated, for example, while the remaining data, e.g., about ~10% of the data, may be represented, for example, using a relatively low number of bits, e.g., as described below.

In some demonstrative aspects, metadata may be added to the remaining data, for example, to support calculation of required frame statistics, for example, in case most of the data is discarded.

In some demonstrative aspects, an added noise resulting from the quantization may be considered, for example, when determining the number of bits to represent the remaining data. For example, the added quantization noise may be considered in a way that will create a minimal effect on the data. For example, the quantization may be designed to result in a no more than a predefined level of added noise, e.g., added noise which is about 10 dB lower than a current noise level.

Figure 17:
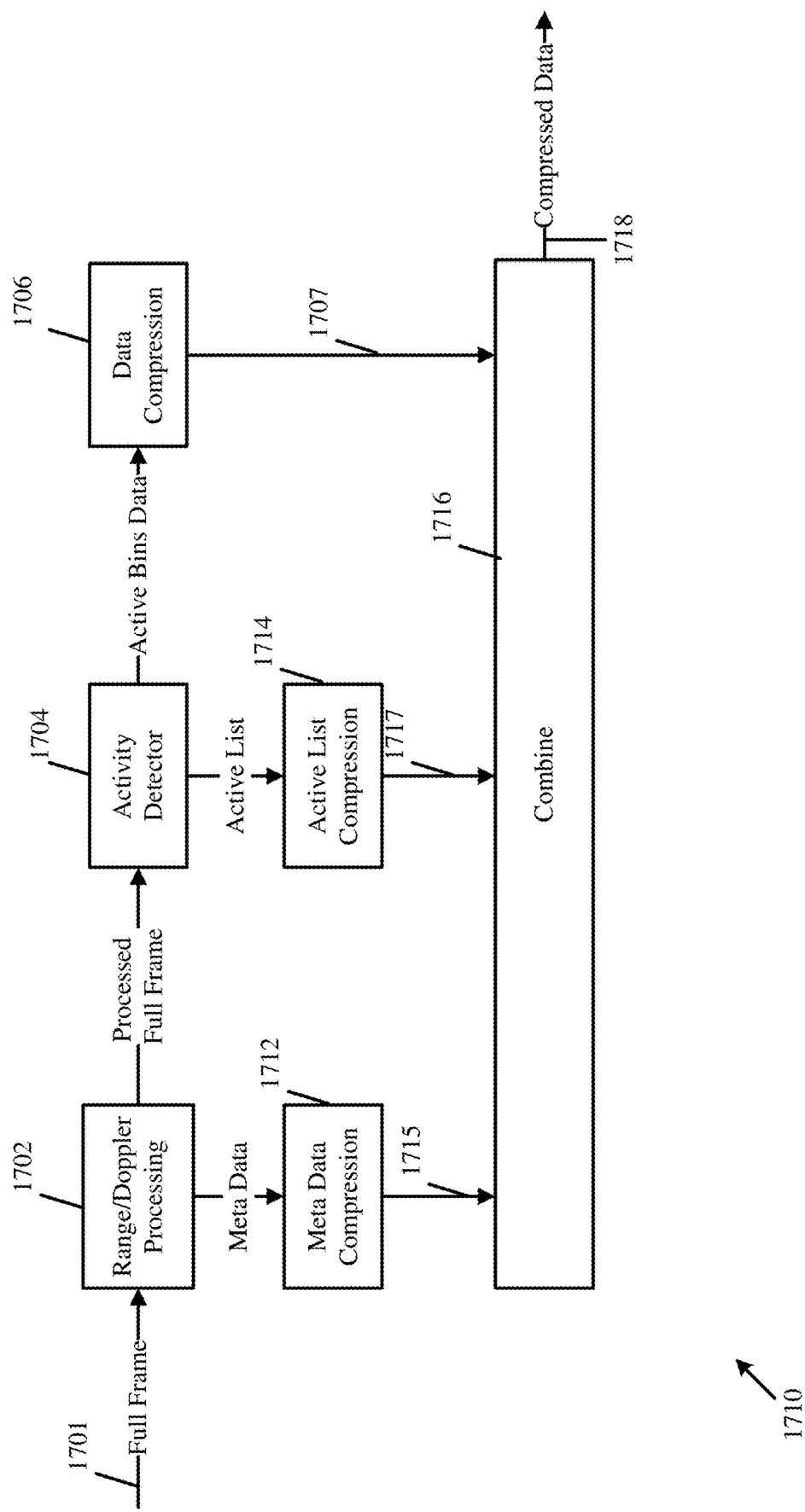
FIG. 17 is a schematic illustration of a range-Doppler data compression scheme to compress a plurality of range-Doppler values, in accordance with some demonstrative aspects.

Reference is made to FIG. 17, which schematically illustrates a range-Doppler data compression scheme 1700, which may be configured to compress a plurality of range-Doppler values, in accordance with some demonstrative aspects.

In one example, a processor, e.g., processor 836 (FIG. 8), may be configured to perform one or more operations and/or functionalities according to the range-Doppler data compression scheme 1700, for example, to compress a plurality of range-Doppler values, which may be determined post range-Doppler processing and/or pre AoA processing.

In some demonstrative aspects, as indicated at block 1702, range-Doppler data compression scheme 1700 may include performing Range/Doppler processing of a full radar frame 1701, e.g., including a plurality of radar values in a plurality of range/Doppler bins.

In some demonstrative aspects, as indicated at block 1712, range-Doppler data compression scheme 1700 may include compressing meta data corresponding to statistics of the full radar frame 1701.

In some demonstrative aspects, as indicated at block 1704, range-Doppler data compression scheme 1700 may include identifying one or more active range-Doppler bins of the plurality of range-Doppler bins.

In some demonstrative aspects, as indicated at block 1714, range-Doppler data compression scheme 1700 may include compressing an active list corresponding to the one or more active range-Doppler bins of the plurality of range-Doppler bins. For example, the active lists may describe positions of the active range-Doppler bins.

In some demonstrative aspects, as indicated at block 1706, range-Doppler data compression scheme 1700 may include compressing radar values of the one or more active range-Doppler bins.

In some demonstrative aspects, as indicated at block 1716, range-Doppler data compression scheme 1700 may include generating compressed radar information 1718, which may include a combination of compressed data 1707, compressed active list 1717, and/or compressed metadata 1715.

In some demonstrative aspects, compressed metadata 1715 may include maps, which may describe statistics of the entire radar frame 1701.

In some demonstrative aspects, compression of the statistic maps may be based on storing a minimal value of a map, e.g., each map, and subtracting the minimal value from the entire map. In other aspects, the maps may be compressed according to any other compression mechanism.

In some demonstrative aspects, a residual map may be transformed into a logarithmic value, which may then be quantized, e.g., similar to a nonlinear quantization scheme.

In some demonstrative aspects, the active lists may be compressed, for example, by coding differences between two entries of the active list. For example, as the data may be organized in a raster scan, a difference in position between adjacent entries may be usually small, thereby allowing to use a fewer number of bits.

In other aspects, the metadata may be compressed, partially or entirely, using any other additional or alternative compression techniques.

In some demonstrative aspects, compression of the active data may be performed by grouping active data, e.g., the radar values of the one or more active range-Doppler bins, into bins that share a same range and a same speed.

In some demonstrative aspects, a maximum component, e.g., a real component and/or an imaginary component, may be detected in a group, e.g., in each group. For example, the maximum component may be represented, for example, using a logarithmic scale.

In some demonstrative aspects, radar values of the same RD bin, e.g., all radar values of the same RD bin, may be normalized, e.g., divided by the maximal component, which may result in normalized radar values in the range of [−1.1].

In some demonstrative aspects, the normalized radar values may be quantized, for example, using a required number of bits.

In some demonstrative aspects, the quantized radar values may be furthered compressed, for example, based on a lossless variable length bit-coding, e.g., Huffman coding, for example, using coding tables that fit the data statistics.

In some demonstrative aspects, the number of required bits per component may be determined, e.g., by processor 834 (FIG. 8), for example, based on a required SNR at the output.

In one example, an added quantization noise, e.g., resulting from the quantization, may be signal independent, for example, to support a technical solution to avoid amplification of the added quantization noise, e.g., during the processing chain.

In some demonstrative aspects, a decorrelation between the signal and noise may be achieved, for example, by applying a known dithering to the signal. For example, the added dithering may be removed in the decoding phase, and, accordingly, may not cause signal degradation.

In some demonstrative aspects, a number of bits and a coding to describe the radar values may be selected, e.g., by processor 836 (FIG. 8), for example, based on signal characteristics and/or a position of the RD bin. For example, stronger signals may require more bits to describe, and/or may be mostly found in close ranges.

In one example, a radar system may be configured to achieve a noise level of about −40 dBc, e.g., a noise level compared to a strongest signal, for example, with a processing gain of about ~30 dB. According to this example, the quantization noise may be about −20 dBc, which may transform to −50 dBc, for example, after processing. For example, 16 quantization levels may be used, for example, to achieve the quantization noise of about −20 dBc. For example, the 16 quantization levels may require about ~3 bits on average, for example, after applying a variable length coding.

In one example, the input data may have 32 bits per component. According to this example, a compression factor of about 10 times on the active data may be achieved. For example, an overall compression ratio of 100 times may be achieved with respect to the input data, for example, as the active RD bins may include about ~10% of the total RD bins of a typical radar frame.

Figure 18:
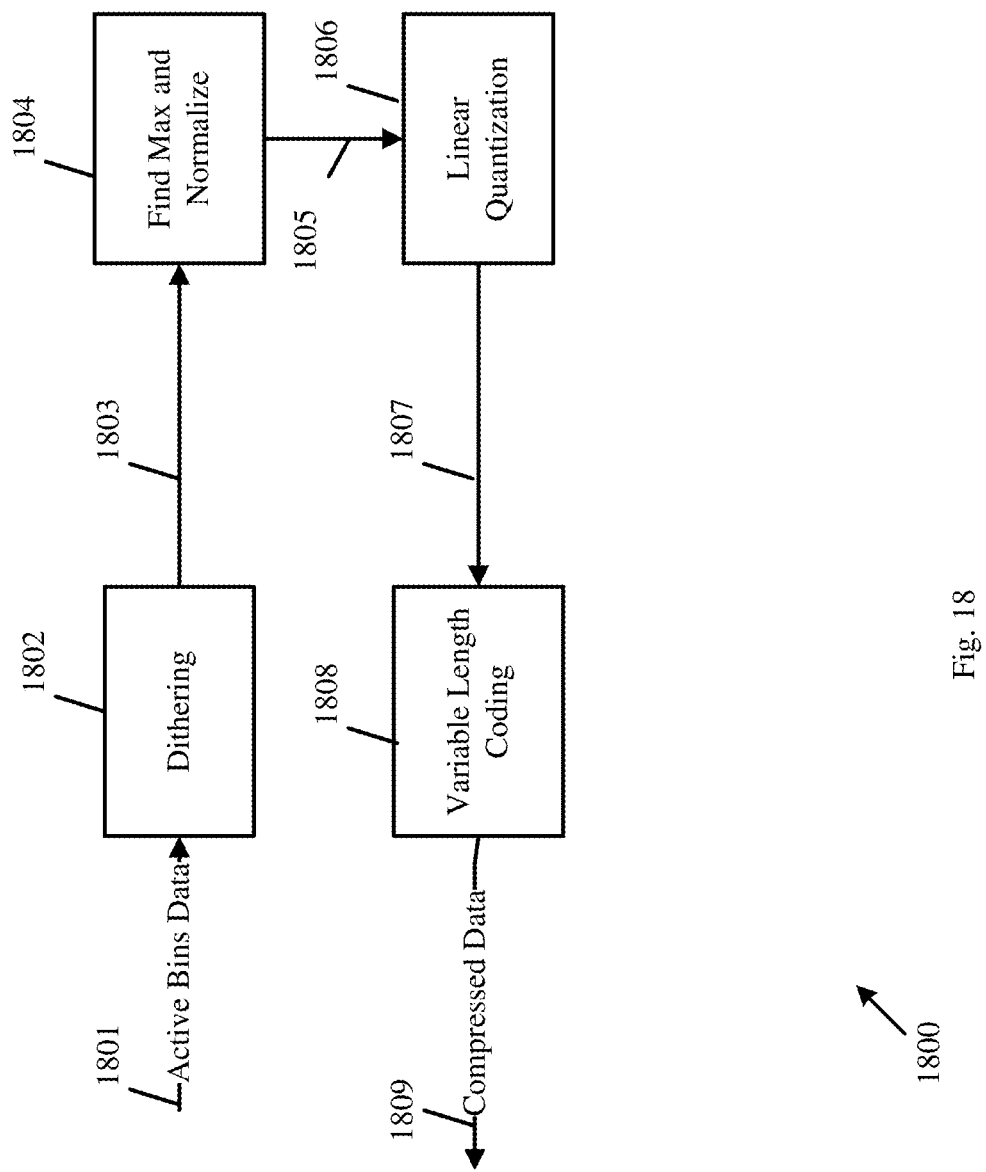
FIG. 18 is a schematic illustration of a range-Doppler data compression scheme to compress a plurality of range-Doppler values, in accordance with some demonstrative aspects.

Reference is made to FIG. 18, which schematically illustrates range-Doppler data compression scheme 1800, which may be configured to compress a plurality of range-Doppler values, in accordance with some demonstrative aspects.

In one example, a processor, e.g., processor 836 (FIG. 8), may be configured to perform one or more operations of and/or functionalities of range-Doppler data compression scheme 1800, for example, to compress a plurality of range-Doppler values, which may be determined post range-Doppler processing 1020 (FIG. 10), and/or before the AoA processing 1030 (FIG. 10).

In some demonstrative aspects, as indicated at block 1802, range-Doppler data compression scheme 1800 may include generating a plurality of dithered values 1803 based on a plurality of radar values of active range-Doppler bins. For example, dithered values for an active range-Doppler bin may be determine by dithering a plurality of radar values in the active range-Doppler bin.

In some demonstrative aspects, as indicated at block 1804, range-Doppler data compression scheme 1800 may include normalizing the plurality of dithered values 1803 to generate normalized values 1805. For example, a processor, e.g., processor 836 (FIG. 8), may be configured to normalize the plurality of dithered values 1803 in an RD bin, for example, based on the maximum component in the RD bin.

In some demonstrative aspects, as indicated at block 1806, range-Doppler data compression scheme 1800 may include quantizing normalized values 1805 corresponding to the active range-Doppler bin to generate quantized values

1807. In one example, the normalized values 1805 may be quantized according to a linear quantization scheme and/or any other quantization scheme.

In some demonstrative aspects, as indicated at block 1808, range-Doppler data compression scheme 1800 may include compressing the plurality of quantized values 1807, for example, according to a bit-coding scheme, e.g., a variable-length coding scheme, for example, to generate compressed radar information 1809. For example, a processor, e.g., processor 836 (FIG. 8), may be configured to compress the plurality of quantized values 1807, for example, based on Huffman coding and/or any other coding scheme.

In some demonstrative aspects, one or more operations and/or functionalities of range-Doppler data compression scheme 1800 may be implemented based on a mathematical model, e.g., as described below.

in some demonstrative aspects, quantizing a plurality of radar values, for example, according to a linear quantization scheme, may distribute quantization levels, for example, in an entire signal level.

In some demonstrative aspects, the quantization levels may distribute a quantization noise, for example, in the entire signal level.

Figure 19:
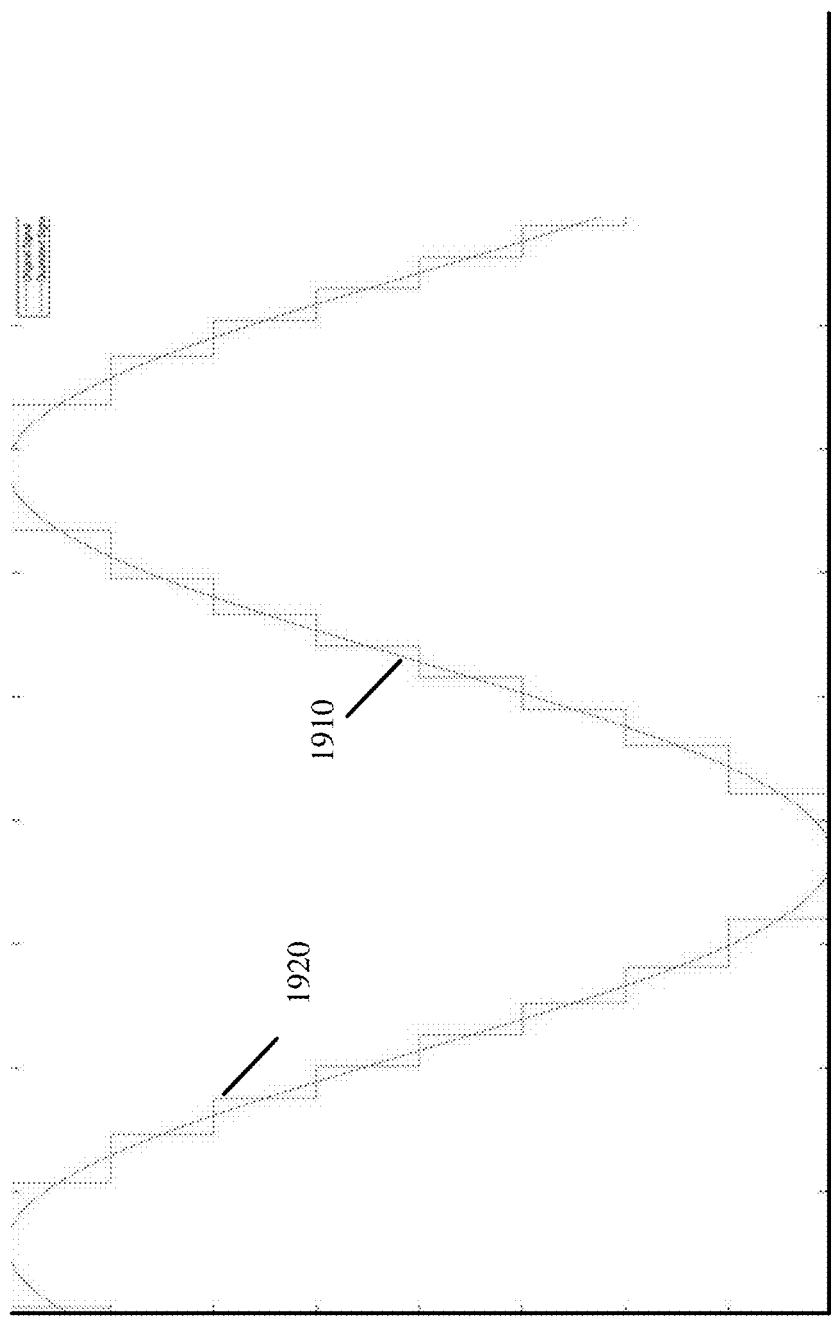
FIG. 19 is a schematic illustration of a graph depicting an original signal and a quantized signal based on quantization of the original signal, to demonstrate a technical problem, which may be addressed in accordance with some demonstrative aspects.

Reference is made to FIG. 19, which schematically illustrates a graph 1900 depicting an original signal 1910 and a quantized signal 1920 based on quantization of the original signal 1910, to demonstrate a technical problem, which may be addressed in accordance with some demonstrative aspects.

In one example, original signal 1910 may be quantized, for example, according to a linear quantization scheme including a plurality of quantization levels/steps, for example, to generate quantized signal 1920.

As shown in FIG. 19, a maximum error of a quantized value of quantized signal 1920 may be half of a quantization step, e.g., ½ quantization step.

In one example, quantization noise power and/or signal noise power may be considered, for example, when calculating the quantization SNR.

As shown in FIG. 19, the quantization noise may be distributed uniformly in a range between −½ and ½ quantization step.

In one example, implementing an additional bit may reduce the quantization noise by a factor of 4, for example, as the quantization step may be reduced by a factor of 2, e.g., as the number of quantization levels may be doubled.

In another example, a signal power may depend on a peak to average power, which may be different, e.g., for every signal distribution.

Accordingly, common signal to quantization noise ratios may be based on a number of bits, denoted n, e.g., as follows:

DC: 6n+4.8
Sinus wave: 6n+1.8
Gaussian noise (practical): 6n−7

In one example, the quantization noise may be correlated to the signal 1910.

Figure 20:
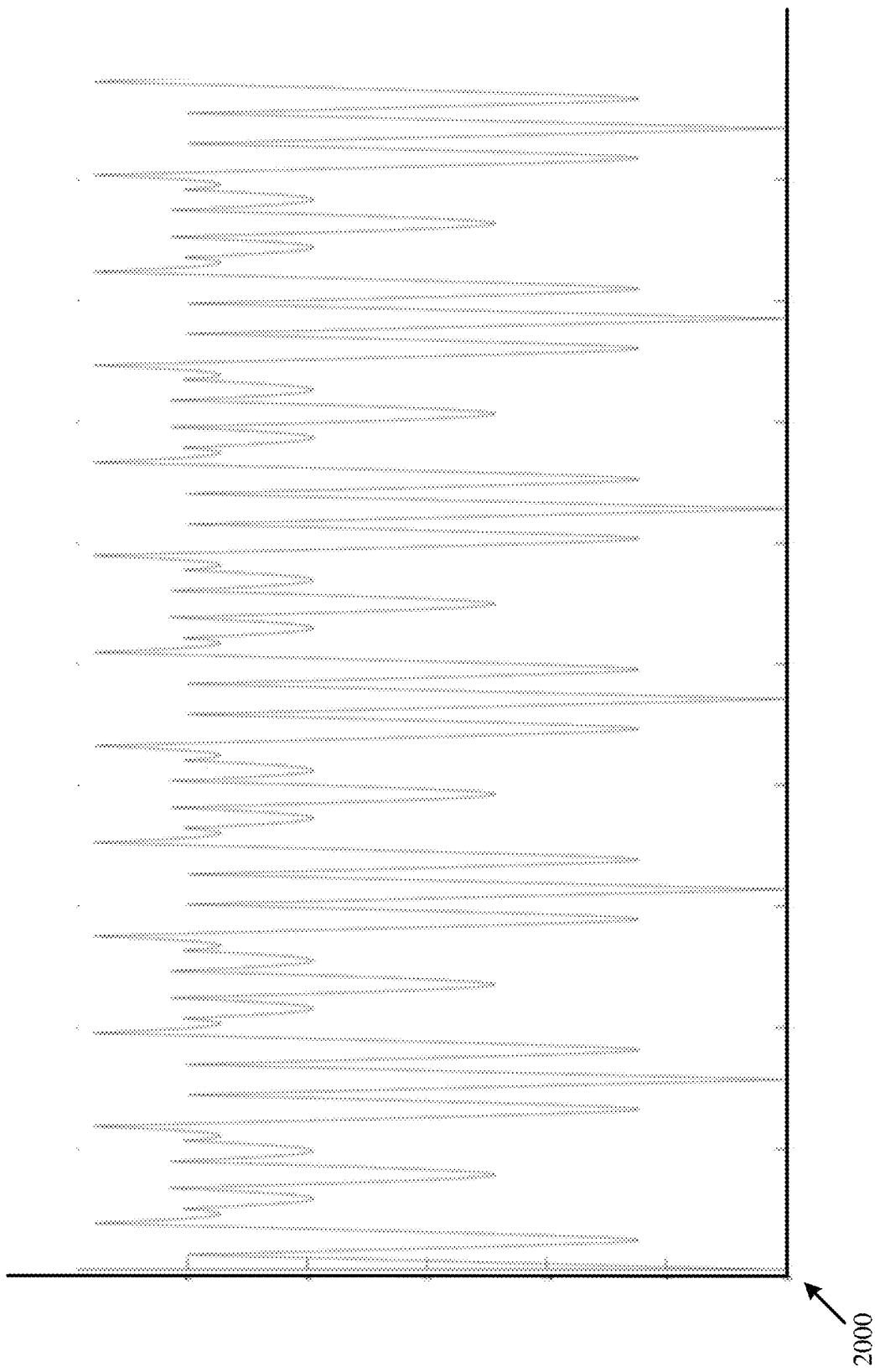
FIG. 20 is a schematic illustration of a graph depicting quantization noise of a quantized signal based on quantization of an original signal, to demonstrate a technical problem, which may be addressed in accordance with some demonstrative aspects.

Reference is made to FIG. 20, which schematically illustrates a graph 2000 depicting quantization noise of a quantized signal based on quantization of an original signal, to demonstrate a technical problem, which may be addressed in accordance with some demonstrative aspects.

In one example, graph 2000 depicts the quantization noise of quantized signal 1920 (FIG. 19).

As shown in FIG. 20, the quantization noise may be affected by the signal 1910 (FIG. 19), and may not be random.

For example, a signal transformation that can be reversed without affecting signal quality may be applied, for example, in order to decorrelate the quantization noise from the signal. For example, the quantization noise may be decorrelated from the signal by multiplying the original signal 1910 (FIG. 19) by a random phase, and removing the added phase in reconstruction. For example, multiplying the original signal by the random phase may create uncorrelated noise, which may be random.

Figure 21:
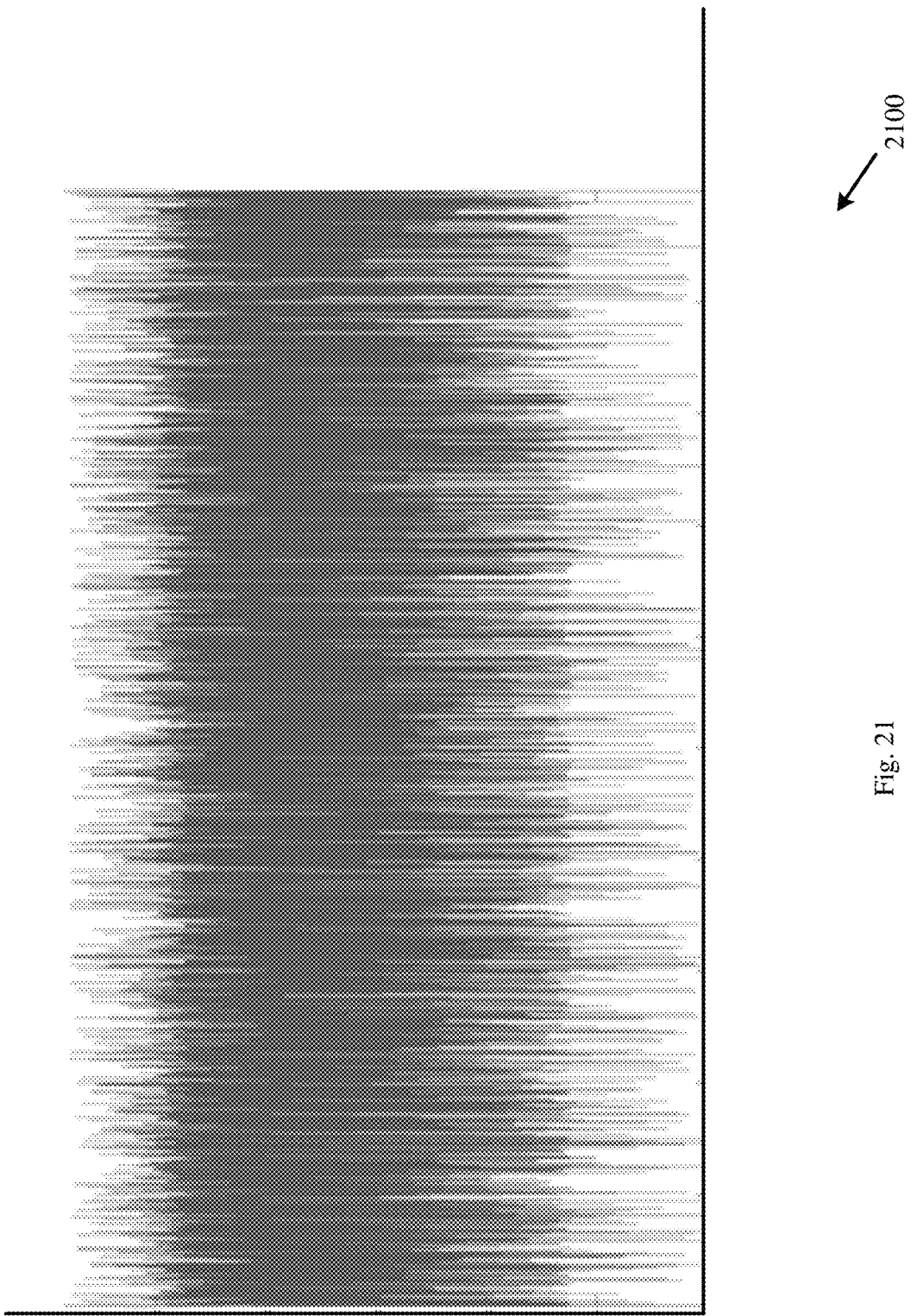
FIG. 21 is a schematic illustration of a graph depicting quantization noise of a quantized signal based on quantization of an original signal multiplied by a random phase, which may be implemented in accordance with some demonstrative aspects.

Reference is made to FIG. 21, which schematically illustrates a graph 2100 depicting quantization noise of a quantized signal based on quantization of an original signal multiplied by a random phase, which may be implemented in accordance with some demonstrative aspects.

In one example, graph 2100 depicts the quantization noise of a quantized signal, for example, after multiplying original signal 1910 (FIG. 19) by a random phase As shown in FIG. 21, the quantization noise may be random. Accordingly, the quantization noise may not be correlated with original signal 1910 (FIG. 19), for example, in opposed to the quantization noise shown in graph 2000 (FIG. 20).

In one example, it may be assumed that the quantization noise, e.g., the uncorrelated noise, may not have a processing gain, while the signal may improve as more data is processed. This assumption may allow to utilize stronger quantization noise, e.g., using less bits, which may increase the compression factor.

Referring back to FIG. 18, in some demonstrative aspects, a quantization level, e.g., each quantization level, may be allocated with a unique code, for example, after quantized the radar values, e.g., at block 1806 (FIG. 18).

In one example, utilizing a fixed number of bits for each code may be efficient, for example, when a probability of code occurrences is unknown.

In another example, a variable length coding may be more efficient, for example, when the probability of each quantization level is known. For example, fewer bits may be allocated to more frequent quantization levels, and/or more bits may be allocated to less-frequent e.g., rare, quantization levels. This variable-length coding scheme may provide a technical solution to reduce a size of the encoded data.

In some demonstrative aspects, the variable length coding may include a Huffman coding, and/or any other type of variable length coding, e.g., based on data statistics.

For example, assuming that a signal is dominated by Gaussian noise, which may be a common scenario, there may be a non-uniform distribution of the quantized noise.

Figure 22:
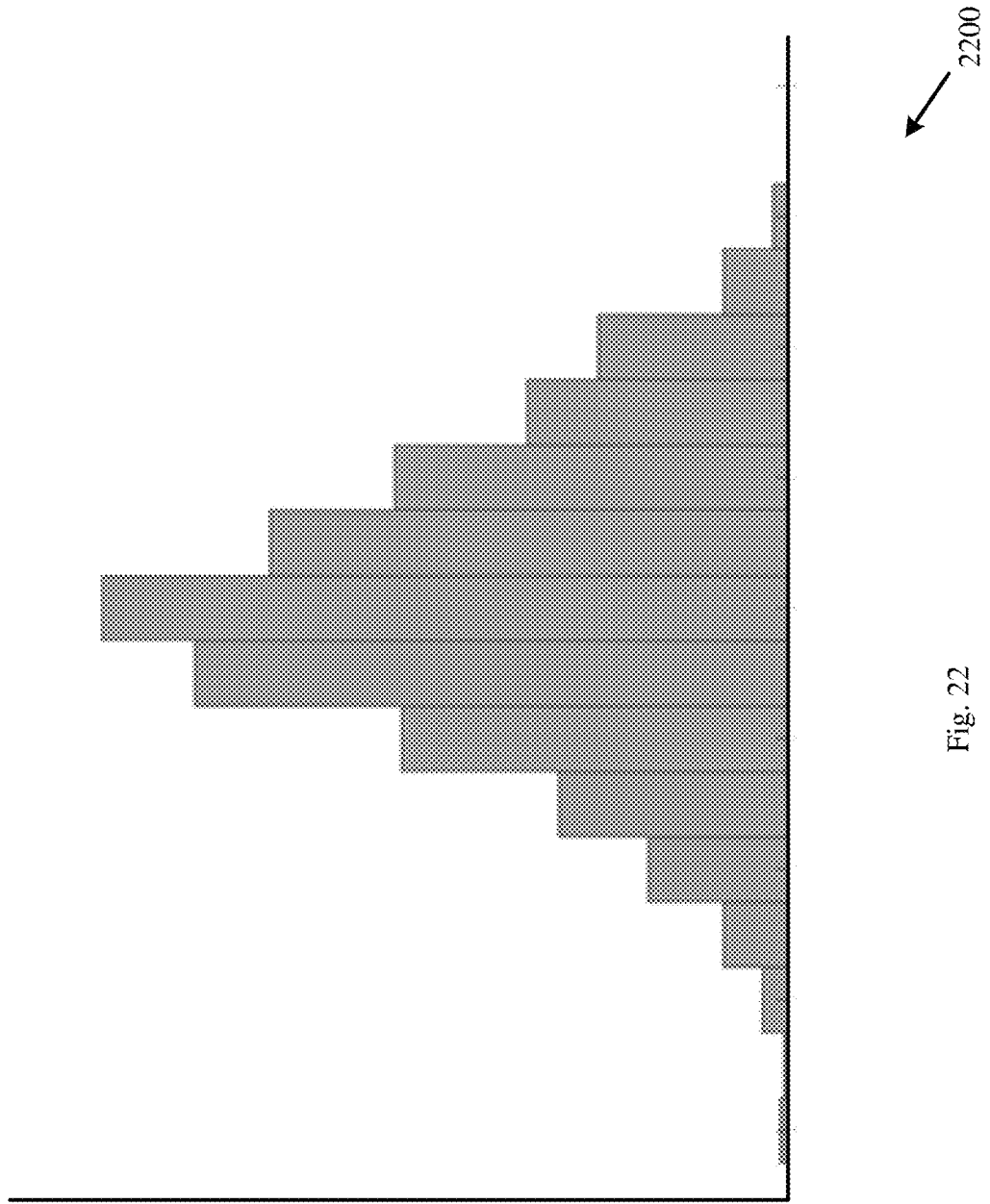
FIG. 22 is a schematic illustration of a histogram graph depicting a quantized noise based on a Gaussian noise, which may be implemented in accordance with some demonstrative aspects.

Reference is made to FIG. 22, which schematically illustrates a histogram graph 2200 depicting a quantized noise based on a Gaussian noise, which may be implemented in accordance with some demonstrative aspects.

As shown in FIG. 22, the Gaussian noise may be quantized into 16 levels, which may require 4-bits to represent each quantization level, for example, when using Fixed length coding.

For example, a Huffman codding may generate an average of 3.3 bits per each quantization level.

In one example, the coding scheme according to the Huffman codding may be defined, e.g., as follows:

TABLE 1

| Level | Code |
|---|---|
| -8 | 0 0 1 0 0 0 1 1 1 0 |
| -7 | 0 0 1 0 0 0 1 1 1 1 0 |
| -6 | 0 0 1 0 0 0 1 0 |
| -5 | 0 0 1 0 0 0 0 |
| -4 | 0 0 1 0 1 |
| -3 | 0 1 1 0 |
| -2 | 1 0 1 |
| -1 | 0 0 0 |
| 0 | 1 1 |
| 1 | 0 1 0 |
| 2 | 1 0 0 |
| 3 | 0 0 1 1 |
| 4 | 0 1 1 1 |
| 5 | 0 0 1 0 0 1 |
| 6 | 0 0 1 0 0 0 1 1 0 |
| 7 | 0 0 1 0 0 0 1 1 1 1 1 |

In one example, a quantization level 0 having the most occurrences according to the histogram of FIG. 22, may be represented by 2 bits, which may result in an average of 3.3 bits per each quantization level.

For example, a quantization level 7, e.g., having fewer occurrences according to the histogram of FIG. 22, may be represented by 11 bits, which may result in an average of 3.3 bits per each quantization level.

Figure 23:
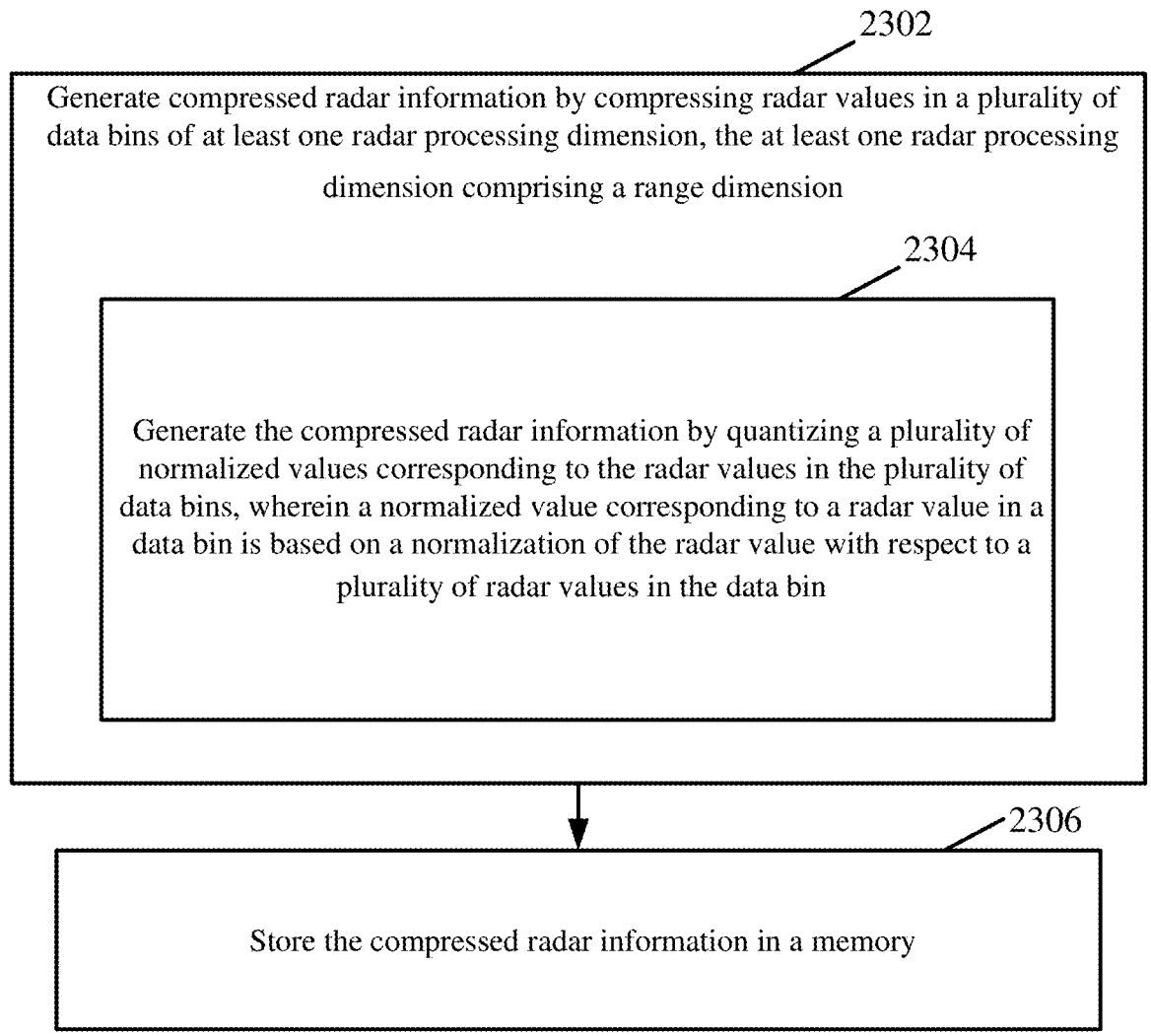
FIG. 23 is a schematic flow chart illustration of a method of radar information compression, in accordance with some demonstrative aspects.

Reference is made to FIG. 23, which schematically illustrates a method of radar information compression, in accordance with some demonstrative aspects. For example, one or more of the operations of the method of FIG. 23 may be performed by a radar system, e.g., radar system 900 (FIG. 9), a radar device, e.g., radar device 101 (FIG. 1), radar device 800 (FIG. 8), and/or radar device 910 (FIG. 9); a processor, e.g., processor 836 (FIG. 8), radar processor 834 (FIG. 8), and/or baseband processor 930 (FIG. 9); and/or a controller, e.g., controller 950 (FIG. 9).

As indicated at block 2302, the method may include generating compressed radar information by compressing radar values in a plurality of data bins of at least one radar processing dimension including a range dimension. For example, processor 836 (FIG. 8) may generate the compressed radar information by compressing the radar values in the plurality of data bins, e.g., as described above.

As indicated at block 2304, generating the compressed radar information may include quantizing a plurality of normalized values corresponding to the radar values in the plurality of data bins, wherein a normalized value corresponding to a radar value in a data bin is based, for example, on a normalization of the radar value with respect to a plurality of radar values in the data bin. For example, processor 836 (FIG. 8) may quantize the plurality of normalized values corresponding to the radar values in the plurality of data bins, e.g., as described above.

As indicated at block 2302, the method may include storing the compressed radar information in a memory. For example, processor 836 (FIG. 8) may store the compressed radar information 825 (FIG. 1) in the memory 838 (FIG. 8), e.g., as described above.

Figure 24:
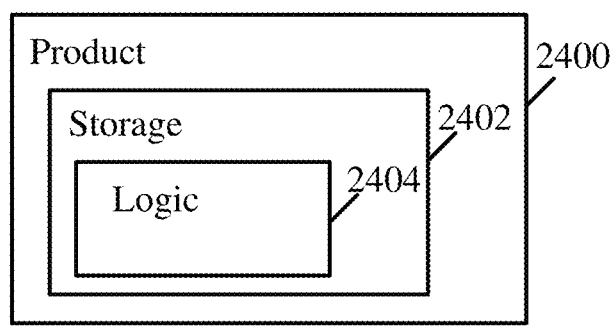
FIG. 24 is a schematic illustration of a product of manufacture, in accordance with some demonstrative aspects.

Reference is made to FIG. 24, which schematically illustrates a product of manufacture 2400, in accordance with some demonstrative aspects. Product 2400 may include one or more tangible computer-readable ("machine-readable") non-transitory storage media 2402, which may include computer-executable instructions, e.g., implemented by logic 2404, operable to, when executed by at least one computer processor, enable the at least one computer processor to implement one or more operations and/or functionalities described with reference to the FIGS. 1-23, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 2400 and/or storage media 2402 may include one or more types of computer-readable storage media capable of storing data, including volatile memory, non-volatile memory, removable or non-removable memory, erasable or non-erasable memory, writeable or re-writeable memory, and the like. For example, storage media 2402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a hard drive, an optical disk, a magnetic disk, a card, a magnetic card, an optical card, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 2404 may include instructions, data, and/or code, which, if executed by a machine, may cause the machine to perform a method, process, and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 2404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner, or syntax, for instructing a processor to perform a certain function. The instructions may be implemented using any suitable high-level, low-level, object-oriented, visual, compiled and/or interpreted programming language, machine code, and the like.

EXAMPLES

The following examples pertain to further aspects.

Example 1 includes an apparatus comprising a memory interface to interface with a memory; and a processor configured to generate compressed radar information and to store the compressed radar information in the memory, wherein the processor is to generate the compressed radar information by compressing radar values in a plurality of data bins of at least one radar processing dimension, the at least one radar processing dimension comprising a range dimension, wherein the processor is configured to generate the compressed radar information by quantizing a plurality of normalized values corresponding to the radar values in the plurality of data bins, wherein a normalized value corresponding to a radar value in a data bin is based on a normalization of the radar value with respect to a plurality of radar values in the data bin.

Example 2 includes the subject matter of Example 1, and optionally, wherein the processor is configured to quantize normalized values corresponding to the data bin based on a quantization bit-width corresponding to the data bin, wherein the quantization bit-width corresponding to the data bin is based on statistical information corresponding to the plurality of radar values in the data bin.

Example 3 includes the subject matter of Example 2, and optionally, wherein the processor is configured to quantize first normalized values corresponding to a first data bin based on a first quantization bit-width corresponding to the first data bin, and to quantize second normalized values corresponding to a second data bin based on a second quantization bit-width corresponding to the second data bin, wherein the first quantization bit-width is based on statistical information corresponding to a plurality of radar values in the first data bin, the second quantization bit-width is based on statistical information corresponding to a plurality of radar values in the second data bin, the first quantization bit-width is different from the second quantization bit-width.

Example 4 includes the subject matter of Example 2 or 3, and optionally, wherein the processor is configured to quantize first normalized values corresponding to the data bin and to a first radar frame based on a first quantization bit-width corresponding to the data bin and to the first radar frame, and to quantize second normalized values corresponding to the data bin and to a second radar frame based on a second quantization bit-width corresponding to the data bin and to the second radar frame, wherein the first quantization bit-width is based on statistical information corresponding to a plurality of radar values in the data bin in the first radar frame, the second quantization bit-width is based on statistical information corresponding to a plurality of radar values in the data bin in the second radar frame, the first quantization bit-width is different from the second quantization bit-width.

Example 5 includes the subject matter of any one of Examples 2-4, and optionally, wherein the statistical information corresponding to the plurality of radar values in the data bin is based on at least one of a maximal value of the plurality of radar values in the data bin, a mean value of the plurality of radar values in the data bin, or a distribution of the plurality of radar values in the data bin.

Example 6 includes the subject matter of any one of Examples 2-5, and optionally, wherein the statistical information corresponding to the plurality of radar values in the data bin is based on at least one of a Signal to Noise Ratio (SNR) corresponding to the plurality of radar values in the data bin, or a Peak to Average Power Ratio (PAPR) corresponding to the plurality of radar values in the data bin.

Example 7 includes the subject matter of any one of Examples 2-6, and optionally, wherein the processor is configured to quantize all normalized values corresponding to a same data bin based on a same quantization bit-width.

Example 8 includes the subject matter of any one of Examples 1-7, and optionally, wherein the processor is configured to determine a selected quantization scheme from a plurality of quantization schemes based on statistical information corresponding to the plurality of radar values in the data bin, and to quantize normalized values corresponding to the data bin according to the selected quantization scheme.

Example 9 includes the subject matter of Example 8, and optionally, wherein the plurality of quantization schemes comprises at least a uniform quantization scheme and a non-uniform quantization scheme.

Example 10 includes the subject matter of Example 8 or 9, and optionally, wherein the processor is configured to quantize normalized values corresponding to a first data bin according to a first quantization scheme corresponding to the first data bin, and to quantize normalized values corresponding to a second data bin according to a second quantization scheme corresponding to the second data bin, wherein the first quantization scheme is based on statistical information corresponding to a plurality of radar values in the first data bin, the second quantization scheme is based on statistical information corresponding to a plurality of radar values in the second data bin, the first quantization scheme is different from the second quantization scheme.

Example 11 includes the subject matter of any one of Examples 8-10, and optionally, wherein the processor is configured to quantize normalized values corresponding to the data bin and to a first radar frame according to a first quantization scheme corresponding to the data bin and to the first radar frame, and to quantize normalized values corresponding to the data bin and to a second radar frame according to a second quantization scheme corresponding to the data bin and to the second radar frame, wherein the first quantization scheme is based on statistical information corresponding to a plurality of radar values in the data bin in the first radar frame, the second quantization scheme is based on statistical information corresponding to a plurality of radar values in the data bin in the second radar frame, the first quantization scheme is different from the second quantization scheme.

Example 12 includes the subject matter of any one of Examples 8-11, and optionally, wherein the statistical information corresponding to the plurality of radar values in the data bin is based on at least one of a maximal value of the plurality of radar values in the data bin, a mean value of the plurality of radar values in the data bin, or a distribution of the plurality of radar values in the data bin.

Example 13 includes the subject matter of Example 8-12, and optionally, wherein the statistical information corresponding to the plurality of radar values in the data bin is based on at least one of a Signal to Noise Ratio (SNR) corresponding to the plurality of radar values in the data bin, or a Peak to Average Power Ratio (PAPR) corresponding to the plurality of radar values in the data bin.

Example 14 includes the subject matter of any one of Examples 8-13, and optionally, wherein the processor is configured to quantize all normalized radar values corresponding to a same data bin according to a same quantization scheme.

Example 15 includes the subject matter of any one of Examples 1-14, and optionally, wherein the processor is configured to generate a plurality of dithered values for the data bin by dithering the plurality of radar values in the data bin, wherein the normalized value corresponding to the radar value is based on a normalization of a dithered value corresponding to the radar value with respect to the plurality of dithered values.

Example 16 includes the subject matter of any one of Examples 1-15, and optionally, wherein the processor is configured to generate the compressed radar information by compressing a plurality of quantized values according to a bit-coding scheme, the plurality of quantized values are based on quantization of the plurality of normalized values.

Example 17 includes the subject matter of any one of Examples 1-16, and optionally, wherein the radar values in the plurality of data bins comprise radar values in a plurality of range bins, wherein the plurality of radar values in the data bin comprises a plurality of radar values belonging to a same range bin.

Example 18 includes the subject matter of Example 17, and optionally, wherein the radar values comprise radar values post range processing and prior to Doppler processing.

Example 19 includes the subject matter of any one of Examples 1-16, and optionally, wherein the radar values in the plurality of data bins comprise radar values in a plurality of range-Doppler bins, wherein the plurality of radar values in the data bin comprises a plurality of radar values belonging to a same range-Doppler bin.

Example 20 includes the subject matter of Example 19, and optionally, wherein the processor is configured to identify one or more active range-Doppler bins of the plurality of range-Doppler bins based on an activity detection criterion, and to generate the compressed radar information by compressing radar values in the one or more active range-Doppler bins, and ignoring radar values of one or more other range-Doppler bins, which are not identified as active range-Doppler bins.

Example 21 includes the subject matter of Example 20, and optionally, wherein the processor is configured to store in the memory active range-Doppler bin information to identify the one or more active range-Doppler bins.

Example 22 includes the subject matter of any one of Examples 19-21, and optionally, wherein the radar values comprise radar values prior to Angle-of Arrival (AoA) processing.

Example 23 includes the subject matter of any one of Examples 1-22, and optionally, wherein the processor is configured to store in the memory statistical information corresponding to the plurality of radar values in the data bin.

Example 24 includes the subject matter of any one of Examples 1-23, and optionally, comprising a radar device configured to generate radar information based on the radar values, the radar device comprising a radar antenna comprising a plurality of Rx antennas and a plurality of Transmit (Tx) antennas, wherein the radar values are based on radar signals transmitted by the plurality of Tx antennas and received via the plurality of Rx antennas.

Example 25 includes the subject matter of Example 24, and optionally, comprising a vehicle, the vehicle comprising a system controller to control one or more systems of the vehicle based on the radar information.

Example 26 includes an apparatus comprising means for executing any of the described operations of one or more of Examples 1-25.

Example 27 includes a machine-readable medium that stores instructions for execution by a processor to perform any of the described operations of one or more of Examples 1-25.

Example 48 includes a product comprising one or more tangible computer-readable non-transitory storage media comprising computer-executable instructions operable to, when executed by at least one processor, enable the at least one processor to cause a computing device to perform any of the described operations of any one of Examples 1-25.

Example 29 includes an apparatus comprising a memory; and processing circuitry configured to perform any of the described operations of one or more of Examples 1-25.

Example 30 includes a method including any of the described operations of one or more of Examples 1-25.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a radar device configured to generate radar information, the radar device comprising:
a plurality of Transmit (Tx) antennas;
a plurality of Receive (Rx) antennas;
a memory interface to interface with a memory; and
a processor configured to generate compressed radar information and to store the compressed radar information in the memory, wherein the processor is configured to generate the compressed radar information by compressing radar values in a plurality of data bins of at least one radar processing dimension, the at least one radar processing dimension comprising a range dimension, wherein the radar values in the plurality of data bins are based on radar signals transmitted by the plurality of Tx antennas and received via the plurality of Rx antennas, the radar device is to generate the radar information based on the radar values in the plurality of data bins, wherein the processor is configured to generate the compressed radar information by quantizing a plurality of normalized values corresponding to the radar values in the plurality of data bins, wherein a normalized value corresponding to a radar value in a data bin is based on a normalization of the radar value with respect to a plurality of radar values in the data bin.

2. The apparatus of claim 1, wherein the processor is configured to quantize normalized values corresponding to the data bin based on a quantization bit-width corresponding to the data bin, wherein the quantization bit-width corresponding to the data bin is based on statistical information corresponding to the plurality of radar values in the data bin.

3. The apparatus of claim 2, wherein the processor is configured to quantize first normalized values corresponding to a first data bin based on a first quantization bit-width corresponding to the first data bin, and to quantize second normalized values corresponding to a second data bin based on a second quantization bit-width corresponding to the second data bin, wherein the first quantization bit-width is based on statistical information corresponding to a plurality of radar values in the first data bin, the second quantization bit-width is based on statistical information corresponding to a plurality of radar values in the second data bin, the first quantization bit-width is different from the second quantization bit-width.

4. The apparatus of claim 2, wherein the processor is configured to quantize first normalized values corresponding to the data bin and to a first radar frame based on a first quantization bit-width corresponding to the data bin and to the first radar frame, and to quantize second normalized values corresponding to the data bin and to a second radar frame based on a second quantization bit-width corresponding to the data bin and to the second radar frame, wherein the first quantization bit-width is based on statistical information corresponding to a plurality of radar values in the data bin in the first radar frame, the second quantization bit-width is based on statistical information corresponding to a plurality of radar values in the data bin in the second radar frame, the first quantization bit-width is different from the second quantization bit-width.

5. The apparatus of claim 2, wherein the statistical information corresponding to the plurality of radar values in the data bin is based on at least one of a maximal value of the plurality of radar values in the data bin, a mean value of the plurality of radar values in the data bin, or a distribution of the plurality of radar values in the data bin.

6. The apparatus of claim 2, wherein the statistical information corresponding to the plurality of radar values in the data bin is based on at least one of a Signal to Noise Ratio (SNR) corresponding to the plurality of radar values in the data bin, or a Peak to Average Power Ratio (PAPR) corresponding to the plurality of radar values in the data bin.

7. The apparatus of claim 2, wherein the processor is configured to quantize all normalized values corresponding to a same data bin based on a same quantization bit-width.

8. The apparatus of claim 1, wherein the processor is configured to determine a selected quantization scheme from a plurality of quantization schemes based on statistical information corresponding to the plurality of radar values in the data bin, and to quantize normalized values corresponding to the data bin according to the selected quantization scheme.

9. The apparatus of claim 8, wherein the plurality of quantization schemes comprises at least a uniform quantization scheme and a non-uniform quantization scheme.

10. The apparatus of claim 8, wherein the processor is configured to quantize all normalized radar values corresponding to a same data bin according to a same quantization scheme.

11. The apparatus of claim 1, wherein the processor is configured to generate a plurality of dithered values for the data bin by dithering the plurality of radar values in the data bin, wherein the normalized value corresponding to the radar value is based on a normalization of a dithered value corresponding to the radar value with respect to the plurality of dithered values.

12. The apparatus of claim 1, wherein the processor is configured to generate the compressed radar information by compressing a plurality of quantized values according to a bit-coding scheme, the plurality of quantized values are based on quantization of the plurality of normalized values.

13. The apparatus of claim 1, wherein the radar values in the plurality of data bins comprise radar values in a plurality of range bins, wherein the plurality of radar values in the data bin comprises a plurality of radar values belonging to a same range bin.

14. The apparatus of claim 13, wherein the radar values in the plurality of data bins comprise radar values post range processing and prior to Doppler processing.

15. The apparatus of claim 1, wherein the radar values in the plurality of data bins comprise radar values in a plurality of range-Doppler bins, wherein the plurality of radar values in the data bin comprises a plurality of radar values belonging to a same range-Doppler bin.

16. The apparatus of claim 15, wherein the processor is configured to identify one or more active range-Doppler bins of the plurality of range-Doppler bins based on an activity detection criterion, and to generate the compressed radar information by compressing radar values in the one or more active range-Doppler bins, and ignoring radar values of one or more other range-Doppler bins, which are not identified as active range-Doppler bins.

17. The apparatus of claim 16, wherein the processor is configured to store in the memory active range-Doppler bin information to identify the one or more active range-Doppler bins.

18. The apparatus of claim 15, wherein the radar values in the plurality of data bins comprise radar values prior to Angle-of Arrival (AoA) processing.

19. The apparatus of claim 1, wherein the processor is configured to store in the memory statistical information corresponding to the plurality of radar values in the data bin.

20. The apparatus of claim 1 comprising a detector configured to detect one or more targets based on the radar information.

21. A product comprising one or more tangible computer-readable non-transitory storage media comprising computer-executable instructions operable to, when executed by at least one processor, enable the at least one processor to:
cause a radar device to transmit radar Transmit (Tx) signals via Tx antennas of the radar device;
generate radar information based on radar Receive (Rx) signals received via Rx antennas of the radar device based on the radar Tx signals, wherein generating the radar information comprises generating compressed radar information by compressing radar values in a plurality of data bins of at least one radar processing dimension, the at least one radar processing dimension comprising a range dimension, the radar values in the plurality of data bins are based on the radar Rx signals, wherein generating the compressed radar information comprises quantizing a plurality of normalized values corresponding to the radar values in the plurality of data bins, wherein a normalized value corresponding to a radar value in a data bin is based on a normalization of the radar value with respect to a plurality of radar values in the data bin; and
store the compressed radar information in a memory.

22. The product of claim 21, wherein the instructions, when executed, cause the processor to quantize normalized values corresponding to the data bin based on a quantization bit-width corresponding to the data bin, wherein the quantization bit-width corresponding to the data bin is based on statistical information corresponding to the plurality of radar values in the data bin.

23. The product of claim 21, wherein the instructions, when executed, cause the processor to determine a selected quantization scheme from a plurality of quantization schemes based on statistical information corresponding to the plurality of radar values in the data bin, and to quantize normalized values corresponding to the data bin according to the selected quantization scheme.

24. A vehicle comprising:
a system controller configured to control one or more vehicular systems of the vehicle based on radar information; and
a radar device configured to provide the radar information to the system controller, the radar device comprising:
a radar antenna comprising a plurality of Transmit (Tx) antennas to transmit radar Tx signals, and a plurality of Receive (Rx) antennas to receive radar Rx signals based on the radar Tx signals; and
a processor configured to generate the radar information based on the radar Rx signals, wherein the processor comprises:

a radar data compressor configured to generate compressed radar data by compressing radar values in a plurality of data bins of at least one radar processing dimension, the at least one radar processing dimension comprising a range dimension, wherein the radar data compressor is configured to generate the compressed radar data by quantizing a plurality of normalized values corresponding to the radar values in the plurality of data bins, wherein a normalized value corresponding to a radar value in a data bin is based on a normalization of the radar value with respect to a plurality of radar values in the data bin; and a memory to store the compressed radar data.

25. The vehicle of claim 24, wherein the radar data compressor is configured to quantize normalized values corresponding to the data bin based on a quantization bit-width corresponding to the data bin, wherein the quantization bit-width corresponding to the data bin is based on statistical information corresponding to the plurality of radar values in the data bin.

\* \* \* \* \*